US008717931B2

(12) United States Patent
Taniuchi et al.

(10) Patent No.: US 8,717,931 B2
(45) Date of Patent: May 6, 2014

(54) NETWORK DISCOVERY MECHANISMS

(75) Inventors: Kenichi Taniuchi, Piscataway, NJ (US); Yoshihiro Ohba, Fort Lee, NJ (US); Sunil Madhani, Austin, TX (US); Subir Das, Kendall Park, NJ (US); Ashutosh Dutta, Bridgewater, NJ (US)

(73) Assignees: Toshiba America Research, Inc., Washington, DC (US); Telcordia Technologies, Inc., Piscataway, NJ (US)

( * ) Notice: Subject to any disclaimer, the term of this patent is extended or adjusted under 35 U.S.C. 154(b) by 502 days.

(21) Appl. No.: 11/267,590

(22) Filed: Nov. 7, 2005

(65) Prior Publication Data
US 2006/0187858 A1    Aug. 24, 2006

Related U.S. Application Data

(60) Provisional application No. 60/625,106, filed on Nov. 5, 2004, provisional application No. 60/593,377, filed on Jan. 9, 2005, provisional application No. 60/670,655, filed on Apr. 13, 2005, provisional application No. 60/697,589, filed on Jul. 11, 2005.

(51) Int. Cl.
*H04L 12/28* (2006.01)

(52) U.S. Cl.
USPC ............ 370/254; 370/328; 370/331; 370/338

(58) Field of Classification Search
None
See application file for complete search history.

(56) References Cited

U.S. PATENT DOCUMENTS

| 6,304,556 | B1 | 10/2001 | Haas |
| 6,522,880 | B1 | 2/2003 | Verma et al. |
| 6,704,301 | B2 | 3/2004 | Chari et al. |
| 6,842,460 | B1 * | 1/2005 | Olkkonen et al. ............ 370/465 |
| 6,865,171 | B1 * | 3/2005 | Nilsson ......................... 370/338 |
| 7,158,497 | B2 * | 1/2007 | Li et al. ......................... 370/331 |
| 7,224,677 | B2 * | 5/2007 | Krishnamurthi et al. ..... 370/331 |
| 7,340,247 | B1 * | 3/2008 | O'Hara et al. ................ 455/418 |
| 7,376,101 | B2 * | 5/2008 | Shim et al. .................... 370/331 |
| 8,068,833 | B2 * | 11/2011 | Trossen ......................... 455/436 |
| 2003/0003909 | A1 | 1/2003 | Keronen et al. |
| 2003/0174667 | A1 | 9/2003 | Krishnamurthi et al. |

FOREIGN PATENT DOCUMENTS

| JP | 2002-084317 A | 3/2002 |
| JP | 2002-351873 A | 12/2002 |
| JP | 2002-374259 A | 12/2002 |
| JP | 2003-134133 A | 5/2003 |
| JP | 2003-284117 A | 10/2003 |
| JP | 2003-333639 A | 11/2003 |
| JP | 2004-7576 A | 1/2004 |
| JP | 2004-159336 A | 6/2004 |

(Continued)

OTHER PUBLICATIONS

Jini Network Technology Specifications, p. 1-2, Web Site, USA.

(Continued)

*Primary Examiner* — Michael J Moore, Jr.
(74) *Attorney, Agent, or Firm* — Westerman, Hattori, Daniels & Adrian, LLP

(57) ABSTRACT

In some of the preferred embodiments, a method for network discovery of a mobile device to use at least one of a plurality of access networks within an IP network includes: obtaining specified network information in the vicinity of a given location based on a set of criteria when a mobile is connected to the IP network from any location.

34 Claims, 67 Drawing Sheets

(56) References Cited

FOREIGN PATENT DOCUMENTS

| JP | 2004-241937 A | 8/2004 |
|---|---|---|
| WO | 03/086001 A1 | 10/2003 |
| WO | 2004/004376 A1 | 1/2004 |

OTHER PUBLICATIONS

Jini Network Technology—White Papers and Other Documents, Technology Architectural Overview, Jan. 1999, p. 1-11, USA.

E. Guttman, Service Location Protocol Version 2, Jun. 1999, p. 1-51, The Internet Society, USA.

E. Guttman, Service Templates and Service: Schemes, Jun. 1999, p. 1-31, The Internet Society, USA.

EECS Electrical Engineering and Computer Sciences at UC Berkeley, p. 1, Web Site, USA.

R. Droms, Dynamic Host Configuration Protocol, Mar. 1997, p. 1-43, USA.

Extensible Markup Language (XML), p. 1-6, Architecture Domain, USA.

Marco Liebsch, Candidate Access Router Discovery, Dec. 2003, p. 1-46, USA.

J. Hodges, Lightweight Directory Access Protocol (v3): Technical Specification, Sep. 2002, p. 1-6, The Internet Society, USA.

K. Arabshian, GloServ: Global Service Discovery Architecture, Aug. 2004, p. 319-325, USA.

International Search Report, dated Sep. 21, 2007 (2 pages).

Chinese Office Action dated Sep. 23, 2011, issued in corresponding Chinese Patent Application No. 200580043402.9.

Chinese Office Action dated Jun. 8, 2010, issued in corresponding Chinese Patent Application No. 200580043402.9.

J. Arkko et al., "Network Discovery and Selection Problem draft-ietf-eap-netsel-proble,s-02"; Extensible Authentication Protocol Internet—Draft Expires: Apr. 25, 2005, Internet Engineering Task Force, IETF, CH, vol. esp. No. 2, Oct. 25, 2004, XP015038249.

Supplementary European Search Report dated May 23, 2011, issued in corresponding European Patent Application No. 05825474.9.

Vivek Supta et al., "IEEE P802.21 Media Independent Handover Service Draft Technical Requirements" Internet Citation, Sep. 21, 2004, pp. 1-11, XP0002515105, Retrieved from internet.

Zdarsky F A et al., "Handover in mobile communication networks: who is in control anyway?" Euromicro Conference, 2004. Proceedings. 30th Rennes, France Aug. 31-Sep. 3, 2004, Piscataway, NJ, USA, IEEE, Aug. 31, 2004, pp. 205-212, XP010723593.

Korean Office Action dated Apr. 30, 2012, issued in corresponding Korean Patent Application No. 10-2007-7012642, (with English Translation, 8 pages).

Chinese Office Action dated May 30, 2012, issued in corresponding Chinese Patent Application No. 200580043402.9, (8 pages).

European Office Action dated Jan. 20, 2012, issued in corresponding European Patent Application No. 05825474.9.

Canadian Office Action dated Feb. 28, 2013, issued in corresponding Canadian Patent Application 2,603,720, (2 pages).

Kawarasaki, et al., "Metadata driven Seamless Content Handover System: MetaPORT", IEICE Technical Report, vol. 103, No. 56, dated May 2003, (8 pages). With English Abstract.

Ma, et al., "A New Method to Support UMTS/WLAN Vertical Handover using SCTP", Vehicular Technology Conference, 2003, VCT 2003-Fall. 2003 IEEE 58th, dated Oct. 2003, (5 pages).

Japanese Office Action dated Jun. 19, 2012, issued in corresponding Japanese Patent Application 2010-262095, (8 pages). With English Translation.

Canadian Office Action dated Feb. 17, 2014, issued in corresponding Canadian Patent Application No. 2603720, (3 pages).

\* cited by examiner

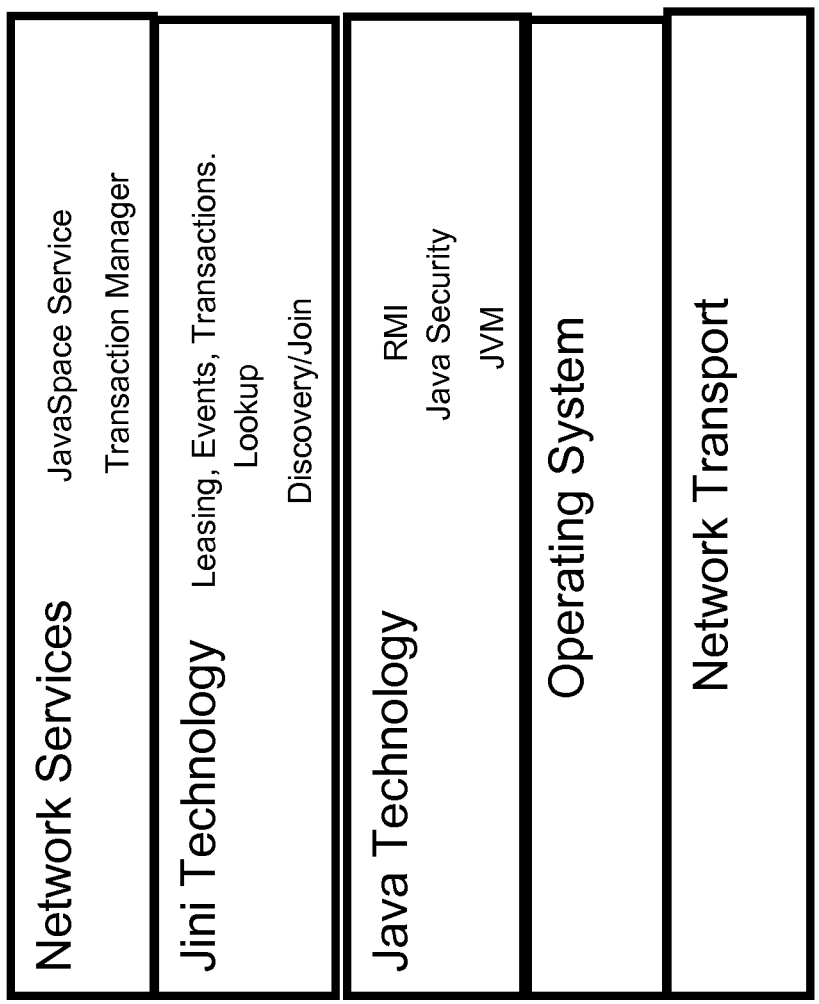
Figure 1: Architecture of Jini Connection Technology

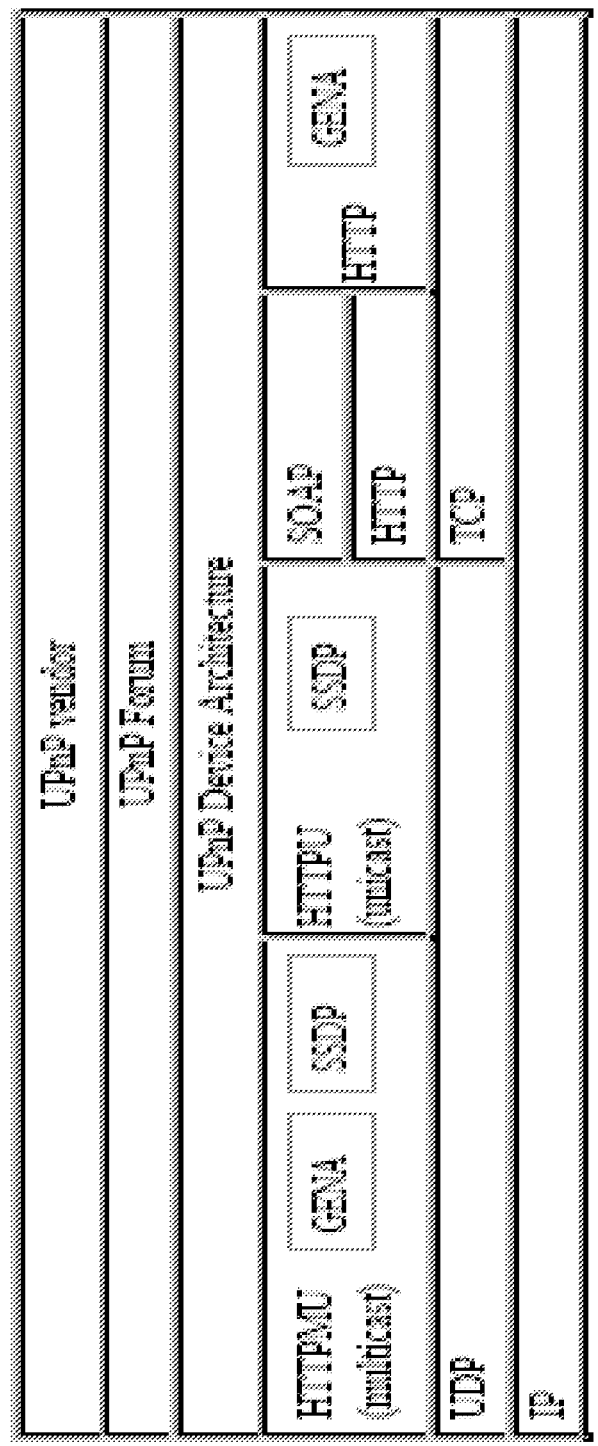
Figure 2: UPnP Protocol Stack

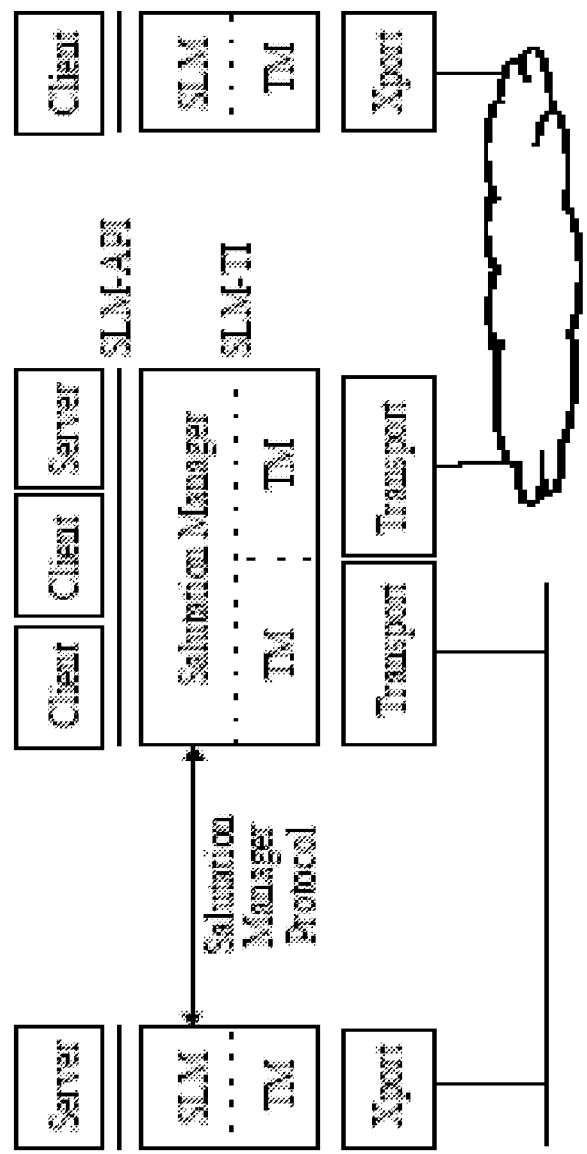
Figure 3: Model of the Salutation Manager

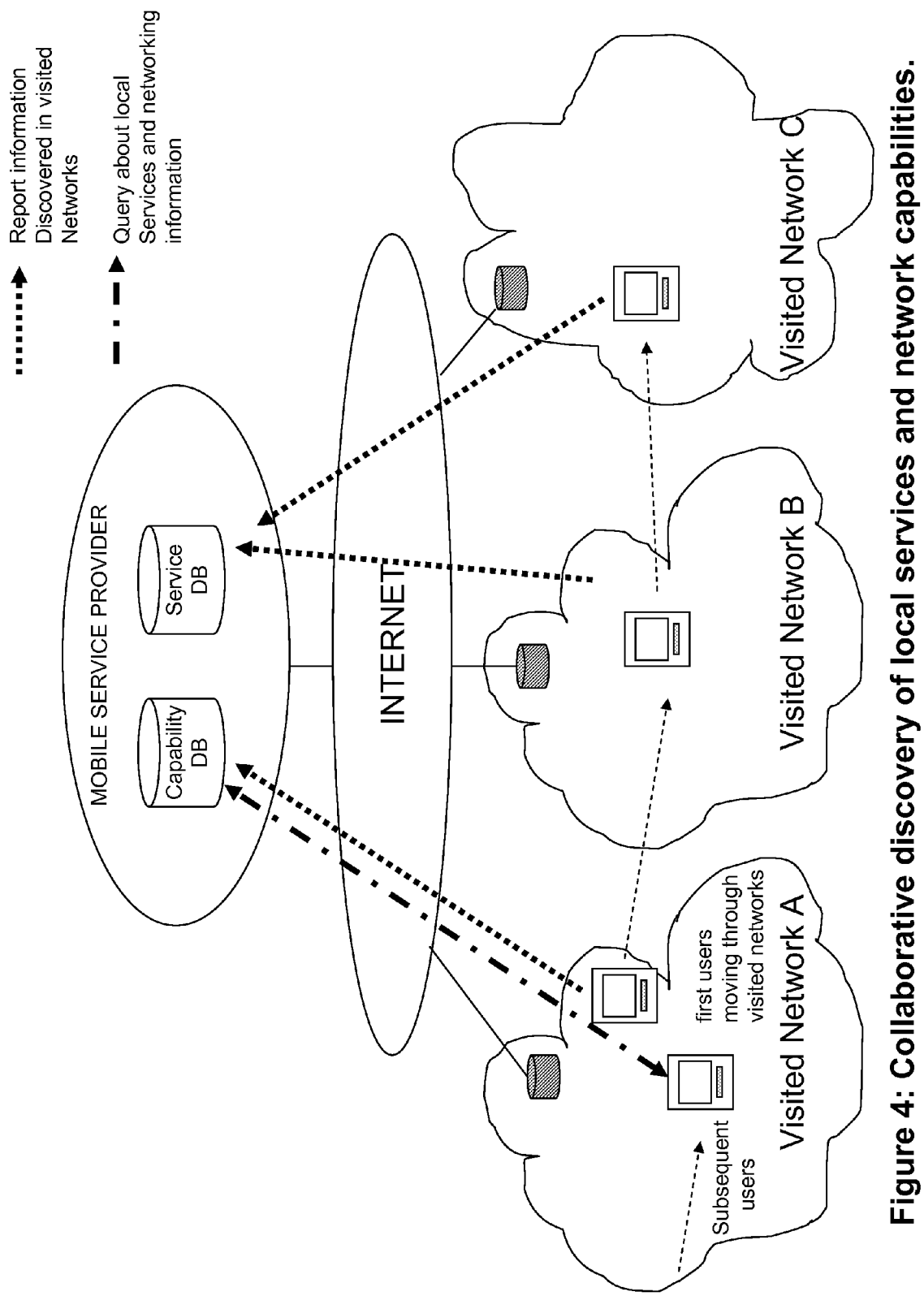
Figure 4: Collaborative discovery of local services and network capabilities.

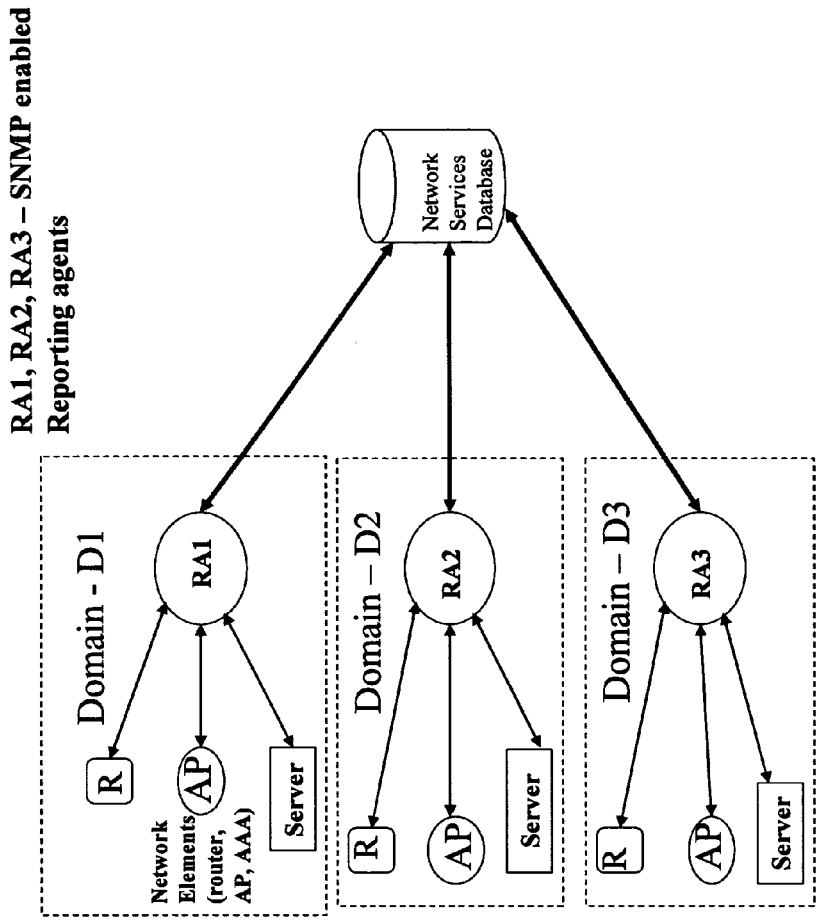
Figure 5: Populating the database using Reporting Agents (RAs)

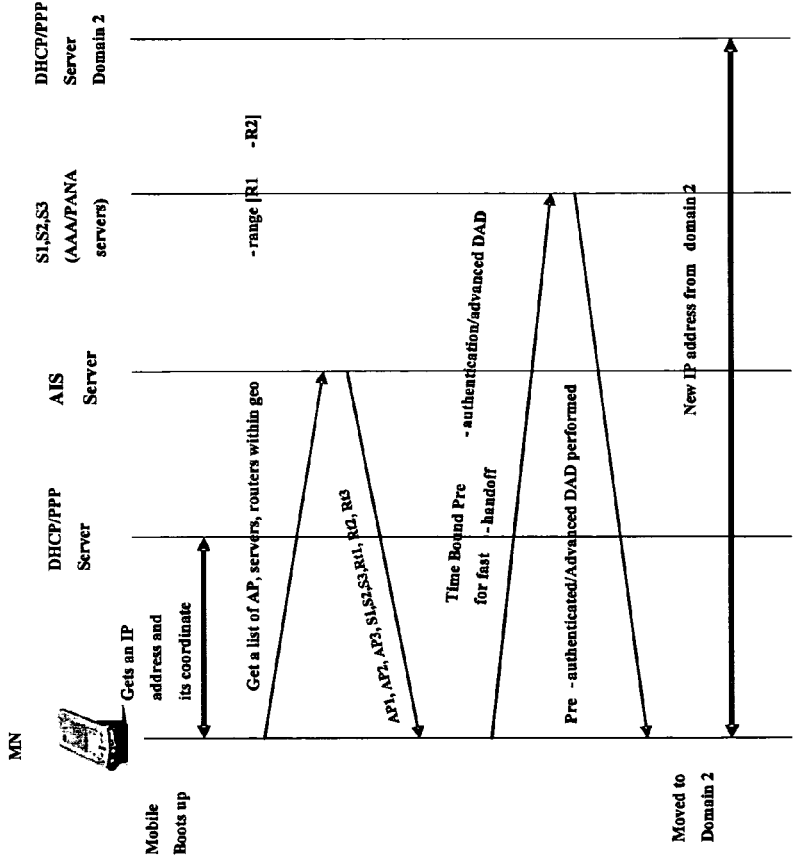
Figure 6: Protocol Flow for Network Service Discovery

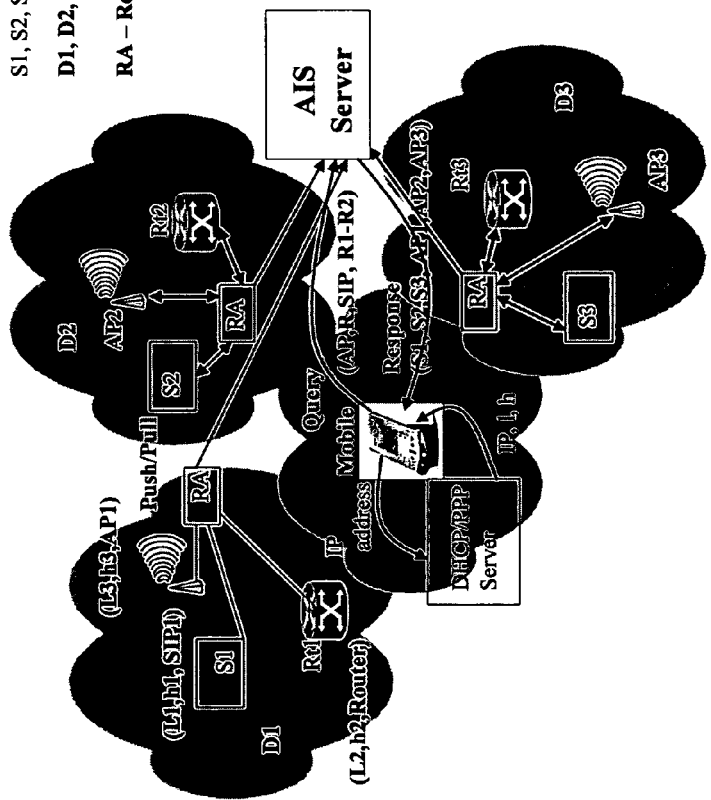
Figure 7: Example of Geo-coordinate based network service discovery

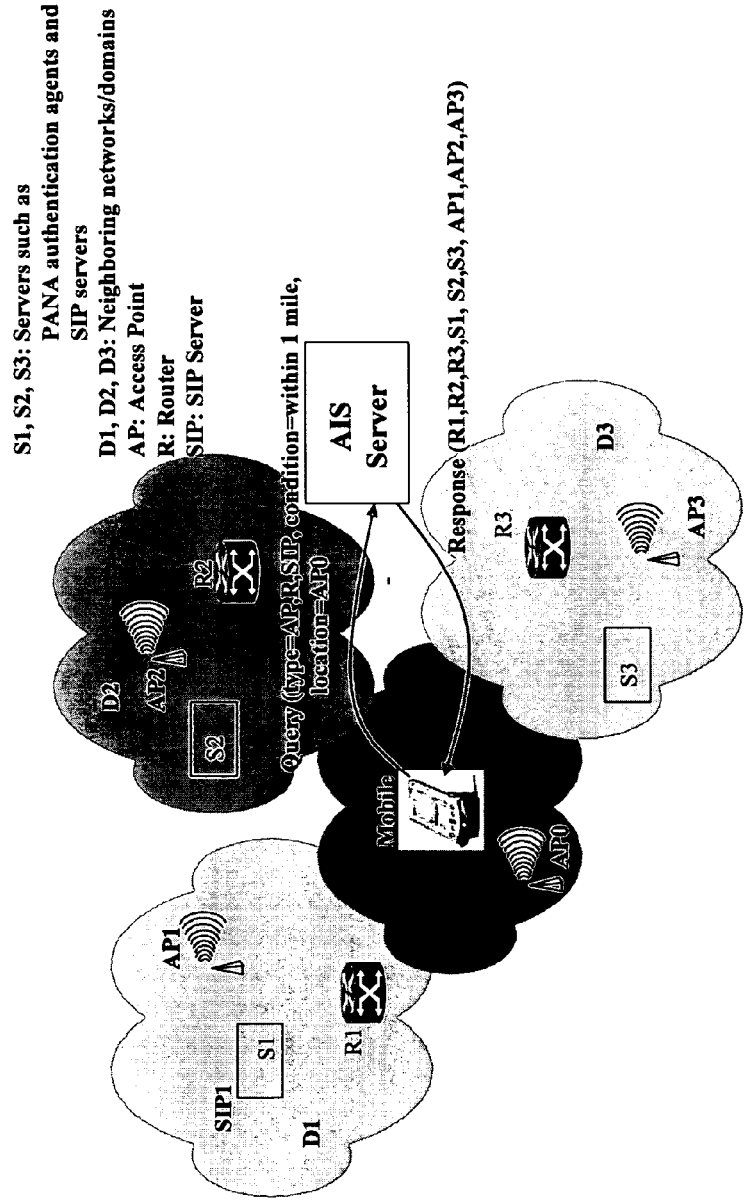
Figure 8: Example of AP's MAC Address based network service discovery

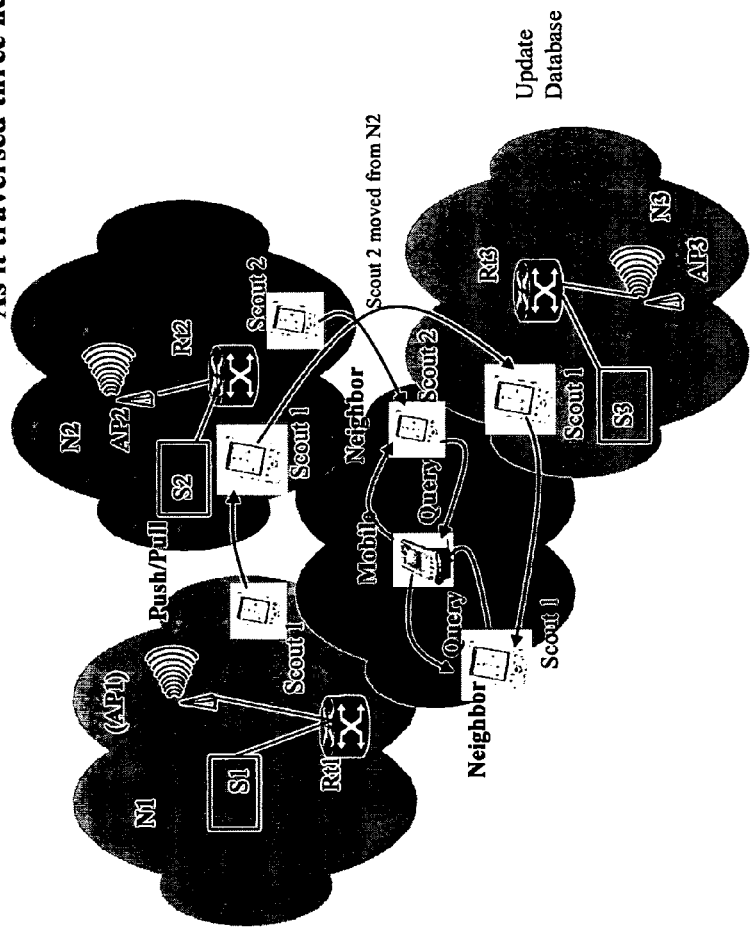
Figure 9: Peer-to-peer-based Network Discovery

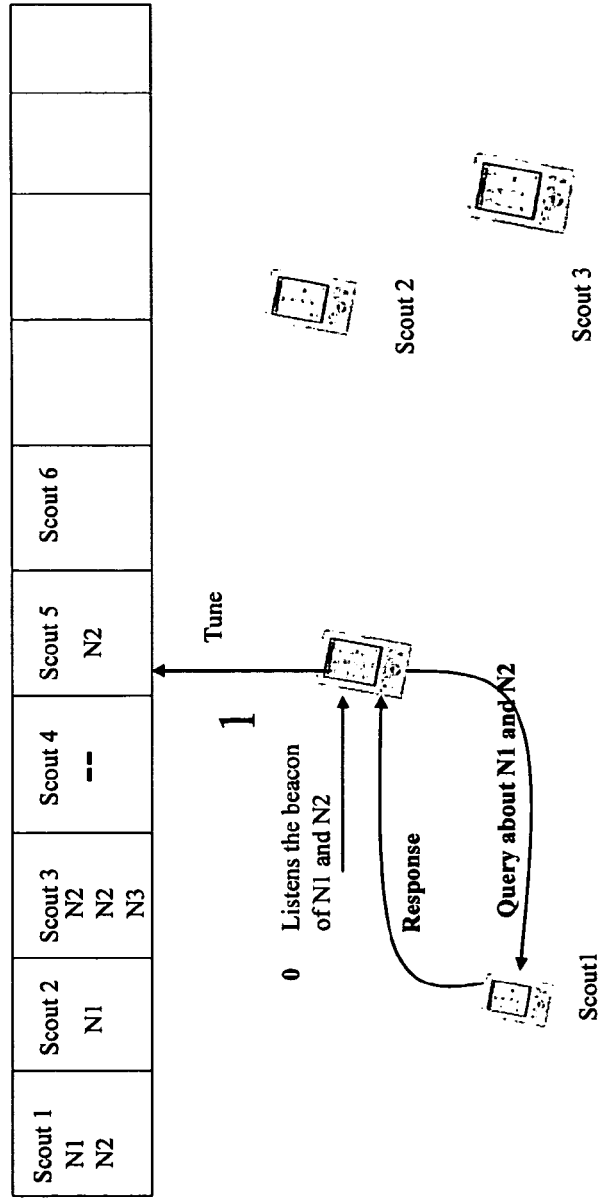
Figure 10: Scoped-based Multicast

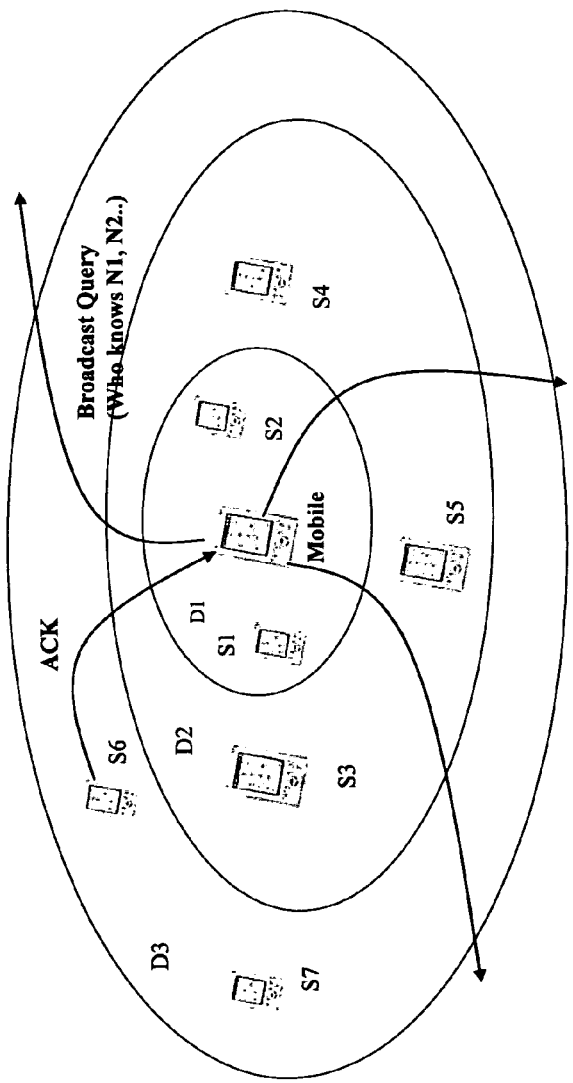
Figure 11: Recursive Broadcast

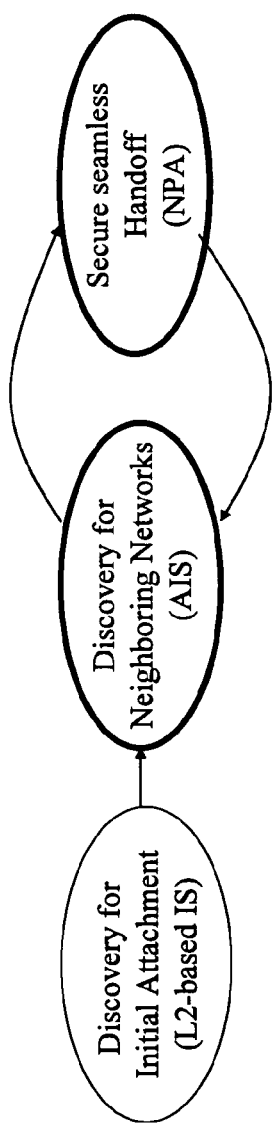
Figure 12: Integration of Network Discovery and Secure Seamless handoff

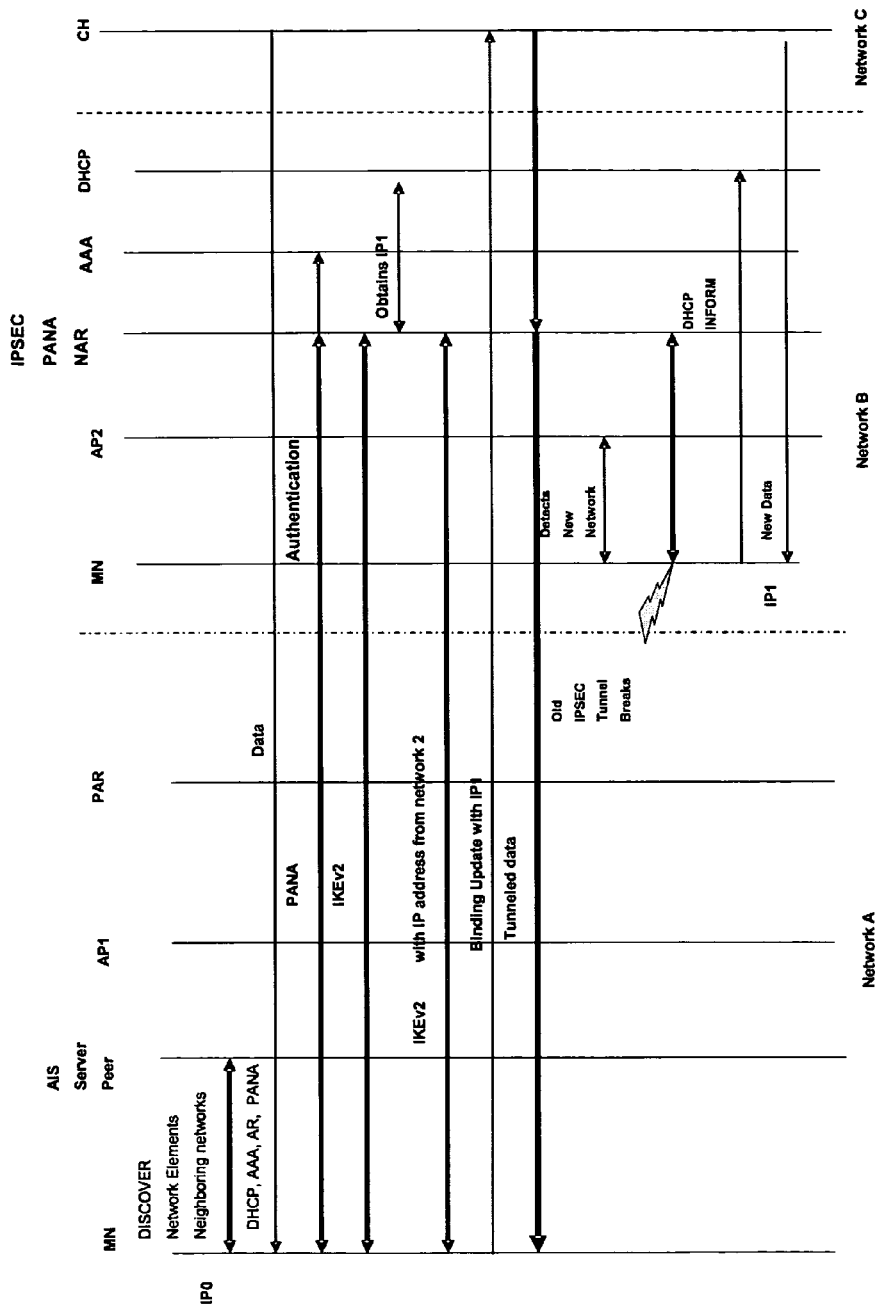
Figure 13 : An Example Integrated Flow (Network Discovery + Pre-authentication)

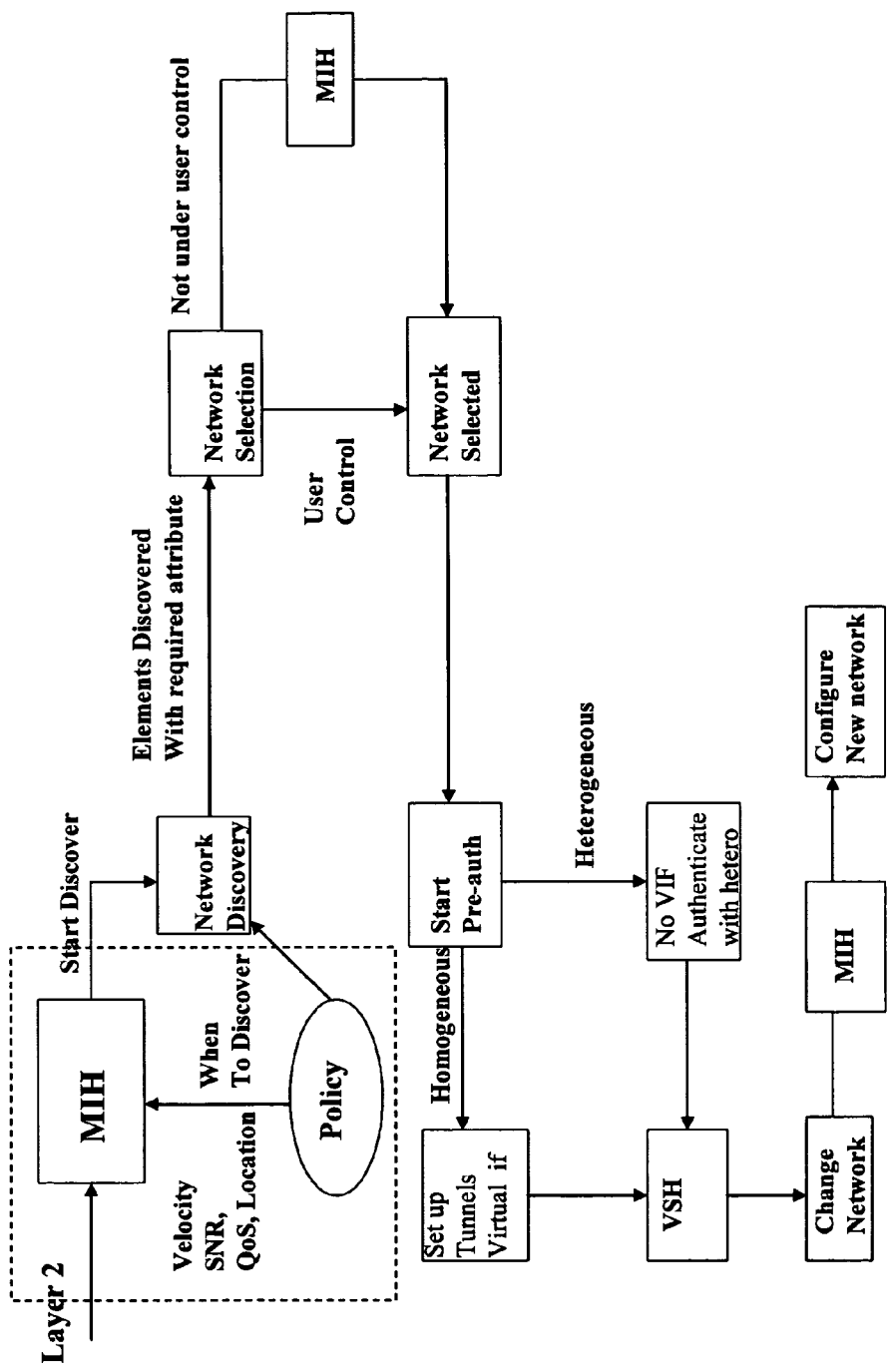
Fig 14: Network Discovery and Pre-auth Flow Diagram

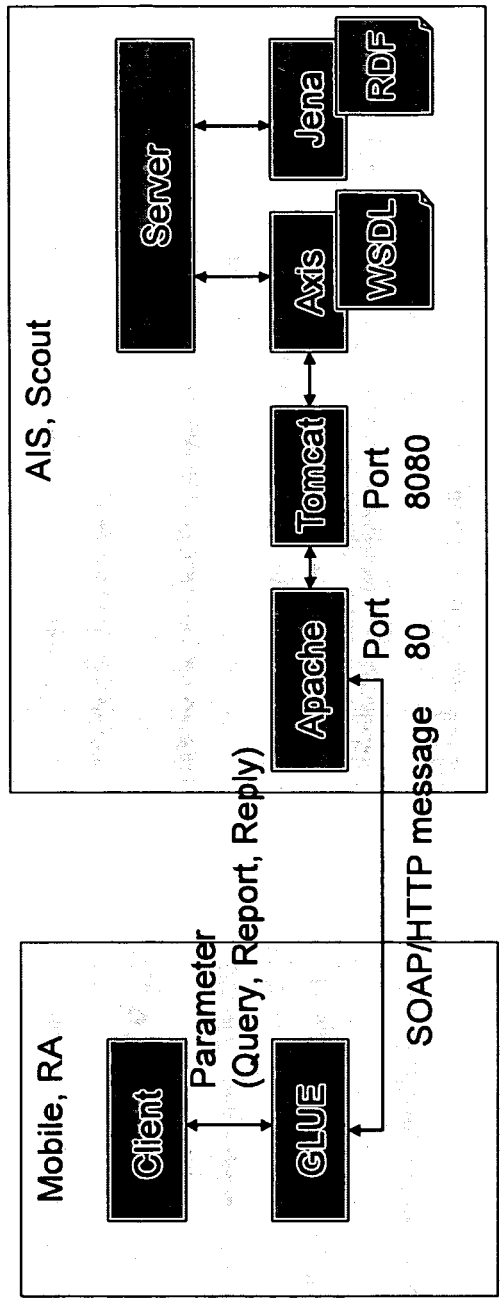
Figure 15: Interaction between different components of database engines

FIG. 17(1)

RDF Schema for Network Discovery:

```
<rdf:RDF xml:lang="en"
  xmlns:rdf="http://www.w3.org/1999/02/22-rdf-syntax-ns#"
  xmlns:rdfs="http://www.w3.org/2000/01/rdf-schema#"
  xmlns:nd="http://www.networkdiscovery.org/2004/10/rdf-schema/">

<rdfs:Class rdf:about="http://www.networkdiscovery.org/2004/10/rdf-schema/Location">
 <rdfs:subClassOf rdf:resource="http://www.w3.org/2000/01/rdf-schema#Resource"/>
</rdfs:Class>

<rdf:Property rdf:about="http://www.networkdiscovery.org/2004/10/rdf-schema/geo-location">
 <rdfs:domain rdf:resource="http://www.networkdiscovery.org/2004/10/rdf-schema/Location"/>
 <rdfs:range rdf:resource="http://www.w3.org/2000/01/rdf-schema#Literal"/>
</rdf:Property>

<rdf:Property rdf:about="http://www.networkdiscovery.org/2004/10/rdf-schema/civic-addr">
 <rdfs:domain rdf:resource="http://www.networkdiscovery.org/2004/10/rdf-schema/Location"/>
 <rdfs:range rdf:resource="http://www.w3.org/2000/01/rdf-schema#Literal"/>
</rdf:Property>

<rdfs:Class rdf:about="http://www.networkdiscovery.org/2004/10/rdf-schema/L2info">
 <rdfs:subClassOf rdf:resource="http://www.networkdiscovery.org/2004/10/rdf-schema/Location"/>
</rdfs:Class>

<rdf:Property rdf:about="http://www.networkdiscovery.org/2004/10/rdf-schema/apid">
 <rdfs:domain rdf:resource="http://www.networkdiscovery.org/2004/10/rdf-schema/L2info"/>
 <rdfs:domain rdf:resource="http://www.networkdiscovery.org/2004/10/rdf-schema/Location"/>
 <rdfs:range rdf:resource="http://www.w3.org/2000/01/rdf-schema#Literal"/>
</rdf:Property>

<rdf:Property rdf:about="http://www.networkdiscovery.org/2004/10/rdf-schema/ssid">
 <rdfs:domain rdf:resource="http://www.networkdiscovery.org/2004/10/rdf-schema/L2info"/>
 <rdfs:range rdf:resource="http://www.w3.org/2000/01/rdf-schema#Literal"/>
</rdf:Property>
```

FIG. 17(2)

```
<rdf:Property rdf:about="http://www.networkdiscovery.org/2004/10/rdf-schema/phymac-
type">
 <rdfs:domain rdf:resource="http://www.networkdiscovery.org/2004/10/rdf-
schema/L2info"/>
 <rdfs:range rdf:resource="http://www.networkdiscovery.org/2004/10/rdf-
schema/PHYMACClass"/>
</rdf:Property>

<rdfs:Class rdf:about="http://www.networkdiscovery.org/2004/10/rdf-
schema/PHYMACClass">
 <rdfs:subClassOf rdf:resource="http://www.w3.org/2000/01/rdf-schema#Resource"/>
</rdfs:Class>

<nd:PHYMACClass rdf:about="http://www.networkdiscovery.org/2004/10/rdf-
schema/802.11aClass"/>
<nd:PHYMACClass rdf:about="http://www.networkdiscovery.org/2004/10/rdf-
schema/802.11bClass"/>
<nd:PHYMACClass rdf:about="http://www.networkdiscovery.org/2004/10/rdf-
schema/802.11gClass"/>
<nd:PHYMACClass rdf:about="http://www.networkdiscovery.org/2004/10/rdf-
schema/CDMA2000Class"/>
<nd:PHYMACClass rdf:about="http://www.networkdiscovery.org/2004/10/rdf-
schema/WCDMAClass"/>

<rdfs:Class rdf:about="http://www.networkdiscovery.org/2004/10/rdf-
schema/L2Security">
 <rdfs:subClassOf rdf:resource="http://www.networkdiscovery.org/2004/10/rdf-
schema/L2info"/>
</rdfs:Class>

<rdfs:Class rdf:about="http://www.networkdiscovery.org/2004/10/rdf-
schema/L2ClientAuthentication">
 <rdfs:subClassOf rdf:resource="http://www.networkdiscovery.org/2004/10/rdf-
schema/L2Security"/>
</rdfs:Class>

<rdfs:Class rdf:about="http://www.networkdiscovery.org/2004/10/rdf-schema/PSK">
 <rdfs:subClassOf rdf:resource="http://www.networkdiscovery.org/2004/10/rdf-
schema/L2ClientAuthentication"/>
</rdfs:Class>

<rdfs:Class rdf:about="http://www.networkdiscovery.org/2004/10/rdf-
schema/EAP802.11x">
 <rdfs:subClassOf rdf:resource="http://www.networkdiscovery.org/2004/10/rdf-
schema/L2ClientAuthentication"/>
</rdfs:Class>
```

FIG. 17(3)

```
<rdfs:Class rdf:about="http://www.networkdiscovery.org/2004/10/rdf-
schema/WEPauth">
 <rdfs:subClassOf rdf:resource="http://www.networkdiscovery.org/2004/10/rdf-
schema/L2ClientAuthentication"/>
</rdfs:Class>

<rdfs:Class rdf:about="http://www.networkdiscovery.org/2004/10/rdf-
schema/L2DataPacketCiphering">
 <rdfs:subClassOf rdf:resource="http://www.networkdiscovery.org/2004/10/rdf-
schema/L2Serurity"/>
 <rdfs:subClassOf rdf:resource="http://www.networkdiscovery.org/2004/10/rdf-
schema/L2CipheringMode"/>
</rdfs:Class>

<rdfs:Class rdf:about="http://www.networkdiscovery.org/2004/10/rdf-
schema/WEPCiph">
 <rdfs:subClassOf rdf:resource="http://www.networkdiscovery.org/2004/10/rdf-
schema/L2PacketCiphering"/>
</rdfs:Class>

<rdfs:Class rdf:about="http://www.networkdiscovery.org/2004/10/rdf-schema/TKIP">
 <rdfs:subClassOf rdf:resource="http://www.networkdiscovery.org/2004/10/rdf-
schema/L2PacketCiphering"/>
</rdfs:Class>

<rdfs:Class rdf:about="http://www.networkdiscovery.org/2004/10/rdf-schema/CCMP">
 <rdfs:subClassOf rdf:resource="http://www.networkdiscovery.org/2004/10/rdf-
schema/L2PacketCiphering"/>
</rdfs:Class>

<rdfs:Class rdf:about="http://www.networkdiscovery.org/2004/10/rdf-
schema/L2KeyManagementProtocol">
 <rdfs:subClassOf rdf:resource="http://www.networkdiscovery.org/2004/10/rdf-
schema/L2Serurity"/>
 <rdfs:subClassOf rdf:resource="http://www.networkdiscovery.org/2004/10/rdf-
schema/L3KeyManagementMode"/>
</rdfs:Class>

<rdfs:Class rdf:about="http://www.networkdiscovery.org/2004/10/rdf-
schema/11i4WHS">
 <rdfs:subClassOf rdf:resource="http://www.networkdiscovery.org/2004/10/rdf-
schema/L2KeyManagementProtocol"/>
</rdfs:Class>

<rdfs:Class rdf:about="http://www.networkdiscovery.org/2004/10/rdf-schema/L2QoS">
```

FIG. 17(4)

```
 <rdfs:subClassOf rdf:resource="http://www.networkdiscovery.org/2004/10/rdf-
schema/L2info"/>
</rdfs:Class>

<rdfs:Class rdf:about="http://www.networkdiscovery.org/2004/10/rdf-schema/NSP">
 <rdfs:subClassOf rdf:resource="http://www.networkdiscovery.org/2004/10/rdf-
schema/L2info"/>
</rdfs:Class>

<rdfs:Class rdf:about="http://www.networkdiscovery.org/2004/10/rdf-
schema/NSPTariff">
 <rdfs:subClassOf rdf:resource="http://www.networkdiscovery.org/2004/10/rdf-
schema/NSP"/>
</rdfs:Class>

<rdf:Property rdf:about="http://www.networkdiscovery.org/2004/10/rdf-schema/nsp-
name">
 <rdfs:domain rdf:resource="http://www.networkdiscovery.org/2004/10/rdf-
schema/NSP"/>
 <rdfs:range rdf:resource="http://www.w3.org/2000/01/rdf-schema#Literal"/>
</rdf:Property>

<rdfs:Class rdf:about="http://www.networkdiscovery.org/2004/10/rdf-
schema/L2Mobility">
 <rdfs:subClassOf rdf:resource="http://www.networkdiscovery.org/2004/10/rdf-
schema/L2info"/>
</rdfs:Class>

<rdfs:Class rdf:about="http://www.networkdiscovery.org/2004/10/rdf-
schema/L2PreAuth">
 <rdfs:subClassOf rdf:resource="http://www.networkdiscovery.org/2004/10/rdf-
schema/L2Mobility"/>
</rdfs:Class>

<rdfs:Class rdf:about="http://www.networkdiscovery.org/2004/10/rdf-schema/802.11r">
 <rdfs:subClassOf rdf:resource="http://www.networkdiscovery.org/2004/10/rdf-
schema/L2Mobility"/>
</rdfs:Class>

<rdfs:Class rdf:about="http://www.networkdiscovery.org/2004/10/rdf-schema/802.21">
 <rdfs:subClassOf rdf:resource="http://www.networkdiscovery.org/2004/10/rdf-
schema/L2Mobility"/>
</rdfs:Class>

<rdfs:Class rdf:about="http://www.networkdiscovery.org/2004/10/rdf-schema/802.11u">
```

FIG. 17(5)

```
  <rdfs:subClassOf rdf:resource="http://www.networkdiscovery.org/2004/10/rdf-
schema/L2Mobility"/>
</rdfs:Class>

<rdfs:Class rdf:about="http://www.networkdiscovery.org/2004/10/rdf-schema/L3info">
  <rdfs:subClassOf rdf:resource="http://www.networkdiscovery.org/2004/10/rdf-
schema/Location"/>
</rdfs:Class>

<rdf:Property rdf:about="http://www.networkdiscovery.org/2004/10/rdf-
schema/network-address">
  <rdfs:domain rdf:resource="http://www.networkdiscovery.org/2004/10/rdf-
schema/L3info"/>
  <rdfs:range rdf:resource="http://www.w3.org/2000/01/rdf-schema#Literal"/>
</rdf:Property>

<rdf:Property rdf:about="http://www.networkdiscovery.org/2004/10/rdf-schema/domain-
name">
  <rdfs:domain rdf:resource="http://www.networkdiscovery.org/2004/10/rdf-
schema/L3info"/>
  <rdfs:range rdf:resource="http://www.w3.org/2000/01/rdf-schema#Literal"/>
</rdf:Property>

<rdf:Property rdf:about="http://www.networkdiscovery.org/2004/10/rdf-
schema/netmask">
  <rdfs:domain rdf:resource="http://www.networkdiscovery.org/2004/10/rdf-
schema/L3info"/>
  <rdfs:range rdf:resource="http://www.w3.org/2000/01/rdf-schema#Literal"/>
</rdf:Property>

<rdf:Property rdf:about="http://www.networkdiscovery.org/2004/10/rdf-schema/dhcp-
server-address">
  <rdfs:domain rdf:resource="http://www.networkdiscovery.org/2004/10/rdf-
schema/L3info"/>
  <rdfs:range rdf:resource="http://www.w3.org/2000/01/rdf-schema#Literal"/>
</rdf:Property>

<rdf:Property rdf:about="http://www.networkdiscovery.org/2004/10/rdf-schema/sip-
server-address">
  <rdfs:domain rdf:resource="http://www.networkdiscovery.org/2004/10/rdf-
schema/L3info"/>
  <rdfs:range rdf:resource="http://www.w3.org/2000/01/rdf-schema#Literal"/>
</rdf:Property>

<rdf:Property rdf:about="http://www.networkdiscovery.org/2004/10/rdf-schema/router-
address">
```

FIG. 17(6)

```
<rdfs:domain rdf:resource="http://www.networkdiscovery.org/2004/10/rdf-
schema/L3info"/>
 <rdfs:range rdf:resource="http://www.w3.org/2000/01/rdf-schema#Literal"/>
</rdf:Property>

<rdfs:Property rdf:about="http://www.networkdiscovery.org/2004/10/rdf-
schema/L3Protocol">
 <rdfs:domain rdf:resource="http://www.networkdiscovery.org/2004/10/rdf-
schema/L3info"/>
 <rdfs:range rdf:recource="http://www.networkdiscovery.org/2004/10/rdf-
schema/ProtocolClass">
</rdfs:Property>

<rdfs:Class rdf:about="http://www.networkdiscovery.org/2004/10/rdf-
schema/ProtocolClass">
 <rdfs:subClassOf rdf:resource="http://www.w3.org/2000/01/rdf-schema#Resource"/>
</rdfs:Class>

<nd:ProtocolClass rdf:about="http://www.networkdiscovery.org/2004/10/rdf-
schema/IPv4Class"/>
<nd:ProtocolClass rdf:about="http://www.networkdiscovery.org/2004/10/rdf-
schema/IPv6Class"/>
<nd:ProtocolClass rdf:about="http://www.networkdiscovery.org/2004/10/rdf-
schema/DualClass"/>

</rdf:RDF>

<rdfs:Class rdf:about="http://www.networkdiscovery.org/2004/10/rdf-
schema/L3Security">
 <rdfs:subClassOf rdf:resource="http://www.networkdiscovery.org/2004/10/rdf-
schema/L3info"/>
</rdfs:Class>

<rdfs:Class rdf:about="http://www.networkdiscovery.org/2004/10/rdf-
schema/L3ClientAuthentication">
 <rdfs:subClassOf rdf:resource="http://www.networkdiscovery.org/2004/10/rdf-
schema/L3Cecurity"/>
</rdfs:Class>

<rdfs:Class rdf:about="http://www.networkdiscovery.org/2004/10/rdf-schema/PANA">
 <rdfs:subClassOf rdf:resource="http://www.networkdiscovery.org/2004/10/rdf-
schema/L3ClientAuthentication"/>
</rdfs:Class>

<rdf:Property rdf:about="http://www.networkdiscovery.org/2004/10/rdf-schema/paa">
```

FIG. 17(7)

```
<rdfs:domain rdf:resource="http://www.networkdiscovery.org/2004/10/rdf-schema/PANA"/>
 <rdfs:range rdf:resource="http://www.w3.org/2000/01/rdf-schema#Literal"/>
</rdf:Property>

<rdf:Property rdf:about="http://www.networkdiscovery.org/2004/10/rdf-schema/ep">
 <rdfs:domain rdf:resource="http://www.networkdiscovery.org/2004/10/rdf-schema/PANA"/>
 <rdfs:range rdf:resource="http://www.w3.org/2000/01/rdf-schema#Literal"/>
 <rdfs:range rdf:resource="http://www.networkdiscovery.org/2004/10/rdf-schema/router-address"/>
 <rdfs:range rdf:resource="http://www.networkdiscovery.org/2004/10/rdf-schema/apid"/>
</rdf:Property>

<rdf:Property rdf:about="http://www.networkdiscovery.org/2004/10/rdf-schema/protection-capability">
 <rdfs:domain rdf:resource="http://www.networkdiscovery.org/2004/10/rdf-schema/PANA"/>
 <rdfs:range rdf:resource="http://www.networkdiscovery.org/2004/10/rdf-schema/ProtectionCapabitlityClass"/>
</rdf:Property>

<rdfs:Class rdf:about="http://www.networkdiscovery.org/2004/10/rdf-schema/ProtectionCapabilityClass">
 <rdfs:subClassOf rdf:resource="http://www.w3.org/2000/01/rdf-schema#Resource"/>
</rdfs:Class>

<nd:ProtectionCapabilityClass rdf:about="http://www.networkdiscovery.org/2004/10/rdf-schema/L2Class"/>
<nd:ProtectionCapabilityClass rdf:about="http://www.networkdiscovery.org/2004/10/rdf-schema/L3Class"/>

<rdfs:Class rdf:about="http://www.networkdiscovery.org/2004/10/rdf-schema/UAM">
 <rdfs:subClassOf rdf:resource="http://www.networkdiscovery.org/2004/10/rdf-schema/L3ClientAuthentication"/>
</rdfs:Class>

<rdfs:Class rdf:about="http://www.networkdiscovery.org/2004/10/rdf-schema/L3DataPacketCiphering">
 <rdfs:subClassOf rdf:resource="http://www.networkdiscovery.org/2004/10/rdf-schema/L3Cecurity"/>
</rdfs:Class>
```

FIG. 17(8)

```
<rdfs:Class rdf:about="http://www.networkdiscovery.org/2004/10/rdf-
schema/L2CipheringMode">
  <rdfs:subClassOf rdf:resource="http://www.networkdiscovery.org/2004/10/rdf-
schema/L3DataPacketCiphering"/>
</rdfs:Class>

<rdfs:Class rdf:about="http://www.networkdiscovery.org/2004/10/rdf-schema/IPsec">
  <rdfs:subClassOf rdf:resource="http://www.networkdiscovery.org/2004/10/rdf-schema/
L3DataPacketCiphering "/>
</rdfs:Class>

<rdfs:Class rdf:about="http://www.networkdiscovery.org/2004/10/rdf-
schema/L3KeyManagementProtocol">
 <rdfs:subClassOf rdf:resource="http://www.networkdiscovery.org/2004/10/rdf-
schema/L3Cecurity"/>
</rdfs:Class>

<rdfs:Class rdf:about="http://www.networkdiscovery.org/2004/10/rdf-schema/IKE">
 <rdfs:subClassOf rdf:resource="http://www.networkdiscovery.org/2004/10/rdf-
schema/L3KeyManagementProtocol"/>
</rdfs:Class>

<rdfs:Class rdf:about="http://www.networkdiscovery.org/2004/10/rdf-schema/IKEv2">
 <rdfs:subClassOf rdf:resource="http://www.networkdiscovery.org/2004/10/rdf-
schema/L3KeyManagementProtocol"/>
</rdfs:Class>

<rdfs:Class rdf:about="http://www.networkdiscovery.org/2004/10/rdf-schema/
L2KeyManagementProtocol ">
 <rdfs:subClassOf rdf:resource="http://www.networkdiscovery.org/2004/10/rdf-
schema/L3KeyManagementMode"/>
</rdfs:Class>

<rdfs:Class rdf:about="http://www.networkdiscovery.org/2004/10/rdf-schema/L3QoS">
 <rdfs:subClassOf rdf:resource="http://www.networkdiscovery.org/2004/10/rdf-
schema/L3info"/>
</rdfs:Class>

<rdfs:Class rdf:about="http://www.networkdiscovery.org/2004/10/rdf-schema/L3QoS">
 <rdfs:subClassOf rdf:resource="http://www.networkdiscovery.org/2004/10/rdf-
schema/L3info"/>
</rdfs:Class>

<rdfs:Class rdf:about="http://www.networkdiscovery.org/2004/10/rdf-schema/ISP">
```

FIG. 17(9)

```
<rdfs:subClassOf rdf:resource="http://www.networkdiscovery.org/2004/10/rdf-
schema/L3info"/>
</rdfs:Class>

<rdfs:Class rdf:about="http://www.networkdiscovery.org/2004/10/rdf-
schema/ISPTariff">
 <rdfs:subClassOf rdf:resource="http://www.networkdiscovery.org/2004/10/rdf-
schema/ISP"/>
</rdfs:Class>

<rdf:Property rdf:about="http://www.networkdiscovery.org/2004/10/rdf-schema/isp-
name">
 <rdfs:domain rdf:resource="http://www.networkdiscovery.org/2004/10/rdf-
schema/ISP"/>
 <rdfs:range rdf:resource="http://www.w3.org/2000/01/rdf-schema#Literal"/>
</rdf:Property>

<rdfs:Class rdf:about="http://www.networkdiscovery.org/2004/10/rdf-
schema/L3Mobility">
 <rdfs:subClassOf rdf:resource="http://www.networkdiscovery.org/2004/10/rdf-
schema/L3info"/>
</rdfs:Class>

<rdf:Property rdf:about="http://www.networkdiscovery.org/2004/10/rdf-schema/ha-
address">
 <rdfs:domain rdf:resource="http://www.networkdiscovery.org/2004/10/rdf-
schema/L3Mobility"/>
 <rdfs:range rdf:resource="http://www.w3.org/2000/01/rdf-schema#Literal"/>
 <rdfs:range rdf:resource="http://www.networkdiscovery.org/2004/10/rdf-schema/router-
address">
</rdf:Property>

<rdfs:Class rdf:about="http://www.networkdiscovery.org/2004/10/rdf-schema/FMIP">
 <rdfs:subClassOf rdf:resource="http://www.networkdiscovery.org/2004/10/rdf-
schema/L3Mobility"/>
</rdfs:Class>

<rdfs:Class rdf:about="http://www.networkdiscovery.org/2004/10/rdf-schema/CARD">
 <rdfs:subClassOf rdf:resource="http://www.networkdiscovery.org/2004/10/rdf-
schema/L3Mobility"/>
</rdfs:Class>

<rdfs:Class rdf:about="http://www.networkdiscovery.org/2004/10/rdf-schema/CT">
 <rdfs:subClassOf rdf:resource="http://www.networkdiscovery.org/2004/10/rdf-
schema/L3Mobility"/>
</rdfs:Class>
```

FIG. 17(10)

```
<rdfs:Class rdf:about="http://www.networkdiscovery.org/2004/10/rdf-
schema/L3PreAuth">
 <rdfs:subClassOf rdf:resource="http://www.networkdiscovery.org/2004/10/rdf-
schema/L3Mobility"/>
</rdfs:Class>

<rdfs:Class rdf:about="http://www.networkdiscovery.org/2004/10/rdf-schema/DNA">
 <rdfs:subClassOf rdf:resource="http://www.networkdiscovery.org/2004/10/rdf-
schema/L3Mobility"/>
</rdfs:Class>
```

FIG. 18(3) Local Triggers from lower layer (lower SAP)

- Link_going_down_indication (time, link_id)
- Link_going_down_response (time, link_id)
- Link_down_indication (link_id)
- Link_down_response (link_id)
- Link_up_indication(link_id)
- Link_up_response(link_id)
- Additional_link_available_indication (link_id)
- Additional_link_available_response (link_id)

Link_id is a structure (must have interface identification, L2 attachment)

Time is an absolute value (msec/sec/min)

FIG. 18(4)

Functional Primitives to/from lower layer (Lower SAP)

- Register_event_request(event_type, parameters)
- Register_event_confirm (event_type, parameters)
- Link_characteristics_request (delay, throughput, pkt_err, ....)
- Link_characteristics_confirm (delay, throughput, pkt_err, ....)
- Information_request (location_type, location_value, condition, ...)
- Information_confirm (......)
- Set_parameters_request (...)
- Set_parameters_confirm (...)
- Link_change_request (link_id)
- Link_change_confirm (link_id)

FIG. 18(5)

Functional Primitives to/from higher layer (Higher SAP)

- Register_event_request(event_type, parameters)
- Register_event_confirm (event_type, parameters)
- Pre_auth_request(Authentication_agent_address)
- Pre_auth_confirm (result, AP_id_list, AAA_key)
- Pre_config_request (configuration_agent)
- Pre_config_confirm (config_parameters)
- Handover_start_request (link_id, AR)
- Handover_start_confirm (link_id, AR)
- Handover_success_indication (link-id)
- Handover_success_response (link-id)
- Handover_faliure_indication (link-id)
- Handover_faliure_response (link-id)

FIG. 18(6)

Remote Functional Primitives (to and from Network)

- Event_request (event_type, parameters)
- Event_confirm (event_type, parameters)
- Event_indication (event_type, parameters)
- Event_response (event_type, parameters)
- Information_request (location_type, location_value, condition)
- Information_confirm (...)
- Information_indication (location_type, location_value, condition)
- Information_response (...)

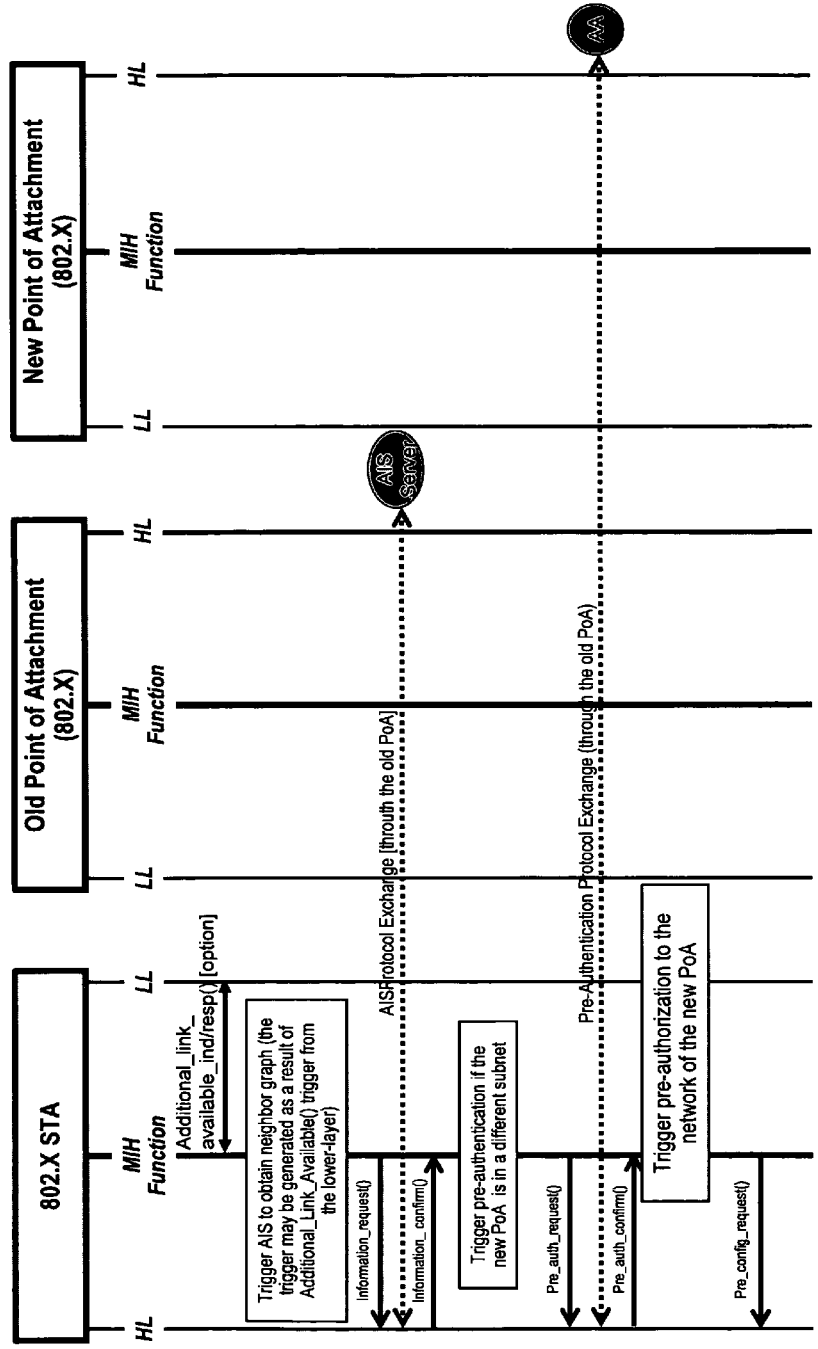
FIG. 18(7) 802.X to 802.X (Single I/F) Handover Call Flow

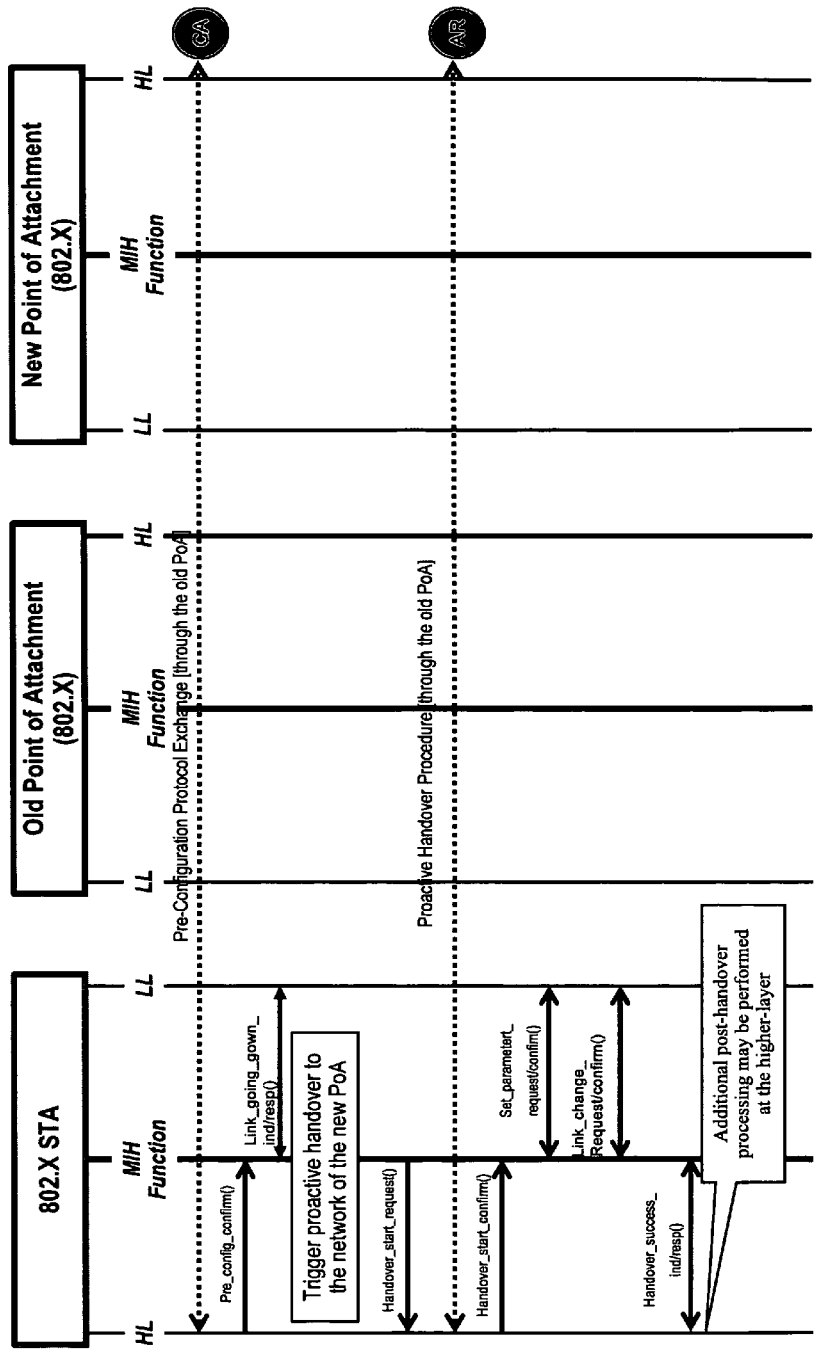
FIG. 18(8) 802.X to 802.X (Single I/F) Handover Call Flow (Cont'd)

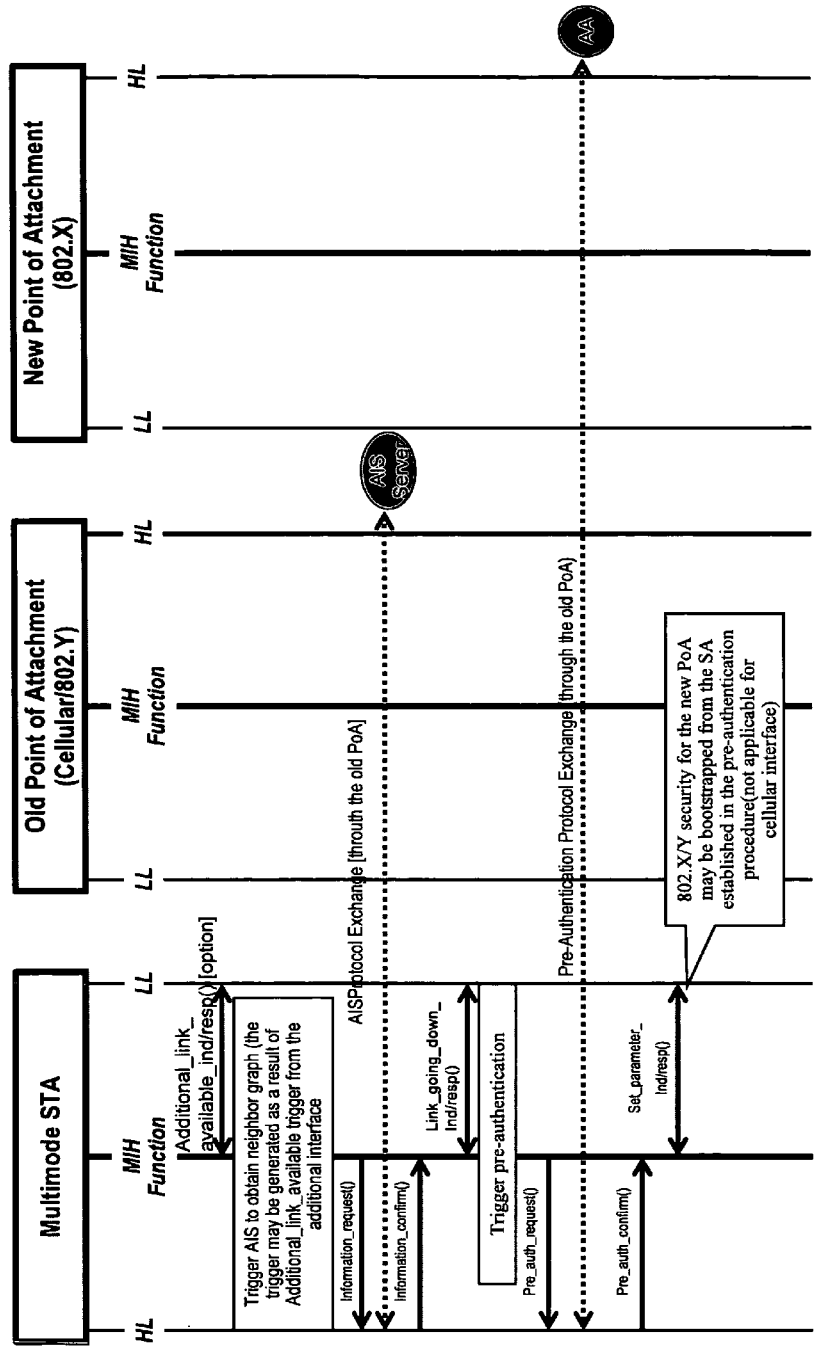
FIG. 18(9) Cellular/802.Y to/from 802.X Handover Call Flow

FIG. 18(11) Mapping Between MIH Function and 3GPP Primitives

| MIH Primitives | 3GPP Primitives |
|---|---|
| Link_going_down_indication/response | (CMAC_Measurement_REQ, CMAC_Measurement_CNF) |
| Link_down_indication/response | (CMAC_Measurement_REQ, CMAC_Measurement_CNF) or (CMAC_CONFIG_REQ, CMAC_CONFIG_CNF) |
| Link_up_indication/response | PHY_Access_CNF and/or (CMAC_CONFIG_REQ, CMAC_CONFIG_CNF) |
| Link_characteristics_request/confirm | CMAC_Measurement_REQ, CMAC_Measurement_CNF |

FIG. 18(12)

Mapping Between MIH Function and 802.11 Primitives

| MIH Primitives | 802.11 Primitives |
|---|---|
| Additional_link_available_indication/response | (MLME_JOIN.request, MLME_JOIN.confirm) |
| Link_going_down_indication/response | (PLME_CHARACTERISTICS.request, PLME_CHARACTERISTICS.confirm) |
| Link_down_indication/response | (MLME_DISASSOCIATE.request, MLME_DISASSOCIATE.confirm) or MLME_DISASSOCIATE.indication |
| Link_up_indication/response | (MLME_ASSOCIATE.request, MLME_ASSOCIATE.confirm) or MLME_ASSOCIATE.indication |
| Link_characteristics_request/confirm | PLME_CHARACTERISTICS.request, PLME_CHARACTERISTICS.confirm |

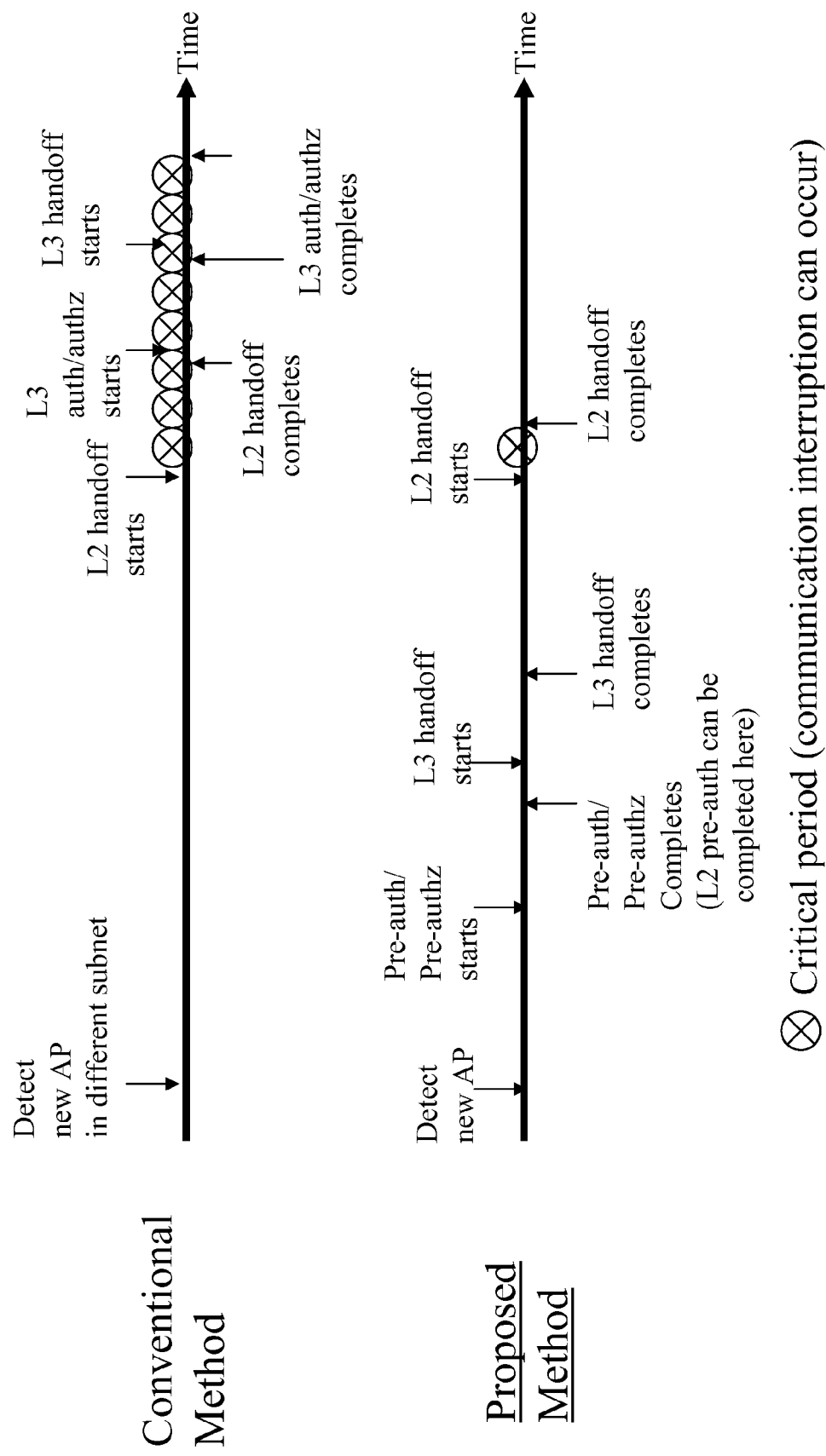

FIG. 21(1)

```
<rdf:RDF xml:lang="en" xmlns:rdf="http://www.w3.org/1999/02/22-rdf-
    syntax-ns#" xmlns:rdfs="http://www.w3.org/2000/01/rdf-schema#"
    xmlns:nd="http://www.networkdiscovery.org/2005/04/rdf-basic-
    schema/">

<rdfs:Class rdf:about="http://www.networkdiscovery.org/2005/04/rdf-basic-
    schema/Network">
  <rdfs:subClassOf rdf:resource="http://www.w3.org/2000/01/rdf-
    schema#Resource" />
  </rdfs:Class>

<rdfs:Class rdf:about="http://www.networkdiscovery.org/2005/04/rdf-basic-
    schema/L2info">
  <rdfs:subClassOf
    rdf:resource="http://www.networkdiscovery.org/2005/04/rdf-basic-
    schema/Network" />
  </rdfs:Class>

<rdfs:Class rdf:about="http://www.networkdiscovery.org/2005/04/rdf-basic-
    schema/L3info">
  <rdfs:subClassOf
    rdf:resource="http://www.networkdiscovery.org/2005/04/rdf-basic-
    schema/Network" />
  </rdfs:Class>

<rdfs:Class rdf:about="http://www.networkdiscovery.org/2005/04/rdf-basic-
    schema/Location">
  <rdfs:subClassOf
    rdf:resource="http://www.networkdiscovery.org/2005/04/rdf-basic-
    schema/L2info" />
  </rdfs:Class>

<rdf:Property rdf:about="http://www.networkdiscovery.org/2005/04/rdf-
    basic-schema/latitude">
  <rdfs:domain rdf:resource="http://www.networkdiscovery.org/2005/04/rdf-
    basic-schemay/Location" />
  <rdfs:range rdf:resource="http://www.w3.org/2000/01/rdf-schema#Literal" />
  </rdf:Property>

<rdf:Property rdf:about="http://www.networkdiscovery.org/2005/04/rdf-
    basic-schema/longitude">
  <rdfs:domain rdf:resource="http://www.networkdiscovery.org/2005/04/rdf-
    basic-schemay/Location" />
  <rdfs:range rdf:resource="http://www.w3.org/2000/01/rdf-schema#Literal" />
  </rdf:Property>

<rdf:Property rdf:about="http://www.networkdiscovery.org/2005/04/rdf-
    basic-schema/civic-addr">
  <rdfs:domain rdf:resource="http://www.networkdiscovery.org/2005/04/rdf-
    basic-schema/Location" />
```

FIG. 21(2)

```
  <rdfs:range rdf:resource="http://www.w3.org/2000/01/rdf-schema#Literal" />
  </rdf:Property>

- <rdfs:Class rdf:about="http://www.networkdiscovery.org/2005/04/rdf-basic-
    schema/AP-ID">
  <rdfs:subClassOf
    rdf:resource="http://www.networkdiscovery.org/2005/04/rdf-basic-
    schema/L2info" />
  </rdfs:Class>

-- <rdfs:Class rdf:about="http://www.networkdiscovery.org/2005/04/rdf-basic-
    schema/IPv4">
  <rdfs:subClassOf
    rdf:resource="http://www.networkdiscovery.org/2005/04/rdf-
    schema/L3info" />
  </rdfs:Class>

- <rdfs:Class rdf:about="http://www.networkdiscovery.org/2005/04/rdf-basic-
    schema/IPv6">
  <rdfs:subClassOf
    rdf:resource="http://www.networkdiscovery.org/2005/04/rdf-
    schema/L3info" />
  </rdfs:Class>
  </rdf:RDF>
```

FIG. 21(3)

EXTENDED SCHEMA

- <rdf:RDF xml:lang="en" xmlns:rdf="http://www.w3.org/1999/02/22-rdf-syntax-ns#" xmlns:rdfs="http://www.w3.org/2000/01/rdf-schema#" xmlns:nd="http://www.networkdiscovery.org/2005/04/rdf-extended-schema/">
- <rdfs:Class rdf:about="http://www.networkdiscovery.org/2005/04/rdf-extended-schema/802.11">
  <rdfs:subClassOf
     rdf:resource="http://www.networkdiscovery.org/2005/04/rdf-basic-schema/L2info" />
  </rdfs:Class>

- <rdfs:Class rdf:about="http://www.networkdiscovery.org/2005/04/rdf-extened-schema/802.16">
  <rdfs:subClassOf
     rdf:resource="http://www.networkdiscovery.org/2005/04/rdf-basic-schema/L2info" />
  </rdfs:Class>

- <rdfs:Class rdf:about="http://www.networkdiscovery.org/2005/04/rdf-extended-schema/GSM">
  <rdfs:subClassOf
     rdf:resource="http://www.networkdiscovery.org/2005/04/rdf-basic-schema/L2info" />
  </rdfs:Class>

- <rdfs:Class rdf:about="http://www.networkdiscovery.org/2005/04/rdf-exteneded-schema/GPRS">
  <rdfs:subClassOf
     rdf:resource="http://www.networkdiscovery.org/2005/04/rdf-basic-schema/L2info" />
  </rdfs:Class>

- <rdfs:Class rdf:about="http://www.networkdiscovery.org/2005/04/rdf-extended-schema/W-CDMA">
  <rdfs:subClassOf
     rdf:resource="http://www.networkdiscovery.org/2005/04/rdf-basic-schema/L2info" />
  </rdfs:Class>

- <rdfs:Class rdf:about="http://www.networkdiscovery.org/2005/04/rdf-exteneded-schema/cdma2000">
  <rdfs:subClassOf
     rdf:resource="http://www.networkdiscovery.org/2005/04/rdf-basic-schema/L2info" />
  </rdfs:Class>

<rdf:Property rdf:about="http://www.networkdiscovery.org/2005/04/rdf-extended-schema/802.11/bssid">

FIG. 21(4)

```xml
<rdfs:domain rdf:resource="http://www.networkdiscovery.org/2005/04/rdf-
    basic-schema/AP-ID" />
<rdfs:domain rdf:resource="http://www.networkdiscovery.org/2005/04/rdf-
    extended-schema/802.11" />
<rdfs:range rdf:resource="http://www.w3.org/2000/01/rdf-schema#Literal" />
    </rdf:Property>

- <rdf:Property rdf:about="http://www.networkdiscovery.org/2005/04/rdf-
    extended-schema/802.11/neighboring-bssid">
<rdfs:domain rdf:resource="http://www.networkdiscovery.org/2005/04/rdf-
    basic-schema/AP-ID" />
<rdfs:domain rdf:resource="http://www.networkdiscovery.org/2005/04/rdf-
    extended-schema/802.11" />
<rdfs:range rdf:resource="http://www.w3.org/2000/01/rdf-schema#Literal" />
    </rdf:Property>

<rdf:Property rdf:about="http://www.networkdiscovery.org/2005/04/rdf-
    extended-schema/standard">
<rdfs:domain rdf:resource="http://www.networkdiscovery.org/2005/04/rdf-
    extended-schema/802.11" />
<rdfs:range rdf:resource="http://www.networkdiscovery.org/2005/04/rdf-
    extended-schema/StandardClass" />
    </rdf:Property>
- <rdfs:Class rdf:about="http://www.networkdiscovery.org/2005/04/rdf-
    extended-schema/StandardClass">
<rdfs:subClassOf rdf:resource="http://www.w3.org/2000/01/rdf-
    schema#Resource" />
    </rdfs:Class>

<nd:StandardClass rdf:about="http://www.networkdiscovery.org/2005/04/rdf-
    extended-schema/802.11a" />
<nd:StandardClass rdf:about="http://www.networkdiscovery.org/2005/04/rdf-
    extended-schema/802.11b" />
<nd:StandardClass rdf:about="http://www.networkdiscovery.org/2005/04/rdf-
    extended-schema/802.11g" />

- <rdf:Property rdf:about="http://www.networkdiscovery.org/2005/04/rdf-
    extended-schema/ssid_network_name">
<rdfs:domain rdf:resource="http://www.networkdiscovery.org/2005/04/rdf-
    extended-schema/802.11" />
<rdfs:range rdf:resource="http://www.w3.org/2000/01/rdf-schema#Literal" />
    </rdf:Property>
-
<rdf:Property rdf:about="http://www.networkdiscovery.org/2005/04/rdf-
    extended-schema/channel">
<rdfs:domain rdf:resource="http://www.networkdiscovery.org/2005/04/rdf-
    extended-schema/802.11" />
<rdfs:range rdf:resource="http://www.w3.org/2000/01/rdf-schema#Literal" />
    </rdf:Property>
```

FIG. 21(5)

```xml
<rdf:Property rdf:about="http://www.networkdiscovery.org/2005/04/rdf-
    extended-schema/phy">
  <rdfs:domain rdf:resource="http://www.networkdiscovery.org/2005/04/rdf-
    extended-schema/802.11" />
  <rdfs:range rdf:resource="http://www.networkdiscovery.org/2005/04/rdf-
    extended-schema/PhyClass" />
</rdf:Property>

<rdfs:Class rdf:about="http://www.networkdiscovery.org/2005/04/rdf-
    extended-schema/PhyClass">
  <rdfs:subClassOf rdf:resource="http://www.w3.org/2000/01/rdf-
    schema#Resource" />
</rdfs:Class>
<nd:PhyClass rdf:about="http://www.networkdiscovery.org/2005/04/rdf-
    extended-schema/CCK" />
<nd:PhyClass rdf:about="http://www.networkdiscovery.org/2005/04/rdf-
    extended-schema/DSSS" />
<nd:PhyClass rdf:about="http://www.networkdiscovery.org/2005/04/rdf-
    extended-schema/DFDM" />

<rdf:Property rdf:about="http://www.networkdiscovery.org/2005/04/rdf-
    extended-schema/data_rates">
  <rdfs:domain rdf:resource="http://www.networkdiscovery.org/2005/04/rdf-
    extended-schema/802.11" />
  <rdfs:range rdf:resource="http://www.w3.org/2000/01/rdf-schema#Literal" />
</rdf:Property>

<rdf:Property rdf:about="http://www.networkdiscovery.org/2005/04/rdf-
    extended-schema/nsp_code">
  <rdfs:domain rdf:resource="http://www.networkdiscovery.org/2005/04/rdf-
    extended-schema/802.11" />
  <rdfs:range rdf:resource="http://www.w3.org/2000/01/rdf-schema#Literal" />
</rdf:Property>

<rdf:Property rdf:about="http://www.networkdiscovery.org/2005/04/rdf-
    extended-schema/nsp_name">
  <rdfs:domain rdf:resource="http://www.networkdiscovery.org/2005/04/rdf-
    extended-schema/802.11" />
  <rdfs:range rdf:resource="http://www.w3.org/2000/01/rdf-schema#Literal" />
</rdf:Property>

<rdf:Property rdf:about="http://www.networkdiscovery.org/2005/04/rdf-
    extended-schema/nsp_tariff">
  <rdfs:domain rdf:resource="http://www.networkdiscovery.org/2005/04/rdf-
    extended-schema/802.11" />
  <rdfs:range rdf:resource="http://www.w3.org/2000/01/rdf-schema#Literal" />
</rdf:Property>

<rdfs:Class rdf:about="http://www.networkdiscovery.org/2005/04/rdf-
    extended-schema/Cipher_Suites">
```

FIG. 21(6)

```xml
    <rdfs:subClassOf
        rdf:resource="http://www.networkdiscovery.org/2005/04/rdf-extended-
        schema/802.11" />
    </rdfs:Class>

- <rdfs:Class rdf:about="http://www.networkdiscovery.org/2005/04/rdf-
    extended-schema/WEP">
    <rdfs:subClassOf
        rdf:resource="http://www.networkdiscovery.org/2005/04/rdf-extended-
        schema/Cipher_Suites" />
    <rdfs:subClassOf
        rdf:resource="http://www.networkdiscovery.org/2005/04/rdf-extended-
        schema/Authenticated_Key_Management_Suites" />
    </rdfs:Class>

- <rdfs:Class rdf:about="http://www.networkdiscovery.org/2005/04/rdf-
    extended-schema/TKIP">
    <rdfs:subClassOf
        rdf:resource="http://www.networkdiscovery.org/2005/04/rdf-extended-
        schema/Cipher_Suites" />
    </rdfs:Class>

- <rdfs:Class rdf:about="http://www.networkdiscovery.org/2005/04/rdf-
    extended-schema/AES-CCMP">
    <rdfs:subClassOf
        rdf:resource="http://www.networkdiscovery.org/2005/04/rdf-extended-
        schema/Cipher_Suites" />
    </rdfs:Class>

- <rdfs:Class rdf:about="http://www.networkdiscovery.org/2005/04/rdf-
    extended-schema/Authenticated_Key_Management_Suites">
    <rdfs:subClassOf
        rdf:resource="http://www.networkdiscovery.org/2005/04/rdf-extended-
        schema/802.11" />
    </rdfs:Class>
-
<rdfs:Class rdf:about="http://www.networkdiscovery.org/2005/04/rdf-
    extended-schema/Psk">
    <rdfs:subClassOf
        rdf:resource="http://www.networkdiscovery.org/2005/04/rdf-extended-
        schema/Autheicated_Key_Management_Suites" />
    </rdfs:Class>

- <rdfs:Class rdf:about="http://www.networkdiscovery.org/2005/04/rdf-
    extended-schema/802.1x">
    <rdfs:subClassOf
        rdf:resource="http://www.networkdiscovery.org/2005/04/rdf-extended-
        schema/Autheicated_Key_Management_Suites" />
    </rdfs:Class>
```

FIG. 21(7)

```xml
<rdfs:Class rdf:about="http://www.networkdiscovery.org/2005/04/rdf-
    extended-schema/Key_Management_Protocol">
  <rdfs:subClassOf
    rdf:resource="http://www.networkdiscovery.org/2005/04/rdf-extended-
    schema/802.11" />
  </rdfs:Class>

<rdfs:Class rdf:about="http://www.networkdiscovery.org/2005/04/rdf-
    extended-schema/11i4WayHandshake">
  <rdfs:subClassOf
    rdf:resource="http://www.networkdiscovery.org/2005/04/rdf-extended-
    schema/Key_Management_Protocol" />
  </rdfs:Class>

<rdfs:Class rdf:about="http://www.networkdiscovery.org/2005/04/rdf-
    extended-schema/L2_Quality_of_Service">
  <rdfs:subClassOf
    rdf:resource="http://www.networkdiscovery.org/2005/04/rdf-extended-
    schema/802.11" />
  </rdfs:Class>

<rdfs:Class rdf:about="http://www.networkdiscovery.org/2005/04/rdf-
    extended-schema/802.11e">
  <rdfs:subClassOf
    rdf:resource="http://www.networkdiscovery.org/2005/04/rdf-extended-
    schema/L2_Quality_of_Service" />
  </rdfs:Class>

<rdf:Property rdf:about="http://www.networkdiscovery.org/2005/04/rdf-
    extended-schema/Cost">
  <rdfs:domain rdf:resource="http://www.networkdiscovery.org/2005/04/rdf-
    extended-schema/802.11" />
  <rdfs:range rdf:resource="http://www.w3.org/2000/01/rdf-schema#Literal" />
  </rdf:Property>

<rdf:Property rdf:about="http://www.networkdiscovery.org/2005/04/rdf-
    extended-schema/Roaming_List">
  <rdfs:domain rdf:resource="http://www.networkdiscovery.org/2005/04/rdf-
    extended-schema/802.11" />
  <rdfs:range rdf:resource="http://www.w3.org/2000/01/rdf-schema#Literal" />
  </rdf:Property>

<rdfs:Class rdf:about="http://www.networkdiscovery.org/2005/04/rdf-
    extended-schema/L2_Mobility">
  <rdfs:subClassOf
    rdf:resource="http://www.networkdiscovery.org/2005/04/rdf-extended-
    schema/802.11" />
  </rdfs:Class>

<rdfs:Class rdf:about="http://www.networkdiscovery.org/2005/04/rdf-
    extended-schema/802.11r">
```

FIG. 21(8)

```xml
    <rdfs:subClassOf
        rdf:resource="http://www.networkdiscovery.org/2005/04/rdf-extended-
        schema/L2_Mobility" />
    </rdfs:Class>

- <rdfs:Class rdf:about="http://www.networkdiscovery.org/2005/04/rdf-
    extended-schema/802.11u">
    <rdfs:subClassOf
        rdf:resource="http://www.networkdiscovery.org/2005/04/rdf-extended-
        schema/L2_Mobility" />
    </rdfs:Class>

- <rdfs:Class rdf:about="http://www.networkdiscovery.org/2005/04/rdf-
    extended-schema/802.21">
    <rdfs:subClassOf
        rdf:resource="http://www.networkdiscovery.org/2005/04/rdf-extended-
        schema/L2_Mobility" />
    </rdfs:Class>

- <rdfs:Class rdf:about="http://www.networkdiscovery.org/2005/04/rdf-
    extended-schema/L2PreAuth">
    <rdfs:subClassOf
        rdf:resource="http://www.networkdiscovery.org/2005/04/rdf-extended-
        schema/L2_Mobility" />
    </rdfs:Class>

- <rdf:Property rdf:about="http://www.networkdiscovery.org/2005/04/rdf-
    extended-schema/router_address">
    <rdfs:domain rdf:resource="http://www.networkdiscovery.org/2005/04/rdf-
        basic-schema/IPv4" />
    <rdfs:range rdf:resource="http://www.w3.org/2000/01/rdf-schema#Literal" />
    </rdf:Property>

- <rdf:Property rdf:about="http://www.networkdiscovery.org/2005/04/rdf-
    extended-schema/dhcp_server_address">
    <rdfs:domain rdf:resource="http://www.networkdiscovery.org/2005/04/rdf-
        basic-schema/IPv4" />
    <rdfs:range rdf:resource="http://www.w3.org/2000/01/rdf-schema#Literal" />
    </rdf:Property>

- <rdf:Property rdf:about="http://www.networkdiscovery.org/2005/04/rdf-
    extended-schema/domain_name">
    <rdfs:domain rdf:resource="http://www.networkdiscovery.org/2005/04/rdf-
        basic-schema/IPv4" />
    <rdfs:range rdf:resource="http://www.w3.org/2000/01/rdf-schema#Literal" />
    </rdf:Property>

- <rdf:Property rdf:about="http://www.networkdiscovery.org/2005/04/rdf-
    extended-schema/subnet">
    <rdfs:domain rdf:resource="http://www.networkdiscovery.org/2005/04/rdf-
        basic-schema/IPv4" />
```

FIG. 21(9)

```xml
<rdfs:range rdf:resource="http://www.w3.org/2000/01/rdf-schema#Literal" />
</rdf:Property>

- <rdf:Property rdf:about="http://www.networkdiscovery.org/2005/04/rdf-
    extended-schema/sip_server_address">
  <rdfs:domain rdf:resource="http://www.networkdiscovery.org/2005/04/rdf-
    basic-schema/IPv4" />
  <rdfs:range rdf:resource="http://www.w3.org/2000/01/rdf-schema#Literal" />
</rdf:Property>

- <rdfs:Class rdf:about="http://www.networkdiscovery.org/2005/04/rdf-
    extended-schema/Key_Management_Protocol">
  <rdfs:subClassOf
    rdf:resource="http://www.networkdiscovery.org/2005/04/rdf-basic-
    schema/IPv4" />
</rdfs:Class>

- <rdfs:Class rdf:about="http://www.networkdiscovery.org/2005/04/rdf-
    extended-schema/IKEv1">
  <rdfs:subClassOf
    rdf:resource="http://www.networkdiscovery.org/2005/04/rdf-extended-
    schema/Key_Management_Protocol" />
</rdfs:Class>

- <rdfs:Class rdf:about="http://www.networkdiscovery.org/2005/04/rdf-
    extended-schema/IKEv2">
  <rdfs:subClassOf
    rdf:resource="http://www.networkdiscovery.org/2005/04/rdf-extended-
    schema/Key_Management_Protocol" />
</rdfs:Class>

- <rdfs:Class rdf:about="http://www.networkdiscovery.org/2005/04/rdf-
    extended-schema/Authentication">
  <rdfs:subClassOf
    rdf:resource="http://www.networkdiscovery.org/2005/04/rdf-basic-
    schema/IPv4" />
</rdfs:Class>
- <rdfs:Class rdf:about="http://www.networkdiscovery.org/2005/04/rdf-
    extended-schema/PANA">
  <rdfs:subClassOf
    rdf:resource="http://www.networkdiscovery.org/2005/04/rdf-extended-
    schema/Authentication" />
</rdfs:Class>

- <rdf:Property rdf:about="http://www.networkdiscovery.org/2005/04/rdf-
    extended-schema/paa_address">
  <rdfs:domain rdf:resource="http://www.networkdiscovery.org/2005/04/rdf-
    extended-schema/PANA" />
  <rdfs:range rdf:resource="http://www.w3.org/2000/01/rdf-schema#Literal" />
</rdf:Property>
```

FIG. 21(10)

```xml
<rdf:Property rdf:about="http://www.networkdiscovery.org/2005/04/rdf-extended-schema/ep_address">
  <rdfs:domain rdf:resource="http://www.networkdiscovery.org/2005/04/rdf-extended-schema/PANA" />
  <rdfs:range rdf:resource="http://www.w3.org/2000/01/rdf-schema#Literal" />
</rdf:Property>

<rdfs:Class rdf:about="http://www.networkdiscovery.org/2005/04/rdf-extended-schema/UAM">
  <rdfs:subClassOf rdf:resource="http://www.networkdiscovery.org/2005/04/rdf-extended-schema/Authentication" />
</rdfs:Class>

<rdfs:Class rdf:about="http://www.networkdiscovery.org/2005/04/rdf-extended-schema/PacketCiphering">
  <rdfs:subClassOf rdf:resource="http://www.networkdiscovery.org/2005/04/rdf-basic-schema/IPv4" />
</rdfs:Class>

<rdfs:Class rdf:about="http://www.networkdiscovery.org/2005/04/rdf-extended-schema/IPsec">
  <rdfs:subClassOf rdf:resource="http://www.networkdiscovery.org/2005/04/rdf-extended-schema/PacketCiphering" />
</rdfs:Class>

<rdf:Property rdf:about="http://www.networkdiscovery.org/2005/04/rdf-extended-schema/isp_code">
  <rdfs:domain rdf:resource="http://www.networkdiscovery.org/2005/04/rdf-basic-schema/IPv4" />
  <rdfs:range rdf:resource="http://www.w3.org/2000/01/rdf-schema#Literal" />
</rdf:Property>

<rdf:Property rdf:about="http://www.networkdiscovery.org/2005/04/rdf-extended-schema/isp_name">
  <rdfs:domain rdf:resource="http://www.networkdiscovery.org/2005/04/rdf-basic-schema/IPv4" />
  <rdfs:range rdf:resource="http://www.w3.org/2000/01/rdf-schema#Literal" />
</rdf:Property>

<rdf:Property rdf:about="http://www.networkdiscovery.org/2005/04/rdf-extended-schema/isp_tariff">
  <rdfs:domain rdf:resource="http://www.networkdiscovery.org/2005/04/rdf-basic-schema/IPv4" />
  <rdfs:range rdf:resource="http://www.w3.org/2000/01/rdf-schema#Literal" />
</rdf:Property>

<rdfs:Class rdf:about="http://www.networkdiscovery.org/2005/04/rdf-extended-schema/L3_Mobility">
```

FIG. 21(11)

```xml
   <rdfs:subClassOf
      rdf:resource="http://www.networkdiscovery.org/2005/04/rdf-basic-
      schema/IPv4" />
   </rdfs:Class>

- <rdfs:Class rdf:about="http://www.networkdiscovery.org/2005/04/rdf-
     extended-schema/MIPv4">
   <rdfs:subClassOf
      rdf:resource="http://www.networkdiscovery.org/2005/04/rdf-extended-
      schema/L3_Mobility" />
   </rdfs:Class>

- <rdf:Property rdf:about="http://www.networkdiscovery.org/2005/04/rdf-
     extended-schema/mipv4_homeagent_address">
   <rdfs:domain rdf:resource="http://www.networkdiscovery.org/2005/04/rdf-
      extended-schema/MIPv4" />
   <rdfs:range rdf:resource="http://www.w3.org/2000/01/rdf-schema#Literal" />
   </rdf:Property>

- <rdf:Property rdf:about="http://www.networkdiscovery.org/2005/04/rdf-
     extended-schema/mipv4_foreignagent_address">
   <rdfs:domain rdf:resource="http://www.networkdiscovery.org/2005/04/rdf-
      extended-schema/MIPv4" />
   <rdfs:range rdf:resource="http://www.w3.org/2000/01/rdf-schema#Literal" />
   </rdf:Property>

- <rdfs:Class rdf:about="http://www.networkdiscovery.org/2005/04/rdf-
     extended-schema/CT">
   <rdfs:subClassOf
      rdf:resource="http://www.networkdiscovery.org/2005/04/rdf-extended-
      schema/L3_Mobility" />
   </rdfs:Class>

- <rdfs:Class rdf:about="http://www.networkdiscovery.org/2005/04/rdf-
     extended-schema/CARD">
   <rdfs:subClassOf
      rdf:resource="http://www.networkdiscovery.org/2005/04/rdf-extended-
      schema/L3_Mobility" />
   </rdfs:Class>

- <rdfs:Class rdf:about="http://www.networkdiscovery.org/2005/04/rdf-
     extended-schema/L3Preauth">
   <rdfs:subClassOf
      rdf:resource="http://www.networkdiscovery.org/2005/04/rdf-extended-
      schema/L3_Mobility" />
   </rdfs:Class>

- <rdfs:Class rdf:about="http://www.networkdiscovery.org/2005/04/rdf-
     extended-schema/L3_Quality_of_Service">
```

FIG. 21(12)

```
<rdfs:subClassOf
    rdf:resource="http://www.networkdiscovery.org/2005/04/rdf-basic-
    schema/IPv4" />
</rdfs:Class>

- <rdf:Property rdf:about="http://www.networkdiscovery.org/2005/04/rdf-
    extended-schema/vpn_gateway_address">
<rdfs:domain rdf:resource="http://www.networkdiscovery.org/2005/04/rdf-
    basic-schema/IPv4" />
<rdfs:range rdf:resource="http://www.w3.org/2000/01/rdf-schema#Literal" />
</rdf:Property>
</rdf:RDF>
```

NETWORK DISCOVERY MECHANISMS

FIELD OF THE INVENTION

The present application relates to, inter alia, methods for network discovery mechanisms, including, e.g., methods for network discovery mechanisms for secure fast handoff and the like. The present application claims priority under 35 U.S.C. 119 to each of the following U.S. Provisional Patent Applications: 1) Ser. No. 60/625,106, filed on Nov. 5, 2004, entitled Network Discovery Mechanism For Secure Fast Handoff; 2) Ser. No. 60/593,377, filed on Jan. 9, 2005, entitled Network Discovery Mechanisms; 3) Ser. No. 60/670,655, filed on Apr. 13, 2005, entitled Network Discovery Mechanisms; and 4) Ser. No. 60/697,589, filed on Jul. 11, 2005, entitled RDF Schema Update for 802.1 Baseline Document—the entire disclosures of each of the foregoing four provisional patent applications to which priority is claimed are incorporated herein in their entireties. In addition, the entire disclosures of each of the following co-pending patent applications of the present assignee are incorporated herein by reference for background: U.S. patent application Ser. No. 10/761,243 entitled Mobility Architecture Using Pre-Authentication, Pre-Configuration and/or Virtual Soft-Handoff, filed on Jan. 22, 2004.

BACKGROUND DISCUSSION

Networks and Internet Protocol:

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier. IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. The layers of the OSI model are listed below. Layer 7 (i.e., the application layer) is a layer at which, e.g., communication partners are identified, quality of service is identified, user authentication and privacy are considered, constraints on data syntax are identified, etc. Layer 6 (i.e., the presentation layer) is a layer that, e.g., converts incoming and outgoing data from one presentation format to another, etc. Layer 5 (i.e., the session layer) is a layer that, e.g., sets up, coordinates, and terminates conversations, exchanges and dialogs between the applications, etc. Layer-4 (i.e., the transport layer) is a layer that, e.g., manages end-to-end control and error-checking, etc. Layer-3 (i.e., the network layer) is a layer that, e.g., handles routing and forwarding, etc. Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery. Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (e.g., outside mobile IP), routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

The preferred embodiments improve upon technologies described, e.g., in the following references, each of which is incorporated herein by reference in its entirety:

[1] Sun Microsystems, Jini Connection Technology.
[2] Sun Microsystems, Jini Community Resources: Jini Technology Architectural Overview, January 1999.
[3] Sun Microsystems, Jini Community Resources: Jini Specification v1.0.1.
[4] W. Keith Edwards, Core JINI, The Sun Microsystems Press Java Series, Prentice Hall, 1999.
[5] Microsoft Corporation, Universal Plug and Play: Background.
[6] Microsoft Corporation, Universal Plug and Play Device Architecture Version 1.0, Jun. 8, 2000.
[7] Yaron Y. Goland, Ting Cai, Paul Leach, Ye Gu, and Shivaun Albright, Simple Service Discovery Protocol, IETF Draft draft-cai-ssdp-v1-03.txt, Oct. 28, 1999.
[8] Salutation Consortium, Salutation Architecture Specification Version 2.0c. Part 1, The Salutation Consortium, Jun. 1, 1999.
[9] Salutation Consortium, Salutation Architecture Specification Version 2.0c. Part 2, The Salutation Consortium, Jun. 1, 1999.
[10] Bob Pascoe, .Salutation-Lite: Find-and-Bind Technologies for Mobile Devices, Salutation. Consortium, Jun. 6, 1999.
[11] Brent Miller, .Mapping Salutation Architecture APIs to Bluetooth Service Discovery Layer. Bluetooth Consortium 1.C.118/1.0, Jul. 1, 1999.
[12] Bob Pascoe, Salutation Architectures and the newly defined service discovery protocols from Microsoft and Sun, Salutation Consortium, Jun. 6, 1999.
[13] Ryan Troll, Automatically Choosing an IP Address in an Ad-Hoc IPv4 Network, IETF Draft draftietf-dhc-ipv4-autoconfig-05.txt, Mar. 2, 2000.
[14] Bluetooth Consortium, .Specification of the Bluetooth System Core Version 1.0 B: Part E, Service Directory Protocol (SDP), Nov. 29, 1999.
[15] Bluetooth Consortium, Specification of the Bluetooth System Profiles Version 1.0 B: Part K-2, Service Discovery Application Profile. Dec. 1, 1999.
[16] IETF SVRLOC Working Group, Service Location Protocol Home Page.

[17] E. Guttman, C. Perkins, J. Veizades, and M. Day, .Service Location Protocol, Version 2,. IETF RFC 2608, June 1999.
[18] E. Guttman, C. Perkins, and J. Kempf, Service Templates and Service: Schemes, IETF RFC 2609, June 1999.
[19] Rekesh John, UPnP, Jini and Salutation, A look at some popular coordination frameworks for future networked devices, California Software Labs, Jun. 17, 1999.
[20] IETF ZEROCONF Working Group, Zero Configuration Networking (zeroconf).
[21] INS: Intentional Naming System.
[22] The Berkeley Service Discovery Service.
[23] R. Droms, Dynamic Host Configuration Protocol, IETF RFC 2131, March 1997.
[24] Sun Microsystems, Java 2 Platform Midcro Edition (J2ME) Technology for Creating Mobile Devices, White Paper, May 19, 2000.
[25] World Wide Web Consortium, Extensible Markup Language (XML).
[26] Marco Liebsch and Ajoy Singh (editors), "Candidate Access Router Discovery", Internet Draft draft-ietf-seamoby-card-protocol-06.txt, Internet Engineering Task Force, June 2004.
[27] J. Hodges and R. Morgan, "Lightweight Directory Access Protocol (v3): Technical Specification", IETF RFC 3377, September 2002.
[28] M. Liebsch, A. Singh, H. Chaskar, D. Funato and E. Shim, "Candidate Access Router Discovery," Internet-Draft, work in progress, June 2004.
[29] K. Arabshian and H. Schulzrinne, "GloServ: Global Service Discovery Architecture," First International Conference on Mobile and Ubiquitous Systems: Networking and Services.

SUMMARY OF THE INVENTION

The present invention improves upon the above and/or other background technologies and/or problems therein.

According to some of the preferred embodiments, to, for example, reduce delay and transient data loss in real-time secure roaming/handoff either between the same types or between heterogeneous access networks, proactive handoff mechanisms such as secure pre-authentication can be used. Pre-authentication involves, for example, performing authentication with a network before a mobile moves into the network. To achieve secure pre-authentication with a target neighboring network, a mobile should obtain information, e.g., an IP address, from the target network when the mobile is still outside the target network and then should establish a security association with, for example, an authentication agent in the target network (such as, e.g., a PANA authentication agent). To do this, the mobile should discover the parameters of various network elements in the target network ahead of time so that the mobile can communicate with these network elements to establish proactive security associations. This document describes, among other things, a number of approaches for a mobile to discover the network elements in target networks before moving into these target networks. This document also describes, among other things, how, e.g., network discovery can help provide fast-handoff using secure pre-authentication and proactive IP address acquisition.

According to some embodiments, a method for network discovery of a mobile device to use at least one of a plurality of access networks within an IP network includes: obtaining specified network information in the vicinity of a given location based on a set of criteria when a mobile is connected to the IP network from any location.

In some examples, the network information includes information used by the mobile to access the access networks. In some examples, the information includes network attachment point identification of an access point. In some examples, the information includes a security type supported by an access point. In some examples, the information includes a layer 3 type. In some examples, the information includes a provider name. In some examples, the information includes addresses of servers or agents. In some examples, the information includes addresses of authentication agents. In some examples, the information includes addresses of access routers.

According to some embodiments, a method for the discovery of network information of a target network by a mobile device includes: a) dynamically constructing at least one discovery database of network information; and b) using the at least one discovery database to provide network information about the target network before the mobile device is connected to the target network.

In some examples, the method employs an Application-layer mechanism for Information Service (AIS). In some examples, the method is used to discover information used by the mobile device for handoff and pre-authentication. In some examples, the method employs an AIS that is layer 2 independent. In some examples, the method uses network-assisted discovery mechanisms. In some examples, the method uses mobile-assisted discovery mechanisms. In some examples, the method uses network-assisted mechanisms for constructing the database. In some examples, the method uses mobile-assisted mechanisms for constructing the database. In some examples, the mobile queries an AIS server or a peer mobile to obtain information regarding networking elements in the target network. In some examples, the method further includes using reporting agents (RAs) to obtain the information. In some examples, the method further includes using AAA servers to obtain the information. In some examples, the method further includes using DNS servers to obtain the information. In some examples, the method employs a peer-to-peer model in which mobile devices serve as information servers. In some examples, the method employs a scoped multicast approach. In some examples, the method employs a recursive broadcast approach.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 1 is a view illustrating, among other things, architecture of Jini Connection Technology;

FIG. 2 is a view of an UPnP protocol stack;

FIG. 3 is a view showing a model of the salutation manager;

FIG. 4 is a view showing collaborative discovery of local services and network capabilities;

FIG. 5 is a view showing populating a database using Reporting Agents (RAs);

FIG. 6 is a view showing protocol flow for network service discovery;

FIG. 7 is a view showing an example of geo-coordinate based network service discovery;

FIG. 8 is a view showing an example of AP's MAC Address based network service discovery;

FIG. 9 is a view showing peer-to-peer-based Network Discovery;

FIG. 10 is a view showing Scoped-based Multicast;

FIG. 11 is a view showing Recursive Broadcast FIG. 12 is a view showing Integration of Network Discovery and Secure Seamless handoff;

FIG. 13 is a view showing an Example Integrated Flow (Network Discovery+Pre-authentication);

FIG. 14 is a view showing Network Discovery and Pre-auth Flow Diagram;

FIG. 15 is a view showing interaction between different components of database engines;

FIGS. 17(1)-17(10) are views showing illustrative and non-limiting RDF schema for Network Discovery that uses XML format.

FIGS. 21(1)-21(2) show a basic schema represented in RDF/XML format.

FIGS. 21(3)-21(12) show an extended schema represented in RDF/XML format.

DISCUSSION OF THE PREFERRED EMBODIMENTS

Figure 16A:
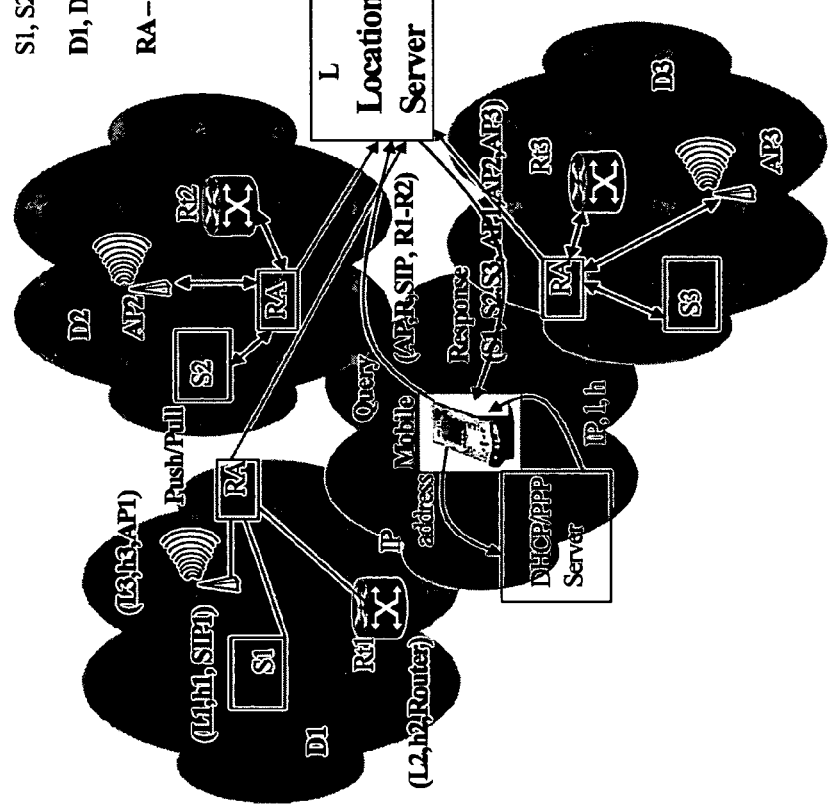
FIGS. 16(A)-(C) are views related to a demo system.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

3 Introduction

In the evolution of wireless networking based on wireless LAN (Local Area Network) and cellular technologies, and as mobility services prevail and people become increasingly mobile, it is more important for a mobile device to be able to find an appropriate point of network attachment that meets the application requirements and the characteristics of the mobile, in a timely, accurate and efficient manner. We refer to such functionality as network discovery.

The network discovery problem discussed in this document is formalized as: Obtaining specified network information in the vicinity of a given location based on a set of criteria when a mobile is connected to the IP network from any location. Here, Network information can be any information that a mobile uses to access networks. Such information includes, for example, a network attachment point identification (e.g., an L2 address and/or a geographical address of an access point), a MAC type (e.g., "IEEE 802.11g") of an access point, a security type (e.g., "WPA" or "PANA and IPsec") supported by an access point, a layer-3 type (e.g., "IPv4 only" or "IPv4/v6 dual stack"), a provider name, or the addresses of a server or an agent (e.g., PANA authentication agents, access routers, SIP servers and Mobile IP home agents).

The location of a mobile or the location which the mobile wants to find information about may be identified (expressed) in different ways. For example, it may be identified by the geographical position, by the identification of the network, or by the addresses of the wireless access points or IP access routers in the networks.

The functionality to discover network information can be used to better support mobility and mobile services. For example, to reduce interruptions to on-going application sessions during a handoff, a mobile device could perform pre-authentication with a target network before it starts the handoff into the target network. To do so, the mobile will need information about the neighboring networks, such as the address of the authentication server in the target network, before the mobile moves into the target network. We will refer to the process in which a mobile discovers information about its neighboring networks as network neighborhood discovery.

An important problem in network discovery is the discovery database construction problem: how to construct a database of network information in an automated, dynamic and efficient way? Solving this problem is not trivial in a multi-provider environment where a network provider may not be willing to disclose any network information of its own network to other network providers that compete with it, while it may provide detailed network information of its own network to its subscribers for better services. However, there has been no practical solution to solve this problem.

There are many protocols designed for service discovery (See Section 2). However, none of those protocols provides support for Discovering information about neighboring networks Dynamic construction of the discovery databases Determining what information to collect and provide to mobiles.

Instead, the existing service discovery mechanisms focus on how to retrieve information already existing in databases. They rely on all local network providers to implement service information servers, which is too strict to be deployed in public networks.

This document describes a new architecture to support network discovery including methods to solve the discovery database construction problem and methods for mobiles to discover information regarding neighboring networks. The proposed architecture is referred to as Application-layer mechanisms for Information Service (AIS). AIS is designed to be extensible enough to support current and future types of network information that may be needed by mobiles. AIS leverages existing protocols as much as possible. Although information about the network elements can have multiple usages, we focus on discovering the information a mobile can use to enable proactive handoff and secured pre-authentication and discuss how these information can be used to support secured and proactive handoff.

4 Related Work

Several service discovery protocols and architectures exist today including SLP, JINI, UPnP, Salutation, and LDAP. However, they focus mostly on how a user retrieves service-related information assuming that the information is already available in the databases. The service-related information and hence the servers used to host the information can be organized into a hierarchy, for example, in a way similar to the Internet Domain Name System (DNS). The service-related information can be pre-configured or dynamically on the servers. The information can then be updated either by human administrators or automatically by servers themselves exchanging updates with each other.

When the network size and the user population grow, pre-configuring information to advertise will not be a scalable solution regardless of whether service-related information or network information is advertised. Requiring servers to automatically populate and update the network information also have several limitations, including the following:

- The network information that each mobile device wishes to know can vary significantly depending on the capabilities and applications of the mobile device. For example, some mobile devices may wish to know the addresses of the DHCP server or the address of the authentication server in a neighboring network so that the mobile can acquire an IP address from the neighboring network and perform pre-authentication with the neighboring network before it needs to handoff into the neighboring network. Other mobile users may only wish to know the available local services. It is difficult for a network provider to foresee what information will be needed by a large number of diversified current and future users. As result, it is difficult for a network provider to determine what information to maintain in the information servers.
- Mobile users will need to rely on local network providers to provide the information servers. It is difficult to expect that all network providers everywhere around the world will provide such information servers. Furthermore, different network providers may choose to provide different sets of information.
- None of the many service discovery protocols available today seems to be a clear winner that is flexible enough to handle the diversified and changing services and network information needed by the mobile users. As a result, different network providers may use different service discovery protocols. This means that users may have to use different service discovery protocols in different networks, which is a heavy burden for users.

Recently, some efforts have been underway to design discovery protocols that are specifically used to support network neighborhood discover. A representative example is the Candidate Access Router Discovery (CARD) protocol [28]. A candidate access router is an access router in a neighboring network to which the mobile device may move into. CARD is designed to be used by a mobile device to discover a candidate access router, before the mobile performs IP-layer handoff into the neighboring network, in order to support seamless IP-layer handoff. With CARD, a mobile listens to layer-2 identifiers such as IEEE 802.11 BSSIDs broadcast from the radio Access Points (APs) in neighboring networks prior to making a decision about IP-layer handoff. The mobile then sends these layer-2 identifiers to the access router in its current network, which will in turn map the layer-2 identifiers the IP addresses of the candidate access routers in the neighboring network and then send the candidate router addresses back to the mobile. Using CARD to support network neighborhood discovery leads to the following limitations:

- CARD requires neighboring access routers to communicate with each other dynamically to exchange capability information. This is typically impossible when neighboring networks belong to different network providers.
- To discover target access routers, a mobile has to use CARD to communicate with its current access router. It will be difficult to expect all access networks around the world to implement CARD.
- The information a user can discover using CARD depends on what information a local network provider configures its CARD protocol to provide and can vary significantly from network to network. Furthermore, as discussed above, a network provider may not provide the right information needed by a mobile because the network provider cannot easily foresee the diversified and changing needs of the networking software and applications on every mobile device.

More recently IEEE 802.11 TGu (Task Group U) has been looking into methods by which it can provide more upper layer information as part of layer-2 beacons. This way as the mobile monitors the beacons from the neighboring networks passively; it can determine other layer 3 information. But because of the maximum transmission unit size limit all the layer-3 information may not be accommodated as part of layer-2 beacons. It may also be difficult to support multiple heterogeneous access technologies. Thus it is important to have a solution that is layer-2 agnostic and can work over multiple heterogeneous access. As part of this proposal we have come up with an application-layer network neighborhood discovery process to find out different parameters such as IP address, QoS (Quality of Service) and security parameters of the neighboring networks.

4.2 Survey of Existing Service Discovery Mechanisms

With the emergence of wireless ad-hoc networks, specialized information appliances are taking over the technology landscape. These information appliances have been born to aim at supporting mobility, in essence, and hence cooperation among them, since cooperation is an indispensable feature that complements some missing parts in mobile device, compared to conventional, fully-powered computing devices. For this cooperation, several service discovery protocols (SDPs) have been proposed as the part of coordination architectures that ensure device interaction with the ultimate aim of simple, seamless and scaleable device inter-operability. Among emerging SDPs, Jini, Universal Plug and Play, Salutation, and SLP are conspicuous.

3.3.1 JINI Connection Technology

The purpose of the Jini architecture is to federate groups of devices and software components into a single, dynamic distributed system [2]. Jini systems provide mechanisms for service construction, lookup, communication, and use in a distributed system. Examples of services include devices such as printers, displays, or disks; software such as applications or utilities; information such as database and files; and users of the system.

The heart of the Jini system is a trio of protocols called discovery, join, and lookup [2]. A pair of these protocols, i.e., discovery and join, occurs when a device is plugged in. Discovery occurs when a service is looking for a lookup service with which to register. Join occurs when a service has located a lookup service and wishes to join it. Lookup occurs when a client or user needs to locate and invoke a service described by its interface type (written in the Java programming language) and possibly, other attributes. The following steps show what interactions are needed among a client, a service provider, and a lookup service for a service to be used by the client in a Jini community [2] [1].

1) A service provider locates a lookup service by multicasting a request on the local network or a remote lookup service known to it in priori.

2) The service provider registers a service object and its service attributes with the lookup service. This service object contains Java programming language interface for the service, including the methods that users and applications will invoke to execute the service, along with any other descriptive attributes.

3) A client requests a service by Java type and, perhaps, other service attributes. A copy of the service object is moved to the client and used by the client to talk to the service.

4) Then, the client interacts directly with the service provider via the service object.

Jini connection technology consists of an infrastructure and a programming model which address the fundamental issues of how devices connect with each other to form an impromptu community. Based on Java technology as shown in FIG. 1 [2], Jini technology uses Java Remote Method Invocation protocols to move code around the network. Network services run on top of the Jini software architecture. In this regard, FIG. 1 shows Architecture of Jini Connection Technology.

a. Lookup Service

The lookup service can be viewed as a directory service, in that services are found and resolved through it. In a Jini community, services register their proxy objects with a lookup service through discovery and join process, and clients query the lookup service to find out the services they want. Jini uses three related discovery protocols, useful in different situation [3] [4]. Multicast Request Protocol is used when an application or service first becomes active, and needs to find lookup services in the vicinity. Multicast Announcement Protocol is used by lookup services to announce their presence to the services that may have interest in the community. Unicast Discovery Protocol is used to establish communications with a specific lookup service known to it in priori over a wide-area network.

But a Jini lookup service does much more than a simple name server. A client sees a service as an interface, including methods that the client will invoke to execute the service, along with any other descriptive attributes. The lookup service maps interfaces seen by the client to set of service proxy objects. The client downloads the service proxy, which is actually RMI stub that can communicate back with the server. This proxy object enables the client to use the service without knowing anything about it. Hence, there is no need for device driver scenario. Although service proxy object is typical scenario of service invocation, i.e., accessing services through RMI method invocation, the downloaded service object can be the service itself or a smart object capable of speaking any private communication protocol.

b. Leasing

Access to services in the Jini system is granted on lease basis: A service is requested for a time period and, then, granted for negotiated period between the service user and provider. This lease must be renewed before its expiration. Otherwise, the resources associated with the services are released. For the example, the lookup service grants lease to a service registration and the service should continue to renew the lease. A device can leave the community or fail abruptly without having a chance to deregister itself. So, it is the leasing that enables the Jini system to be kept robust and maintenance-free.

c. Remote Events and Transactions

Besides the basic service discovery/join and lookup mechanism, Jini supports remote events and transactions that help programmers write distributed programs in reliable and scalable fashion. Remote event enables an object to be notified when desired change occurs in the system. These events can be triggered by newly-published services or some state changes of services. For example, a Jini palmtop that registered its interest in printers can be notified by the lookup service, when a printer becomes available. Also, Jini supports two-phase commit (2PC) protocol. By nature, Jini is used to build distributed systems where reliability and robustness are likely to get impaired by partial failures and recovery. But Jini 2PC allows flexibility, in that it does not dictate this protocol to be followed strictly. Rather, it is being left to applications (transaction participants) to implement necessary actions intended by the application logic.

3.3.1 UPnP (Universal Plug and Play)

Universal Plug and Play (UPnP) [6] is architecture for pervasive peer-to-peer network connectivity of intelligent appliances, wireless devices, and PCs of all form factors. Although it's introduced as an extension to the plug and play peripheral model, UPnP is more than a simple extension to it. In UPnP, a device can dynamically join a network, obtain an IP address, convey its capabilities upon request, and learn about the presence and capabilities of other devices. Finally, a device can leave a network smoothly and automatically without leaving any unwanted state behind [6]. Universal Plug and Play leverages TCP/IP and the Web technologies, including IP, TCP, UDP, HTTP and XML, to enable seamless proximity networking in addition to control and data transfer among networked devices in the home and office.

UPnP uses Simple Service Discovery Protocol (SSDP) [7] for service discovery. This protocol is used for announcing a device's presence to others as well as discovering other devices or services. Therefore, SSDP is analogous to the trio of protocols in Jini: discovery, join, and lookup. SSDP uses HTTP over multicast and unicast UDP which are referred to as HTTPMU and HTTPU, respectively.

A joining device sends out an advertisement (ssdp:alive) multicast message to advertise its services to control points. They are the potential clients of services embedded into the device. In contrast to Jini, there is no central service registry in UPnP. The other message of SSDP is search (ssdp:discover) multicast message sent when a new control point is added to the network. Any device that hears this multicast should respond to it with a unicast response message.

XML is used to describe device features and capabilities. The aforementioned advertisement message contains a URL that points to an XML file in the network, describing the UPnP device's capability. Hence other devices, by retrieving this XML file, can inspect the features of this device and decide whether it fits their purposes. This XML description allows complex, powerful description of device capability as opposed to Jini's simple service attribute.

FIG. 2 shows an illustrative UPnP Protocol Stack. For communication between devices, UPnP uses the protocol stack shown in FIG. 2. According to the latest specification [6], UPnP features can be epitomized as the following five steps.

Discovery:

The UPnP discovery protocol is based on SSDP. When a device added to the network, the device advertises its services to the control points on the network. Similarly, when a control point is added to the network, the UPnP allows that control point to search for devices of interest on the network. The fundamental exchange in both cases is a discovery message containing a few, essential specifics about the device or one of its services, e.g., its type, identifier, and a pointer to more detailed information.

Description:

After a control point has discovered a device, the control point still knows very little about the device. For the control point to learn more about the device and its capabilities, or to interact with the device, the control point must retrieve the device's description from the URL provided by the device in the discovery message. The UPnP description for a device is expressed in XML and includes a list of any embedded devices or service, as well as URLs for control, eventing, and presentation.

Control:

After a control point has retrieved a description of the device, the control point can send actions to a device's service. To do this, a control point sends a suitable control message to the control URL for the service. Control messages are also expressed in XML using the Simple Object Access Protocol (SOAP). Like function calls, in response to the control message, the service returns any action-specific values.

Eventing:

An UPnP description for a service includes a list of actions the service responds to and a list of variables that model the state of the service at run time. The service publishes updates when these variables change, and a control point may subscribe to receive this information. The service publishes updates by sending event messages. Event messages contain the names of one of more state variables and the current value of those variables. These messages are also expressed in XML and formatted using the General Event Notification Architecture (GENA).

Presentation:

If a device has a URL for presentation, then the control point can retrieve a page from this URL, load the page into a browser, and depending on the capabilities of the page, and allow a user to control the device and/or view device status.

Another important feature of UPnP is automatic configuration of IP addresses being plugged in. Being introduced for this purpose, AutoIP [13] enables a device to join the network without any explicit administration. When a device is connected to the network, it tries to acquire an IP address from a DHCP server on the network. But in the absence of a DHCP server, an IP address is claimed automatically from a reserved range for the local network use. So, named as AutoIP. The device claims an address by randomly choosing an address in the reserved range and then making an ARP request to see if anyone else has already claimed that address.

3.3.1 Salutation

Salutation is another major cooperation architecture, which is being developed by the Salutation Consortium, to solve the problems of service discovery and utilization among a broad set of appliances and equipment and in an environment of widespread connectivity and mobility. Given the diverse nature of target devices, it is processor, operating system and communication protocol independent. The architecture provides a standard method for applications, services and devices to describe and to advertise their capabilities to other applications, services and devices. The architecture also enables application, services and devices to search other applications, services or devices for a particular capability, and to request and establish interoperable sessions with them to utilize their capabilities [8] [9].

As shown in FIG. 3, the Salutation architecture is composed of two major components: Salutation Manager and Transport Manager. The Salutation Manager is the core of the architecture, similar to the lookup service in Jini. It is defined as a service broker: .A service provider registers its capability with a Salutation Manager. When a client asks its local Salutation Manager for a service search, the search is performed by coordination among Salutation Managers. Then, the client can use the returned service. . . . A Salutation Manager sits on the Transport Managers that provide reliable communication channels, regardless of what the underlying network transports are.

The Salutation Manager provides a transport-independent interface to Server and Client applications. This interface (SLM-API) includes service registration, service discovery, and service access function.

The communication protocol independence of Salutation architecture is achieved by the interface (SLMTI) between Salutation Manager and Transport Manager. Transport Manager is an entity, dependent on the network transport it supports. A Salutation Manager may have more than one Transport Manager, in case it is attached to multiple, physically different networks. But Salutation Manager sees its underlying transport through the transport-independent interface (SLM-TI).

With reference to FIG. 3, this figure shows a view depicting a Model of the Salutation Manager. The main tasks provided by the Salutation Manager can be summarized as follows.

Service Registry:

The Salutation Manager contains a registry to keep information about Services. A client registers or unregisters itself. All registration is done with the local Salutation Manager or near one connected to the client. This is correspondent to the lookup service in Jini.

Service Discovery:

The Salutation Manager discovers other Salutation Managers and services registered there. Remote services are discovered by matching type(s) and set of attributes specified by local Salutation Manager. This communication protocol between Salutation Managers is called the Salutation Manger Protocol using Sun's ONC RPC. This unique feature, called capability exchange, is needed, because services are basically registered with the local Salutation Manager in the same equipment. This cooperation among Salutation Managers forms the conceptually same lookup service, but distributed over the network, as Jini does.

Service Availability:

A client application can ask the local Salutation Manager to periodically check the availability of services. This checking is done between the local manager and the corresponding manager. This is a narrow version of Jini's Remote Event concept.

Service Session Management:

This session management addresses the service invocation aspect of Salutation. A service session is established when a client wants to use a service discovered through Service Discovery. The service session is operated in one of 3 different modes: native mode, emulated mode, and salutation mode. The Salutation Manager may or may not be involved in message exchanges in the service session, depending on the modes. In the native mode, messages are exchanged through a native protocol and Salutation Manager is never involved in message exchange. In the emulated mode, the Salutation Manager Protocol is used to carry messages between client and service but Salutation Manager doesn't inspect the contents. In the salutation mode, Salutation Managers not only carry messages, but also define the message formats to be used in the session.

A Functional Unit is defined as a basic building block in Salutation architecture. In other words, it is the minimal meaningful function to constitute a client or service. A collection of Functional Units defines a Service Record. For example, a fax service can be defined by [Print], [Scan], and [Fax Data Send] Functional Units. Each functional unit is composed of descriptive attribute record. These Service/Functional Unit/Attribute records are specified with ISO 8824 ASN.1. Salutation-Lite [10] is also worth to mention here. Salutation-Lite is a scaled down version of the Salutation architecture targeted at devices with small footprints. The Salutation Consortium envisions that Salutation-Lite has tremendous applicability to small information appliances such as palm-size and handheld computers (i.e. Palm and WinCE devices). Salutation-Lite also lends itself well to low bandwidth network such as IR and Bluetooth.

3.3.1 SLP (Service Location Protocol) and Others

Service Location Discovery (SLP) [17] is an IETF version of service discovery protocol but it has unique backgrounds, target areas, and features, as other service discovery protocols do. SLP is a decentralized, lightweight, scale and extensible protocol for service discovery within a site [16]. SLP defines Service URL which defines service type and address for the service. For example, "service:printer:lpr://hostname" s the Service URL for line printer service available at hostname. Based this Service URL, a user browses services available in its site and makes use of selected services to meet the user's need. For example, a user (application) uses SLP to find out any color printer on the same floor.

There are three agents in SLP: User Agent (UA), Service Agent (SA), and Directory Agent (DA). UA is a software entity that sends service discovery requests on behalf of a user application. SA is an entity that advertises service on behalf of a service. As a centralized service information repository, DA caches advertisements from SAs and, afterwards, responds to requests from UAs. An SA advertises itself by registering with a DA. This registration message contains the URL for the advertised service, lifetime for the service, and a set of descriptive attributes for the service. The SA should periodically refresh the registration with DA before its expiration. This lifetime is meant to prevent the network from being left in transient state and similar concept is found at other service discovery protocols such as Jini and UpnP. A DA caches the registration and sends an acknowledge message to the SA. A UA send a service request message to the DA to request the location of a service. Then, the DA responds with a service reply message including the URLs of the services matched against the UA needs. Now, the UA can access the service pointed by the returned URL. In SLP, DA is optional. There may be no DA in small networks. In this case the UA's service request message is directly sent to SAs.

SLP supports service browsing and string-based query for service attributes which allow UA to select the most appropriate service from among services on the network. The UA can request query operators such as AND, OR, comparators (=, <, <=, >, >=), and substring matching. This is more powerful than others. For example, in Jini, service attribute matching can be done only against equality.

Finally, SLP is said to be a solution to the intranet service discovery needs but it scales well to larger network. The scalability is supported by various features such as the minimal use of multicast messages, scope concept, and multiple DAs.

Bluetooth protocol stack also contains a SDP [14] for service discovery. Since Bluetooth SDP is designed specially for Bluetooth environments, it supports limited functionality, compared to other service discovery protocols. Basically, SDP supports search by service class, search by service attributes, and service browsing. Service browsing is used when a client has no priori knowledge about services available in the client's vicinity. Service discovery application profile [15] defines protocols and procedures used by a service discovery application to locate services in other devices. Bluetooth SDP runs on a predefined connection-oriented channel of L2CAP.

Bluetooth SDP is optimized for Bluetooth devices with limited complexity. Thus, it addresses primarily service discovery problem. It provides neither access to services, brokering of service, service advertisement, nor service registration. There's no event notification when services become unavailable. Therefore, other service discovery protocol might be used to complement these lacks. For example, Salutation can be used above Bluetooth SDP. Such mapping [11] seems to be neat because of Salutation's transport-independent architecture.

There are other players in this area: Zero Configuration Networking (zeroconf) [20], MIT's INS (Intentional Naming System) [21], and the Berkeley Service Discovery Service [22]. With a different objective, each of them takes a different approach from others. As a result, they have some strong and weak features, relatively compared to other protocols.

Recently, efforts have been underway to design discovery protocols to support network neighborhood discovery. A representative example is the Candidate Access Router Discovery (CARD) [26] protocol being standardized by the IETF. A candidate access router is an access router in a neighboring network which the mobile device may move into. CARD is a protocol that can be used by a mobile to discover candidate access routers before the mobile performs IP-layer handoff into a neighboring network. With CARD, a mobile listens to layer-2 IDs from the radio Access Points (APs) in neighboring networks prior to making a decision about IP-layer handoff. The mobile then uses the CARD protocol to send these layer-2 IDs to the access router in its current network, which will in turn map the layer-2 IDs to the IP addresses of the candidate access routers in the neighboring networks and then send the candidate router addresses back to the mobile. CARD has the following limitations:

- It requires that neighboring access routers use the CARD protocol to dynamically exchange network information, which is typically impossible when neighboring networks belong to different network providers. As a result, CARD cannot be used to support mobility across heterogeneous radio systems, e.g., between cellular networks and wireless hot spot networks, which belong to different network providers.
- CARD also requires all access routers to implement the CARD protocol to communicate with mobile users, which is a difficult proposition.

The information a mobile device can discover via CARD depends on what information each individual local network provider configures its CARD protocol to provide, which can vary significantly from network to network. The networking capabilities that each mobile device wishes to know can vary significantly depending on the networking capabilities and applications of the mobile device and can change over time. It is difficult for a network provider to foresee what information will be needed by the mobile devices. For example, a mobile device with the ability to perform pre-authentication may wish to know the address of the authentication server in a neighboring network so that the mobile can perform pre-authentication with the neighboring network before it needs to handoff into the neighboring network. Other mobile devices may only want to know, for example, the address of the SIP server/proxy or the DHCP server in a neighboring network.

LDAP (Lightweight Directory Access Protocol) [LDAP] is a general directory lookup protocol and it allows directory update operation and thus can be used for collecting data from mobiles. However, LDAP is not a suitable solution for the basic network discovery problem because (i) LDAP supports lookup hierarchically constructed databases only, while structures for network information databases can be more than trees (i.e., graphs) and (ii) LDAP does not support querying database schemas which are likely to change frequently as new networking technologies are deployed.

3.3.1 Gloserv

Gloserv [29] is a service discovery architecture that provides several types of services that may include event, location-based services, communication and web services. Gloserv architecture is similar to DNS as it contains root name servers and authoritative name servers that manage the information services. It can have some high level categories for name servers such as events, services, people or places. Gloserv architecture provides sets of services such as registration ability to announce one's services, querying ability with local user agents for a certain set of services from the server. Gloserv uses RDF schema to define the sets of services and it uses Sesame for creating and storing RDF records. Sesame can use HTTP, Java RMI or SOAP as part of its querying mechanism.

AIS-based information discovery mechanisms on the other hand is used to discover network elements in the neighboring networks that have certain types of property such as (QoS, access points, routers, SIP servers, PANA authentication agents) unlike the location-based services such as nearest restaurant, nearest event of certain kind such as concert etc offered by Gloserv. Information provided by Gloserv service architecture will not be sufficient to provide enough information to provide fast-handoff. AIS-based service discovery scheme uses RDF as the database structure, but uses SOAP, HTTP, XML, WSDL, JENA as accompanying protocols to provide proper transport mechanism for database population by the scouts, reporting agents and information querying by the mobiles. Thus AIS-based service discovery scheme is more suitable for mobile users who would like to set up secured pre-authentication by discovering the network elements such as APs, routers, SIP servers, PANA servers in the neighboring elements ahead of time which is otherwise out of scope by other discovery mechanism such as Gloserv.

3.3.1 Comparison Between Existing Service Discovery Mechanisms

Several service discovery protocols are proposed to facilitate dynamic cooperation among devices/services with minimal administration and human intervention. In order to be able to support the impromptu community, they should provide the means to announce its presence to the network, to discover services in the neighborhood, and to access to services. Basically, all Jini, UPnP, Salutation, and SLP address these aspects, but in different perspectives. A direct comparison must be avoided, since they put different weights on the above functionality. Nevertheless, such comparison is tried here, since it would be helpful to understand each of them. Table 1 summarizes the features of major service discovery protocols.

Jini and UPnP envision pervasive computing environments being enabled by their solutions, whereas Salutation and SLP are primarily dealing with the service discovery problem. Note that Jini provides 2PC transaction and JavaSpace to help develop network services [3]. UPnP's SSDP is just a part of UPnP specification. A good comparison among Jini, UPnP, and Salutation is presented in [19].

Jini has a dependence on Java to enable all its promises. It assumes that devices support Java Virtual Machine, even though a Jini-proxy can be used for a cluster of resource-poor devices [3]. Moreover, Jini/RMI is not supported by J2ME CLDC (Connected Limited, Device Configuration) configuration for small information devices such as cell phone, pager, and POS [24].

Jini's service proxy concept is one of strongest features not found at others. But this no-need-for drivers scenario presumes that the Jini devices with standard interfaces are already available in the network. It's not as simple as it sounds, since it means all manufactures of a certain device type must consent to the standard interface. First, the standardizations for printer and storage device interfaces are under way by the consortia of manufactures.

UPnP relies on the existing IP and Web technology. It seems unique in terms of its XML use for service/device description. XML allows for powerful description of device capability, control command issued to the device, event from it. UPnP introduces new features for self configuration which exploit AutoIP and DHCP, but these features are also found in IPv6 [19]

The Salutation is well defined but confined to the service discovery protocol and session management. Salutation accordingly doesn't address features like remote event notification, which are no doubt useful in distributed environment. When it comes to transport protocol, IP is given top priority by Jini, UPnP/SSDP, and SLP. Salutation can operate over any network layer protocol such as IP and any physical/link layer technologies including IR and IEEE 802.11 wireless LAN. This transport independence is the strongest feature of Salutation.

More than one SLP DAs are likely to be deployed for an enterprise network, since a DA becomes the single point of failure. These DAs can be organized in a hierarchy to provide better performance. Also, there may be some overlap in their coverage of organization/departments to provide reliability. This interaction or cooperation between DAs for performance and reliability is being explored by SLP society. SLPv2 can ensure the integrity and authenticity of SLP messages by including authentication information in SLP message. It deals with security problem directly, while others have to rely on other security protocols.

Comparison Table for Major Service Discovery Protocols and AIS
Related Work: Jini, SLP, UPnP, Salutation, Gloserv

|  | Jini | UPnP | Salutation | SLP | Gloserv | AIS |
|---|---|---|---|---|---|---|
| Web Page | www.sun.com/jini | www.upnp.org | www.salutation.org | www/svrloc.org | Early stage Ref. Mobiquitous | Not available yet |
| Main Entities | Lookup Service, Client, Service | Control Point, Devices (services) | Salutation Manager, Transport Manager, Client Server | Discovery Agent, Service Agent, User Agent | Local User Agent Service Agent | AIS Server, Mobile Node (Scouts-MN)) |

-continued

Comparison Table for Major Service Discovery Protocols and AIS Related Work: Jini, SLP, UPnP, Salutation, Gloserv

| | Jini | UPnP | Salutation | SLP | Gloserv | AIS |
|---|---|---|---|---|---|---|
| Service Repository | Lookup Service | No | A set of SLMs (Salutation Manager) | DA (Discovery Agent) | Registry Server | AIS Server |
| Service Announcement | Service Discovery/ Join Protocol | Advertisement (ssdp:alive) | Registering with local Salutation Manager | Service registration | No | NO |
| Service Discovery | Query to Lookup Service | Contact control point, or listen to advertisement | Query to local SLM and cooperation among SLMs | Contact DA or multicast to SAs | Discover Network Services in the current network | Query to AIS Server. (WSDL/SOAP) Four Architectures 1) End Node assisted 2) Reporting Agent Assisted 3) AAA Assisted 4) Peer-to-Peer |
| Access to Service | Service proxy object based on RMI | Invoking Action to the service (SOAP), Query for variable state | Service Session Management | Service type (service protocol) for the discovered service | Connects to a global server that can be hierarchical as well | MN directly accesses the service if permitted |
| Service Description and Scoping | Interface type and attribute matching | Description in XML | FU (Functional Unit) and attributes within it | Service type And attribute matching (fairly powerful matching) | Uses XML/RDF format | Description in XML or its variant |
| Service Registration Lifetime | Leasing | CACHE-CONTROL header in alive message | No | Lifetime in service registration | Cache | Cache |
| Service Group | Group | No | No | Scope | No | Service accessed only by AIS Server's MN |
| Event Notification | Remote Events | Service publishes event(GENA) when state variable changes | Availability Checking (periodic and automatic) | No | Yes | No |
| Others | Java-centric architecture | Automatic configuration (AutoIP) | Transport independence | Authentication security feature | Suitable for discovering specific set of services | 1) Not dependent on specific programming environment like JINI 2) Adopts service description virtues of SLP and UPnP 3) Easy Deployment 4) Solution can be customized for individual ISP. |

5 Description of AIS 5.2 Summary of Differences Between AIS and Existing Service Discovery Mechanisms Jini, SLP, UPnP, and Salutation are not capable of discovering network neighborhood information. Gloserv does not describe methods for discovering the network elements in the neighboring networks with certain service parameters.

The following features make our solution unique:
 AIS provides support for discovering information about neighboring networks in addition to information about the mobile's currently attached network.
 It is easy for AIS to determine what information to collect and how to provide it (existing service discovery protocols focus on how to retrieve info already existing in databases).
 No reliance on local network providers to implement service information servers, which can be an obstacle when deployed in public networks.
 AIS is layer 2 independent (independent of CDMA, IEEE 802.11, GPRS, etc.)
 AIS includes both network-assisted and mobile-assisted discovery mechanisms.
 AIS includes both network-assisted and mobile-assisted mechanisms for constructing a network information database.

5.3 AIS Architecture

Information construction process, information retrieval methodology, format of the information stored in the information server are some of the key design factors that need to be looked into while designing the discovery architecture.

We have designed several architectures for AIS. They can broadly be classified into two main categories: network-assisted and mobile-assisted. In the following sections we describe these architectures and how different functional elements can interact with each other. In each of these architecture alternatives, the mobile will query an AIS server or a peer mobile to find out the information regarding the networking elements in the neighboring networks. The methods of constructing the information database differ in each different architecture. A network-assisted architecture can follow both the distributed and centralized model. The AIS server keeps the information about the network elements in the neighboring networks and will provide the information after getting a query from the mobile. In a centralized model, reporting agents in each network will report the information about the networking elements within the network by using SNMP MIB (Simple Network Management Protocol Management Information Base). The mobile-assisted model is always distributed in nature where the end nodes report the information about the networks they are visiting currently. The way in which the information is retrieved from the AIS server by the mobiles is common for both approaches.

Peer-to-peer based model is another mobile-assisted model where the mobiles act as the information server and provide the information to other mobiles.

3.3 Information Server-Based Architecture
3.3.1 Discovery Database Construction Information server-based architecture can be mobile assisted or network assisted. In the following sections we describe both end-node assisted and network assisted approaches for constructing a network information database.

3.3.1.1. Mobile-Assisted Approach

We propose a new paradigm for collecting, maintaining, and discovering local services and networking capabilities. The new paradigm will overcome the limitations of the existing approaches described in related work section. The proposed approach uses the following main principles:

- Each mobile user can use any proper means available to him/her to discover the network information available in a visited network. Often the user will not need any special assistance from the visited network solely for the purpose of discovering the information the subsequent mobiles may need regarding the visited network. For example, when a mobile connects to a visited network, it will learn the addresses of the access routers and authentication agents in the visited network as part of its normal process for connecting to the visited network. Such information can be reported to the mobile's AIS server which can in turn provide the information to subsequent mobiles before they move into this visited network so that the subsequent mobiles can retrieve the information. The discovery of an available hotspot network and its logon requirements also do not require the local network providers to provide any special assistance.
- Each mobile user reports the information it discovers in a visited network to its AIS server. A mobile's AIS server does not have to have any trust relationship with the network that the mobile is currently visiting.
- A mobile user's AIS server is responsible for maintaining the information regarding the network information received from its subscribers regarding different networks.
- When a subsequent mobile moves into a visited network, it may query its AIS server for local information it needs.

The proposed approach has the following main advantages over existing approaches:

- Information mining and discovery will not rely on the local network providers to provide information servers used to provide network information.
- Regardless where a mobile user is and which local network it currently uses, the mobile always uses a single protocol to communicate with its AIS server to retrieve network information.
- An AIS server only needs to maintain information its own subscribers are interested in.
- Furthermore, an AIS server only needs to maintain information regarding the locations its own subscribers travel to. This allows the proposed paradigm to be highly scalable.

The basic operation of the proposed collaborative discovery paradigm is illustrated in FIG. 4. It shows how mobile moves between the networks and can update the information about the network elements to a location server commonly shared by a set of networks. This information is stored in the location server using a specific format. With respect to FIG. 4, the figure shows a view demonstrating collaborative discovery of local services and network capabilities.

3.3.1.2 Network-Assisted Information Discovery

Network assisted information discovery defines three different methods: These are:
1. Reporting Agent (RA) assisted;
2. AAA assisted;
3. DNS-based approach.

3.3.1.2.1 Reporting Agent Assisted

Reporting Agents (RA) are network agents that reside within each network. These are SNMP capable and have the ability to collect the information about the network elements by probing the SNMP MIBs. These reporting agents (RA) will collect the information in the respective domains and populate the location server database for a specific region. This information may include capability set, IP address, geo-coordinates of the respective network elements etc. When a specific network element is attached or becomes operational within a domain, its information is pushed onto the reporting agent (RA), which in turn is sent to the AIS server. Thus, this approach provides a semi-centralized way of populating the AIS server database compared to the end-system assisted approach described previously. The security concerns are less of an issue here as database update is provided by a specific networking agent instead of by the end client and there is a preestablished security association between the RA and the information server.

With respect to FIG. 5, the figure shows an example of populating the database using information reported by the Reporting Agents (RAs).

3.3.1.3 AAA Server Assisted

AAA server assisted information building is another network server assisted approach. Information profile of the mobiles can be saved in the AAA servers as well. Any AAA protocol such as RADIUS and Diameter can be used for populating the network discovery database in a way that a AAA client sends a pair of an address of the mobile and an address of the AAA client to the AAA server. The pair is carried in Calling-Station-Id and Called-Station-Id attributes of the RADIUS and Diameter protocol. The AAA server can collect the information reported from the AAA client and keep track of the mobility pattern of the mobile by recording a list of tuples of (the address of a AAA client, the time the mobile associated with the AAA client, the time the mobile disassociated with the AAA client) for the mobile. This list is then used for constructing the database of neighboring networks among which mobiles can perform handoff.

It is noted that this approach may not be applicable for multi-provider case where a service provider may not want to disclose its topological database to other competing service providers.

3.3.1.4 DNS Server-Based Approach

One can also use DNS SRV record to find out the list of these network elements instead of using the AIS server. DNS can always populate the services associated with the network elements (routers, APs) and their associated geo-coordinates using DNS's LOC record. Thus one can query a DNS server, give a list of services for a specific domain and the range of geo-coordinates and get a list of network elements that provide these services. A general query may look like this. Given a set of geo-coordinates (R1-R2), find a set of servers that provide a specific set of services such as routing, IEEE 802.11 and AAA. A combination of DNS "SRV" record and geo-location record will help in determining a set of servers in the vicinity.

Note that this approach is not intended for forming arbitrary structured network information database.

3.3.2 Querying the Discovery Database

Many of the operation such as secured pre-authentication, proactive IP address acquisition may be required during a mobile's movement between domains, subnets within a domain. These operations which are usually done after the mobile has moved to the subnet if done ahead of time will help provide the fast-handoff. In order to perform these operation while in the previous domains/subnets it will need to communicate with the next hop routers and severs before the movement is over. Thus a mobile will need to discover the neighborhood information including the APs, routers, DHCP servers and several authentication agents such as PANA authentication agents and in some cases SIP server before moving to the neighboring networks. This information by means of network discovery will help a mobile to perform several types of operation ahead of time such as pre-authentication and proactive IP address assignment. One such mechanism is described below that helps a mobile to discover the neighboring network elements. DNS "SRV" mechanism provides another approach of providing the list of such network elements in the neighboring domains.

Initially a mobile boots up, obtains the IP address and configures itself with other network parameters such as default gateway, and several server parameters etc, It begins to communicate with a corresponding host and at certain point during its communication based on certain policy it determines that the mobile is impending to move. Thus the mobile initiates the AIS process in several different ways. It can always use its location information as the look-up key while making a query. The location information can be the MAC address of an access point, geographic address or any other civic address. When the MAC address of an access point is used as the look-up key, the mobile can obtain the MAC adders either (i) by listening to beacon frames if the mobile is in the radio coverage of the access point or (ii) by recursively performing the query procedures where the recursion starts with specifying the MAC address of an access point known to the mobile based on method (i).

The server gets the query and reports back the list of attributes asked based on the query type. If the client is GPS equipped it can always finds its own location and determines where it plans to move and thus provides a range as part of the information look up and obtain the desired network information.

With respect to FIG. 6, the figure shows a protocol exchange and sequence of operation for the network discovery, query and response.

FIGS. 7 and 8 show scenarios of a client discovering the neighborhood servers/routers ahead of time, so that it can get the addresses of the neighboring servers and routers where the mobile has the probability of moving. The range of geo-coordinates of the mobile and the MAC address of an access point and are used as the look-up key for querying in FIG. 7 and FIG. 8, respectively. Network discovery process will help discover the neighborhood servers, routers and access points ahead of time. By discovering the servers ahead of time pre-authentication can be performed thus expediting the handoff time during the movement. The mobile is currently attached to access point AP0 and has three neighboring networks D1, D2 and D3 where the mobile has the probability to move to. Thus the mobile can query the AIS server with a specific key and can get the information regarding the neighboring APs, servers, and routers in domains D1, D2 and D3 with which it can communicate with to prepare for the secured handoff. Following paragraph shows a sequence of operation after a mobile is booted up.

1) A mobile boots up and connects to a specific Access Point. It obtains an IP address via an IP address configuration procedure through, e.g., DHCP or PPP. The DHCP server or PPP server can have a range of IP addresses. When geo-coordinates are used as the look-up key, the range of geo-coordinates is associated with those IP address and delivered to the mobile together with the IP address in the IP address configuration procedure. It is assumed that each and every mobile may not be GPS equipped. If the mobile knows its own geo-coordinate (R0) and geo-coordinates are used as the look-up key it could also use its geo-coordinate as the look-up key. The IP address of the AIS server for a specific region can be provided by during the IP address configuration procedure or by using DNS.

2) It may also happen that the neighboring cells may belong to different domains. From DHCP configuration, the mobile can find out its current domain (e.g., "att.com" or "sprint.com" etc.). It can also find out the domain names of the neighborhood area using reverse DNS look up from the IP addresses of the network elements that were obtained.

3) The mobile makes a request to the AIS server using its currently attached AP and access router such as following:

a. The request contains a list of network information types about which the mobile wants to retrieve (e.g., type="PANA authentication server", "router") for a specific location (e.g., geo-location R0 or the MAC address of AP0), with specifying a condition (e.g., in the Geo-range [R1-R2] or "within 1 mile"). The condition could be determined based on the velocity of the mobile or mobility pattern.

b. The AIS server returns the list of network information (e.g., IP addresses of servers and routers, MAC addresses of APs that satisfies the condition specified in the request by querying its own database that has been populated separately.

c. From this information I have the list of probable networks that I am likely to move and thus perform a time-bound pre-authentication and/or pro-active IP address acquisition.

With respect to FIG. 7, the figure illustrates an example of Geo-coordinate based network service discovery, and with respect to FIG. 8, the figure illustrates an example of AP's MAC Address based network service discovery.

There are additional features for database querying that AIS can provide. For example, the criteria used for choosing network information to be provided for a mobile can be either specified by the mobile or by the AIS server or by both entities. When the AIS server specifies the criteria, the profile of the mobile may be used as the criteria. In this case, the AIS may provide detailed network information for mobiles subscribing to a high-class AIS service than mobiles subscribing to a low-class AIS service.

3.3.3 Peer-to-Peer Model

A peer-to-peer model does not depend upon the information server for information storage and retrieval. Instead, each mobile terminal will serve as an information server. We describe two peer-to-peer-based models, such as proactive broadcast and scoped multicast.

In the proposed peer-to-peer model:
Each mobile moving between the networks keeps the information about just visited networks in its local cache for a specific duration;
Each neighbor of a mobile will have different information about the neighboring networks.
The following are two approaches:
Scoped Multicast Approach
Each Scout announces their knowledge of visited networks on a localized multicast address M, with certain scoping and the amount of time they will like to keep it in the cache;
Based on the proximity of the network and probability of movement the mobile communicates with the designated peer to get the particulars of the network.
Note: in some examples, a scout may give information itself or it may point to another scout which has information.
Recursive Broadcast Approach
Each mobile broadcasts recursively to find the information about a specific network within the network
Broadcast can span beyond its own subnet With reference to FIG. 9, the figure shows an example of peer-to-peer based network discovery mechanism. There is no information server in this architecture, and the mobile can discover about the other networks by querying the peers within the network. This works under the assumption that the mobile carry a lot of information about the other networks and keep it in the cache for a specific period of time. The mobile can query this information proactively as it decides to move to other networks and obtains the information about the other networks. It works under the assumption that the mobile has the ability to communicate with its peers and extract this information. In some cases there may be a need to establish some sort of security association between the mobile and its peers.

With respect to FIG. 10, the figure illustrates a Scope-based Multicast system. On the other hand, with respect to FIG. 11, the figure illustrates a Recursive Broadcast system.

3.3.4 Applicability to Secure Pre-authentication

Network discovery mechanism described here can help all these kinds of handovers between different access networks, including, e.g., the following scenarios:
Handover between 802.11 and 802.3 networks;
Handover between 802.3 and 802.16 networks;
Handover between 802.11 and 802.16 networks;
Handover between 802.11 and 802.11 networks, across ESSs;
Handover between 802.3 and Cellular networks;
Handover between 802.11 and Cellular networks; and/or
Handover between 802.16 and Cellular networks.

In the preferred embodiments, the discovery approach will be applicable to both heterogeneous and homogeneous handoff scenarios.
Movement among homogeneous Systems
Single interface e.g., 802.11, between ESS)
Multi interface (e.g., 802.11, between ESS)
Movement among heterogeneous networking systems is always dual mode
802.3, 802.11
802.11, CDMA/GSM (Cellular)
Between Cellular Networks (CDMA, GSM)
802.11, 802.16, 802.20
802.11, Circuit-switched The following section discusses a specific scenario to illustrate how network discovery can be integrated to help proactive handoff and secured pre-authentication mechanism. FIG. 12 shows the diagram showing the linking between two states, namely discovery of neighboring networks and seamless handoff. In particular, FIG. 12 shows integration of network discovery and secure seamless handoff.

Integration with Pre-authentication Mechanism:

With respect to FIG. 13, the figure shows: an Example Integrated Flow (Network Discovery+Pre-authentication).

As the mobile moves between the networks, the process of proactive handoff will primarily include two stages. First stage involves discovering the neighboring elements such as the next hop router, DHCP server, PANA authentication agent and AAA server in the network the mobile is about to move and second stage involves setting up a secured pre-authentication based security association with the PANA authentication agent in the neighboring network. During this secured pre-authentication the mobile can also obtain an address from the DHCP server in the next subnet (this does not mean running DHCP over multi-IP hops). By having a secured pre-authentication, the mobile will not need to spend time in setting up security association after moving to the new subnet. By having an IP address of the next subnet locally available, the mobile may also avoid the time spent for getting an address using standard DHCP process, although it may use DHCP INFORM to obtain all other configuration parameters. By having an IP address locally available time taken due to DHCP process is avoided including the ARP checking.

3.4 Network Discovery Process

This database can be centralized, distributed or peer-to-peer. We are formulating several ways of populating this database. This database structure will be, e.g., in RDF format. The mobile will use SOAP/HTTP mechanism to query a certain type of network element that provides a specific service from the database. As an example a mobile can make a query to get the list of network elements providing routing service or PANA service in the subnet where a specific access point is connected. The specific access point can be identified by its MAC address. There may be other types of information such as quality of the layer-2 link, protection capability, roaming agreement that can act like indexes. In a centralized database model we have planned to use three different approaches, such as Reporting Agent-based, AAA-based and end-system based. In reporting agent-based approach, each reporting agent can use SNMP MIB to populate the required information in the centralized database in a specific format. Since AAA client in each domain has access to the mobile and the AAA server, it can very well populate the database server with required information. End-system assisted approach takes advantage of the knowledge built up during a mobile's movement among the networks. As the mobile moves from one network to another it collects the information about the networking elements and report to the centralized database. In a peer-to-peer model there is no centralized database, but each mobile keeps the list of network elements it has just recently visited for a specific period of time and publish their capability and knowledge in a scoped-based multicast. A mobile in a certain network can query this capability and communicate with the specific neighbor that has the required information.

Secured pre-authentication involves establishing a security association between the mobile and PANA server in the next subnet and obtaining the IP address from the next subnet. FIG. 13 shows the protocol interaction between various elements during the transition between the access networks. The mobile makes a move from access network A to access network B. Access networks A and B can be in two different administrative domains. Initially the mobile MN has an address IP0 assigned to it. As it is about to move, it passively listens to several beacons from the neighboring APs. These beacons of the APs contain the MAC addresses of the APs in the neighboring networks. The mobile uses the MAC address of the access point as the identifier to discover the network elements in the neighboring access networks. This is achieved by using an application layer protocol such as SOAP and HTTP that interacts with the AIS server to determine the IP addresses of the network elements that the mobile would usually interact after it moves to one of the neighboring access networks or the target access network. These network elements include access routers, PANA authentication agents in the neighboring network. In order to perform a secured handoff the mobile sends a PANA message to the PANA authentication agent that is usually co-located with the Target Access Router (TAR) in the neighboring access network. At this point IKE signaling takes place to set up an IPsec tunnel between the TAR and the mobile. This tunnel is set up to make sure that the data is tunneled through and is secured. As part of setting up the tunnel it obtains an IP address from the DHCP server that is resident in the target access network. The DHCP server will dispense an IP address (say IP1) from its IP address pool. The DHCP server may like to perform an ARP before handing out the IP address to the mobile through IKEv2 where the TAR acts as a proxy DHCP client for the mobile. This IP address passed to the TAR through DHCP is then carried in a Configuration Payload of IKEv2 and finally is assigned to the mobile as the IPsec tunnel inner address. The mobile now has two IP addresses, i.e., IP0 and IP1. When the IPsec tunnel is implemented in the mobile as a logical tunnel interface (i.e., ipsec0) and the mobile has two addresses, i.e., IP0 for the physical interface (i.e., eth0) and IP1 for the logical tunnel interface. At this time the mobile sends a binding update to the correspondent host (CH) or to the home agent. CH or home agent sends the new data to the mobile's new IP address IP1. New data from the CH destined to IP1 will be captured by the TAR and will be tunneled via the IPsec tunnel just established. Now as the mobile crosses over and connects to the new access point AP2, it gets an event trigger that will break the old IPsec tunnel and will assign the new address IP1 to its physical interface (i.e., eth0).

Since the mobile has obtained the IP address only that can be assigned locally, as the mobile moves to new network it may perform a DHCP INFORM so as to be able to configure other server parameters such as DNS server, DHCP server etc. As another option, the parameters may have been obtained through the IKEv2 signaling for establishing the IPsec tunnel between the mobile and TAR before the mobile moves to the target access network. Another option will be to obtain the parameter through AIS and store them in the mobile's cache.

Thus when the mobile is in the previous subnet and the tunnel is set up it has two addresses assigned such as:
eth0: IP0;
Ipsec0:IP1 (tunnel interface).

Where as IP0 is the address in the current network, IP1 is the address from the neighboring network.

Note: when the IPsec tunnel is NOT implemented in the mobile as a logical tunnel interface, IP1 would be bind to IPsec SAD (Security Association Database).

After the mobile moves to the target access network it will have an address assignment as follows:
eth0:IP1.

Thus, we use a local process to configure the IP address IP1 to the interface eth0.

Considerations:
Based on the present disclosure, those in the art can implement a system taking into consideration, among other things:

1. The kind of triggering mechanism that is needed as the mobile moves into the target access network;
2. How to dis-associate the existing tunnel as the mobile moves into the target access network
3. How to take care of PANA authentication over multi-IP hops;
   a) Modify PANA to run over multi-IP hops;
   b) Run PANA over an unprotected IP tunnel;
4. When the mobile should start the network discovery process, as it is about to change network;
5. How to assign the IPsec tunnel inner address dynamically using DHCP (detailed interaction between DHCP server and IPsec gateway must be defined).

With respect to FIG. 14, the figure shows the flow chart of different modules associated with a mobile. FIG. 14 depicts a network discovery and pre-authentication flow diagram. In some embodiments, network discovery and pre-authentication can be effectively used for a mobile that has multiple interfaces in the following way:

The mobile always actives only one of the multiple interfaces. Other interfaces are deactivated for the purpose of, e.g., battery saving. Depending on radio conditions and/or other criteria, the mobile switches from one interface to another, which requires dynamically discovering layer-2 attachment points for deactivated interfaces to which the mobile may switch from the activated interface.

Since the deactivated interfaces cannot be used for discovering their layer-2 attachment points, the AIS procedure to discover those attachment points is performed through the currently activated interface. Information on higher-layer network elements that are associated with those attachment points is also discovered in the AIS procedure.

Once those attachment points and associated higher-layer network elements are discovered, the mobile is able to perform pre-authentication procedure for a deactivated interface through the activated interface in order to establish a security association between the mobile and the layer-2 attachment point and pre-configuring the required configuration parameters such as an IP address before activating the deactivated interface.

When the deactivated interface is activated, the bootstrapping procedure for activating the interface will be faster since most of the required bootstrapping procedure has been completed before activating the interface.

Another usage of network discovery for a mobile that has multiple interfaces is described as follows.

The mobile has a wireless LAN interface and a cellular interface. It always activates the cellular interface and has IP connectivity through the cellular interface. The wireless LAN interface may always be activated or may be activated on demand by the user of the mobile.

When the wireless LAN interface finds (an) access point(s). It can perform AIS procedure through the cellular interface to obtain detailed information about the network connected through the access point(s). The obtained information can be used by the mobile to choose an access point to connect.

4. Schema Design

AIS provide a framework that uses the existing standards for access points and routers without the need to make any changes in the routers and access points. Our database schema will use XML, RDF and SOAP. RDF database can be constructed in a distributed fashion to be able to scale to large number of networks. RDF can also handle arbitrary interconnected data structure while LDAP handles tree-based data structure only. RDF can provide querying schema as well as data themselves.

FIG. 15 shows different components of the network discovery and interaction between the components. In particular, FIG. 15 shows interaction between different components of a database engines.

With reference to FIGS. 17(1) to 17(10), an illustrative RDF schema is illustrated for Network Discovery that uses XML format.

5. Demo Scenario

In this section, illustrative network assumptions and a demo scenario are described. The following merely depicts some illustrative and non-limiting test examples.

Network Assumption
Create four different Subnets (assume four different networks);
Associate four different Edge Routers (ER);
Four different Access Points (APs);
Four different PANA servers (may coexist with the routers);
Define a Mobility Server;
Each Network Element has a specific Geo-coordinate associated with it.
Populating Database on the Mobility Server:
Have an SNMP query agent (RA) in each network;
Each RA queries the network elements and pushes these information to the mobility server (S):
  Mobility server keeps a database in a specific format:
    According to the network;
    Service Type;
    Geo coordinate range [r1,h1];
  Alternatively, the database can be populated by a mobile visited previously in these networks.
Querying the Database on the Mobility Server:
Mobile gets powered on, gets an address from DHCP server;
Finds out its own position (r0,h0) from DHCP server;
Updates it to DNS;
Learns the mobility server address from the DHCP or pre-provisioned;
Makes a query with a certain type of service and provide a range;
Gets a list of servers, and make a time bound Pre-authentication with each of the server as it is about to move;
Fast-handoff will be performed accordingly.

Figure 16B:
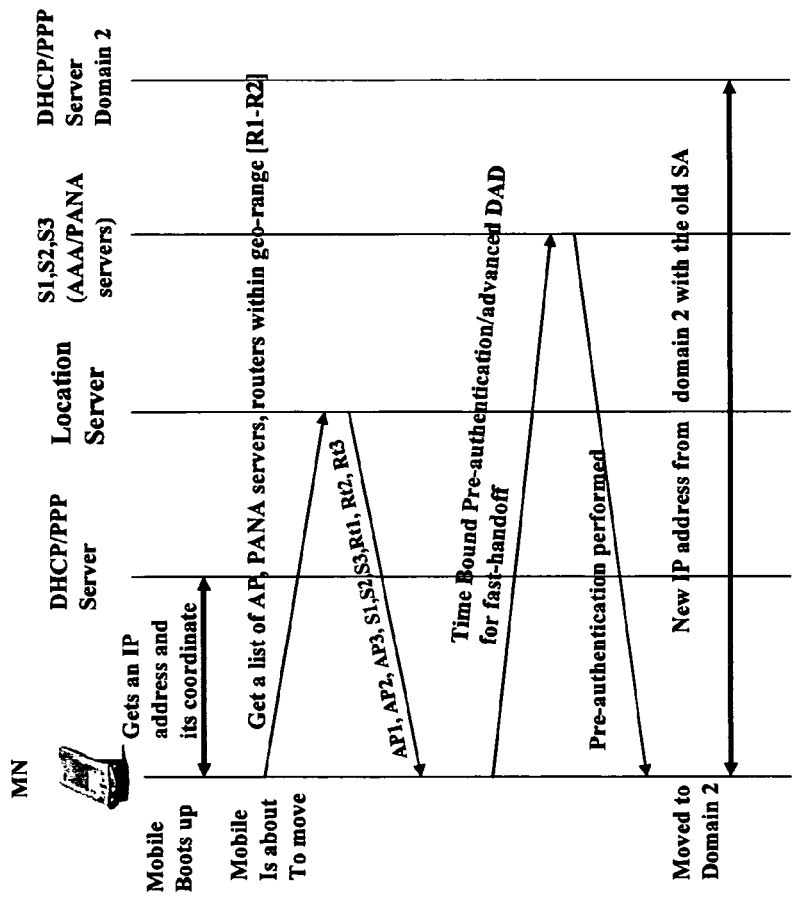
Figure 16C:
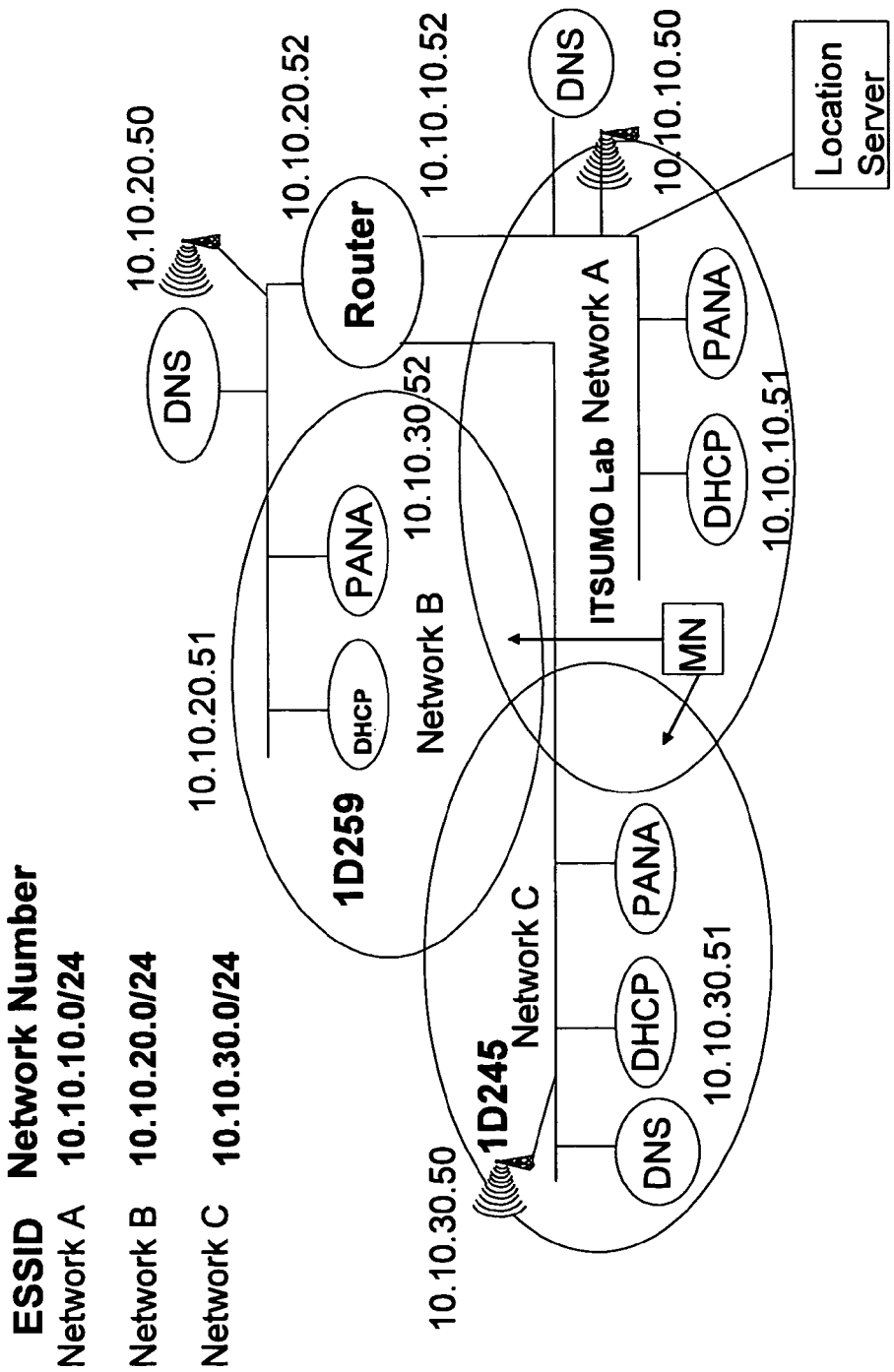

With respect to FIGS. 16(A)-(C), these figures demonstrate such an illustrative Demo Setup implemented within a demo lab.

6. Conclusions

This disclosure presents, by way of example, among other things, a few architectures and an application layer scheme for the network discovery process. The disclosure also describes, inter alia, how these techniques can help provide proactive secured handoff during a mobile's movement between heterogeneous access networks.

MIH Function Under 802.21:

The primary role of the MIH Function is to facilitate handoffs and provide intelligence to the network selector entiity or the mobility management entity responsible for handover decision as described by other standards or proprietary implementations. The MIH Function aids the network selector entity with the help of Event service, Command service and Information service. The network selector entity and the handover policies that control handovers are outside the scope of MIH Function. Description of specific handover policies and the details of network selector entity are outside the scope of 802.21 standards as well.

The IEEE 802.21 specification defines services that enhance handovers between heterogeneous access links. This is achieved through facilitating handover process by providing link layer intelligence relevant in handover detection, handover initiation and candidate link selection by MIH user.

A Media Independent Event Service (MIES) which provides event classification, event filtering and event reporting corresponding to dynamic changes in link characteristics, link status, and link quality.

A Media independent Command Service (MICS) which enables MIH user to manage and control link behavior relevant to handovers and mobility.

Media Independent Information Service (MIIS) which provides details on the characteristics and services provided by the serving and surrounding networks. The information enables effective system access and effective handover decisions.

The above services are supported by the Media Independent Handover Function (MIHF) to facilitate a MIH user in mobility management and handover process. The MIH Function provides convergence of link-layer state information from multiple heterogeneous access technologies into a unified presentation to the upper layers of the mobility-management protocol stack.

The 802.21 draft specification is based on, among other things, the following general design principles.

The Media Independent Handover (MIH) Function is logically defined as a shim layer in the mobility-management protocol stack of both the mobile node and the network elements that provide mobility support. MIH is a helper and facilitator function which helps in handover decision making. Upper layers make handover decisions and link selection based on inputs and context from MIH. Facilitating the recognition that a handover should take place is one of the key goals of MIH Function. Discovery of information on how to make effective handover decisions is also a key component.

MIH Function provides abstracted services to higher layers. From that perspective MIH offers a unified interface to the upper layers. The service primitives exposed by this unified interface are independent of the technology specific protocol entities of the different access networks. The MIH Function communicates with the lower layers of the mobility-management protocol stack through technology-specific interfaces. The specification of the MIH interfaces with the lower layers generally does not fall within the scope of 802.21. Such interfaces are already specified as service access points (SAPs) within the standards that pertain to the respective access technologies, such as IEEE 802.1, IEEE 802.3, IEEE 802.11, IEEE 802.16, 3GPP and 3GPP2.

Media Independent Information Service (MIIS) provides a framework and corresponding mechanisms by which a MIHF (Media Independent Handover Function) entity can discover and obtain network information existing within a geographical area to facilitate the handovers. MIIS primarily provides a set of information elements (IEs), the information structure and its representation and a query/response type of mechanism for information transfer. This contrasts with the asynchronous push model of information transfer for the event service. The information may be stored within the MIH functional (MIHF) entity or maybe present in some information server from where the MIH in the station can access it.

The information can be made available via both lower as well as higher layers. Information can be made available at L2 through both a secure and an insecure port. The structure and definition of a schema can be represented in a high level language such as XML.

The Information service also provides access to static information such as neighbor reports. This information helps in network discovery. The service may also provide access to dynamic information which may optimize link layer connectivity with different networks. This could include link layer parameters such as channel information, MAC addresses, security information, etc. Information about available higher layer services in a network may also help in more effective handover decision making before the mobile terminal actually attaches to any particular network.

The Media Independent Information service specifies a common (or media independent) way of representing this information across different technologies by using a standardized format such as XML or ASN.1

MIIS provides the ability to access this information about all heterogeneous networks in a geographical area from any single L2 network, depending on how the 802.21 MIIS service is implemented. MIIS either relies on existing access media specific transports and security mechanisms or L3 transport and L3 security mechanisms to provide access to the information. Typically, in a heterogeneous network composed of multiple media types, it is the handover decision module or higher layer mobility management will collect information from different media types and assemble a consolidated view to facilitate its inter-media handover decision.

Some networks such as the cellular networks already have an existing means of detecting a list of neighborhood base stations within the vicinity of an area via the broadcast control channel. Other IEEE groups define similar means and supports clients in detecting a list of neighborhood access points within the vicinity of an area via either beaconing or via broadcast of MAC management messages. The Media Independent Information Service (MIIS) provides a unified framework to help the higher layer mobility protocols (HLMP) across the heterogeneous network environment to facilitate the client's discovery and selection of multiple types of networks existing within a geographical area. In the larger scope, the macro objective is to help the higher layer mobility protocol to acquire a global view of the heterogeneous networks to facilitate seamless handover when roaming across these networks.

Figure 18:
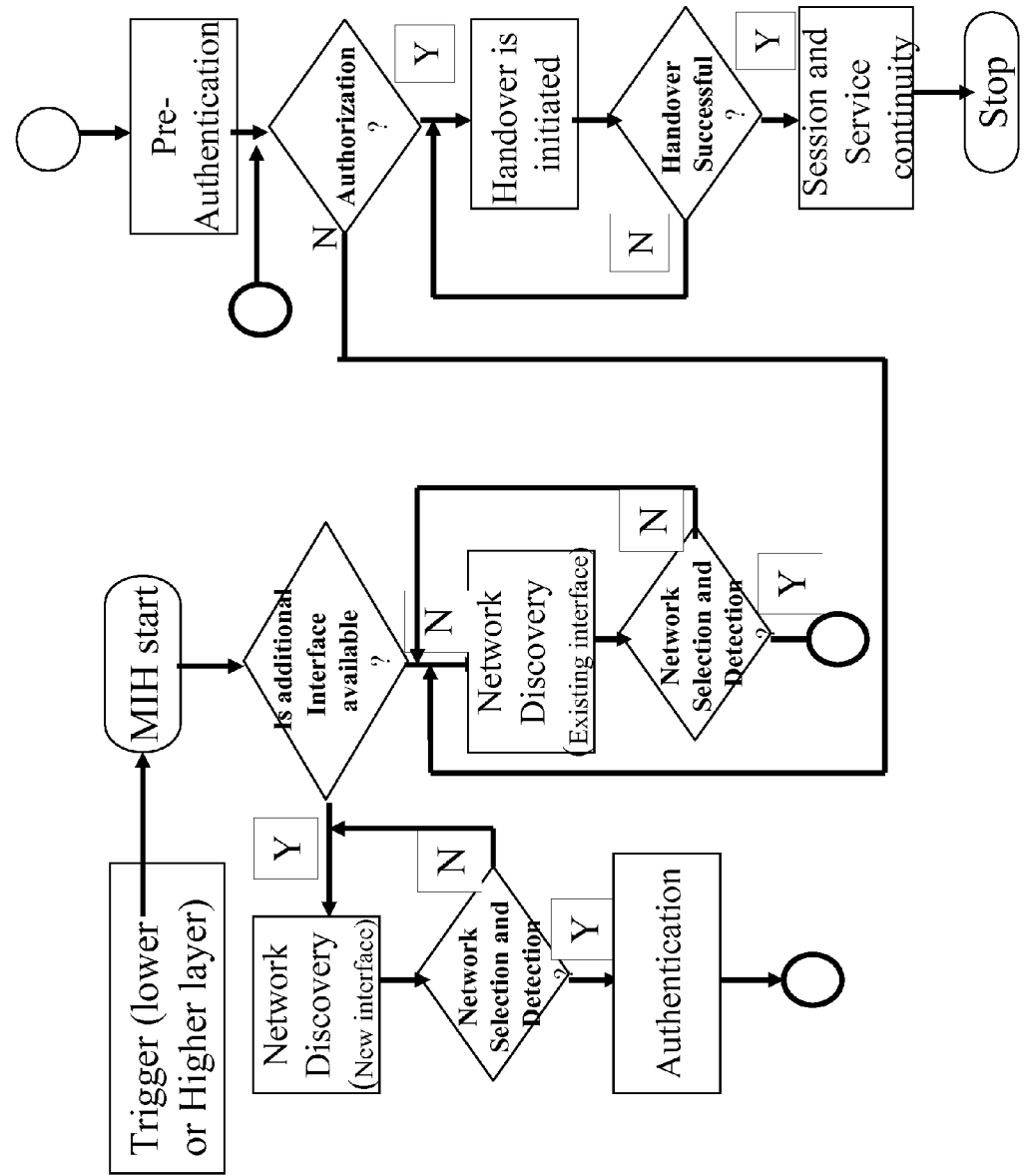
FIGS. 18(1)-18(10) are views showing some illustrative embodiments and aspects related to Service Access Point (SAP) definition and call flow.
Figure 18:
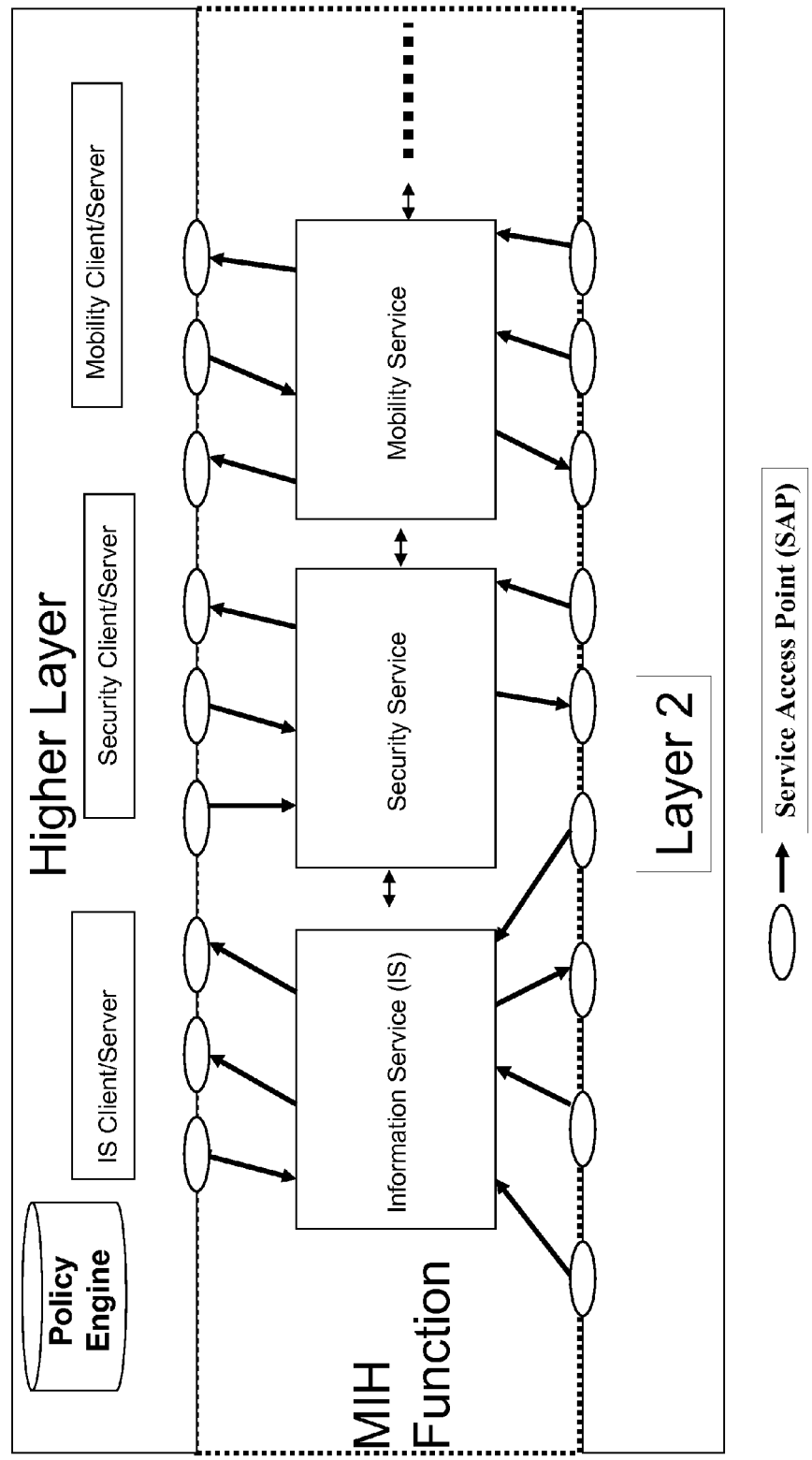
Figure 18:
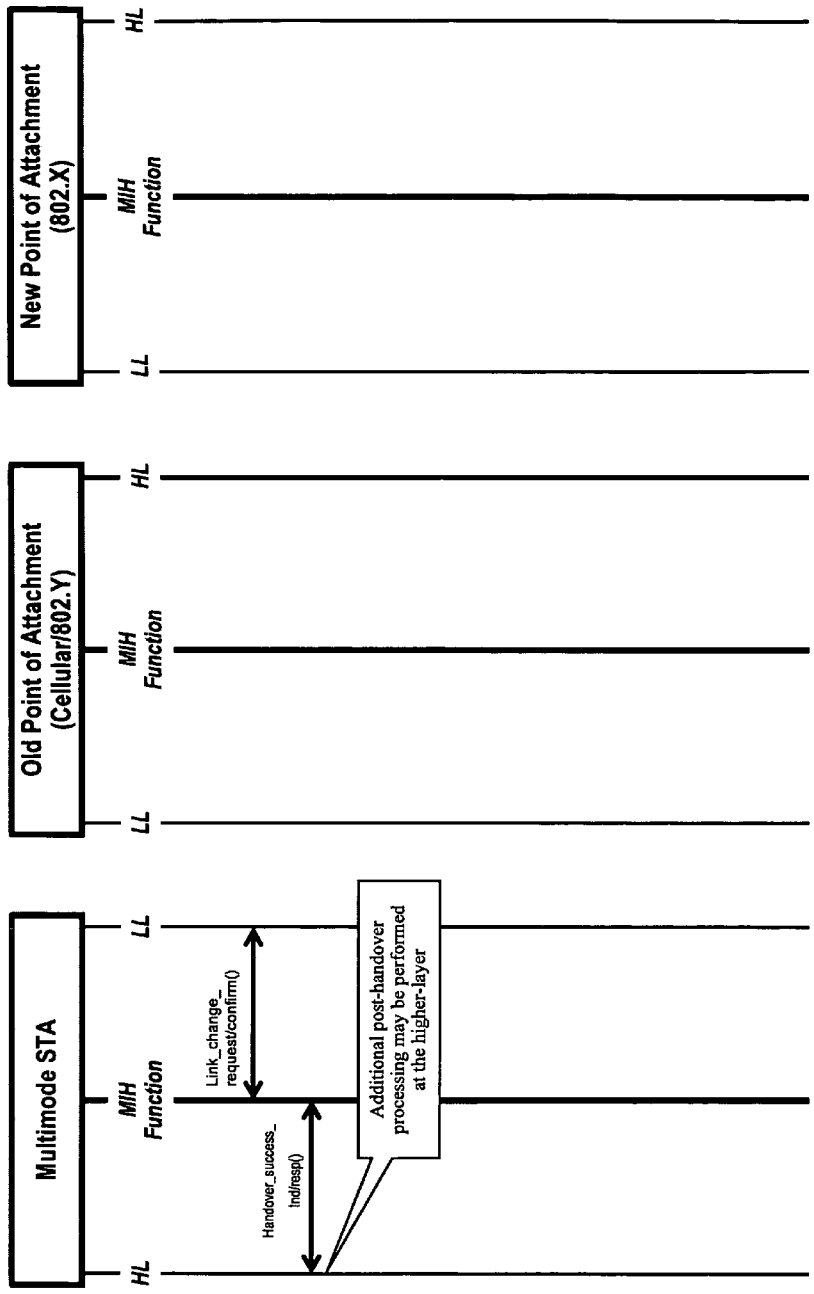

Service Access Point (SAP) Definition and Call Flow:

With reference to FIGS. 18(1) to 18(12), these figures show some illustrative embodiments and aspects related to Service Access Point (SAP) definition and call flow. In this regard, FIGS. 18(1) to 18(12) include a plurality of figures depicting the following:
- a) Media Independent Handover (MIH) flow of operation (FIG. 18(1));
- b) MIH functional model with SAP (FIG. 18(2));
- c) Local Triggers from Lower Layer (lower SAP)(FIG. 18(3));
- d) Functional Primitives to/from lower layer (lower SAP) (FIG. 18(4));
- e) Function Primitives to/from higher layer (higher SAP) (FIG. 18(5));
- f) Remote Functional Primitives (to and from network) (FIG. 18(6));
- g) 802.X to 802.X (single I/F) Handover Call Flow (FIGS. 18(7) to 18(8));
- h) Cellular/802.Y to/from 802.X Handover Call Flow (FIGS. 18(9) to 18(10));
- i) Mapping Between MIH Function and 3GPP Primitives (FIG. 18(11)); and
- j) Mapping Between MIH Function and 802.11 Primitives (FIG. 18(12)).

Various features and aspects of the embodiments depicted in FIGS. 18(1) to 18(12), as well as various potential modifications and/or adaptations, would be appreciated and understood by those of ordinary skill in the art based on this disclosure. See also IEEE 802.21 MEDIA INDEPENDENT HANDOVER, DCN: 21-04-0170-00-0000, Title: IEEE 802.21 Media Independent Handover Solution Proposal, apparently submitted Nov. 8, 2004, Yogesh Bhatt, Ajoy Singh, Nat Natarajan, Madjid Nakhjiri, Alistair Bultar, Lach Hong-Yon, the entire disclosure of which is incorporated herein by reference as though recited herein in full. See also IEEE 802.21 MEDIA INDEPENDENT HANDOVER, DCN: 21-04-0171-01-0000, Title: Initial Proposal to IEEE 802.21 from SAMSUNG, apparently submitted Nov. 17, 2004, Xiaoyu Liu, Youn-Hee Han, Vivek Gupta, Soo-Hong Park, Sungjin Lee, Hyungkyu Lim, Chihyun Park, Chongwon Kim, the entire disclosure of which is incorporated herein by reference.

Figure 19:
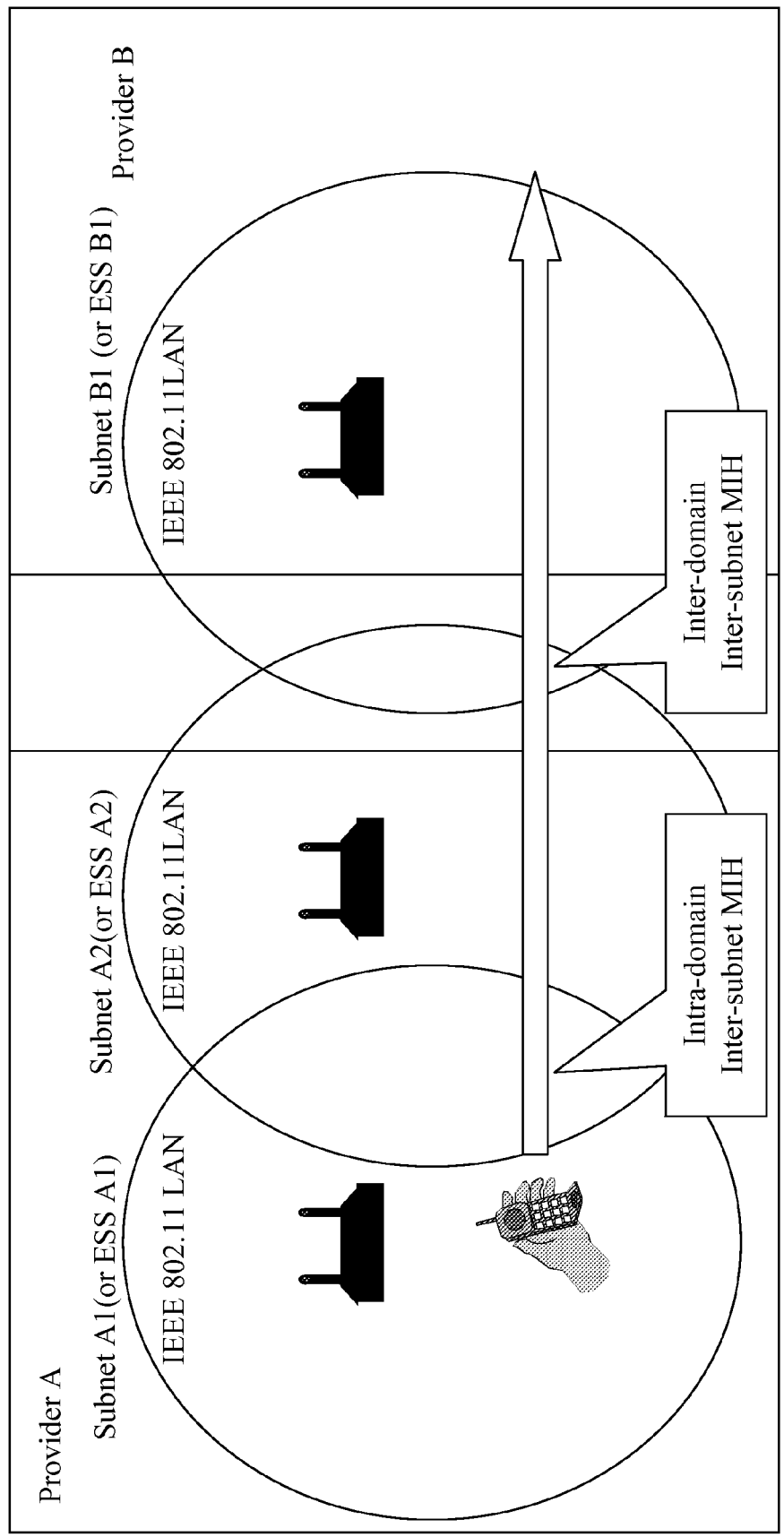
FIGS. 19(1)-19(13) are views showing some illustrative embodiments and aspects related to MIH function and Information Services as set forth in Attachment A to the above-listed first provisional application filed on Nov. 5, 2005.
Figure 19:
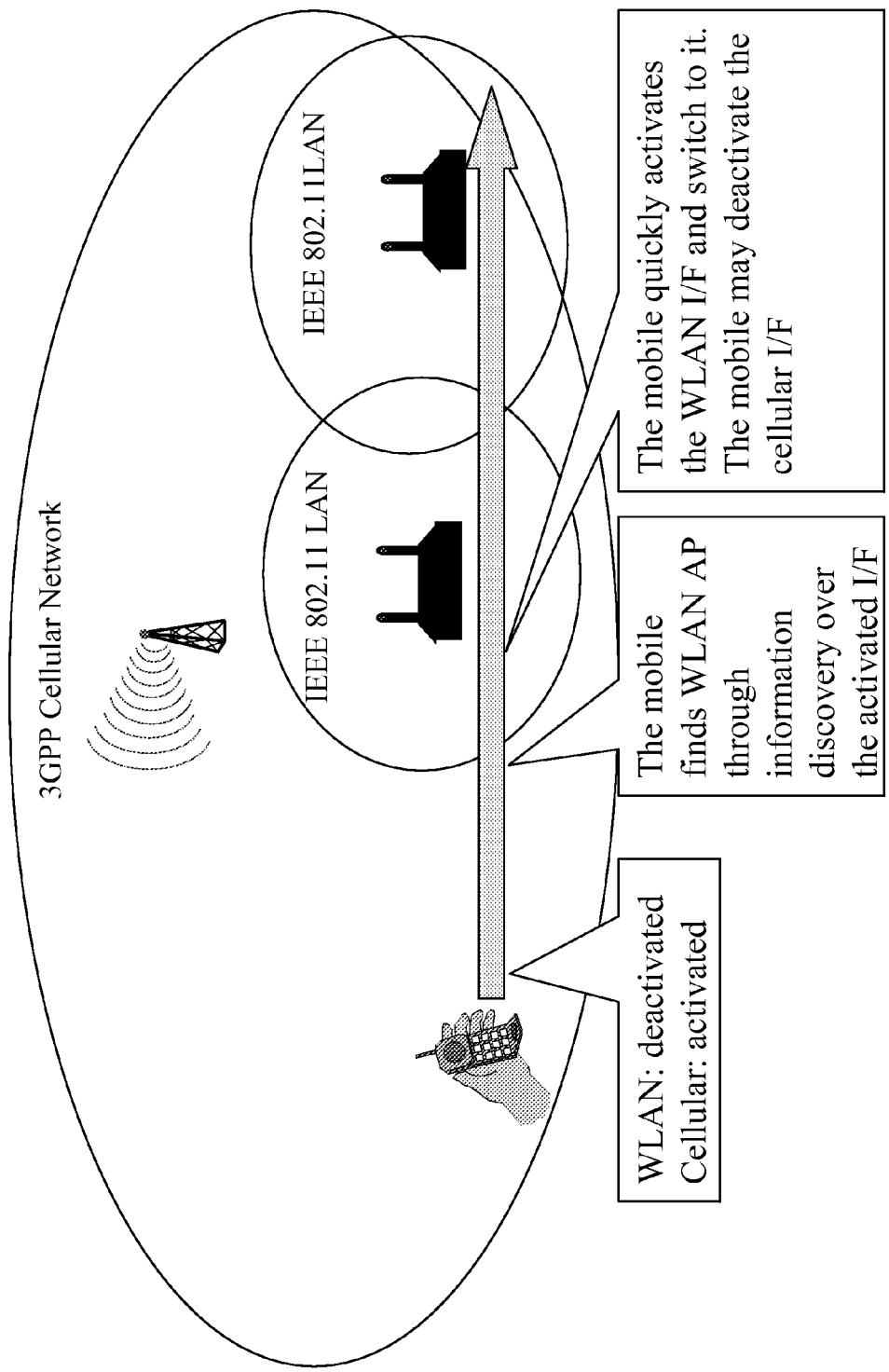
Figure 19:
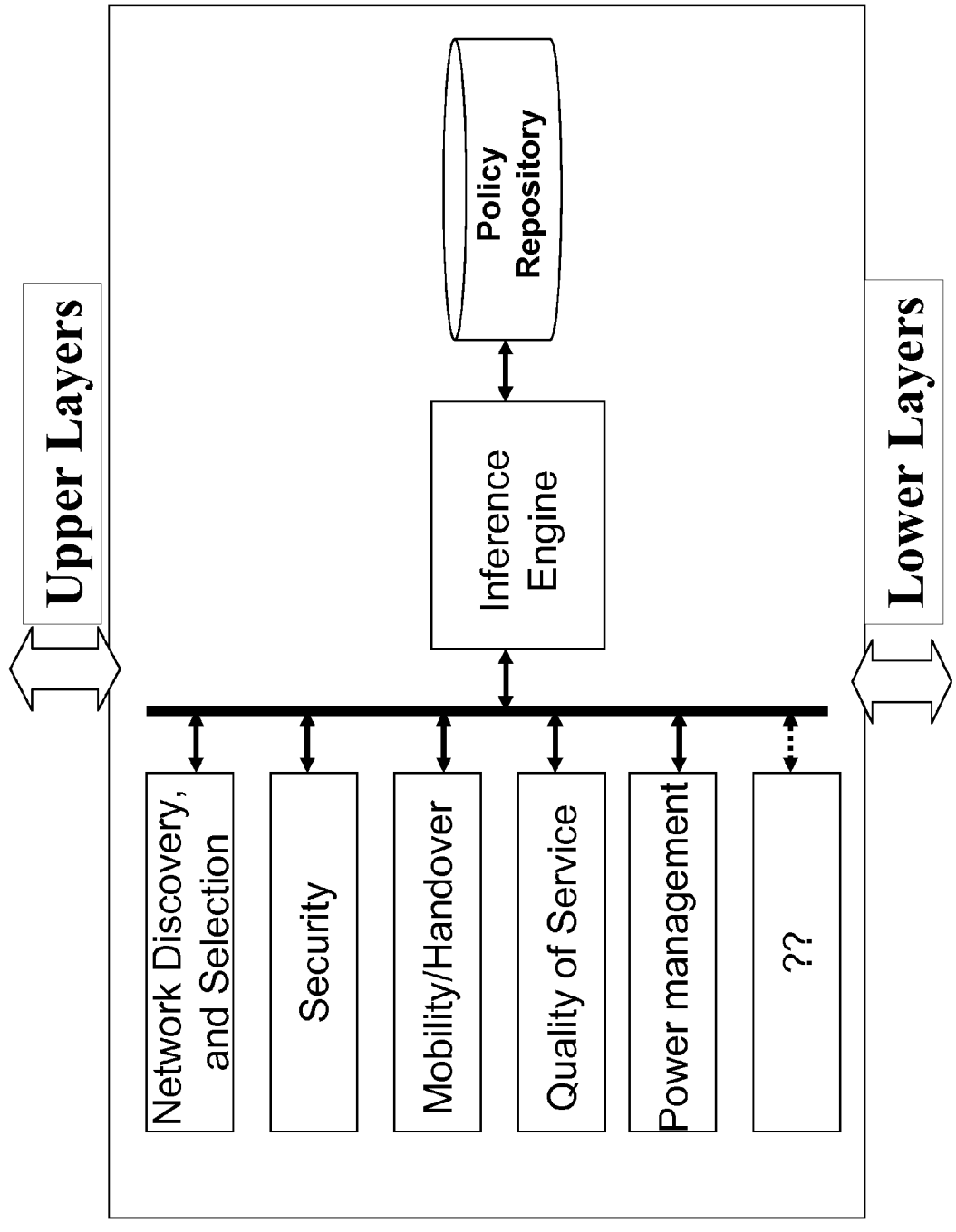
Figure 19:
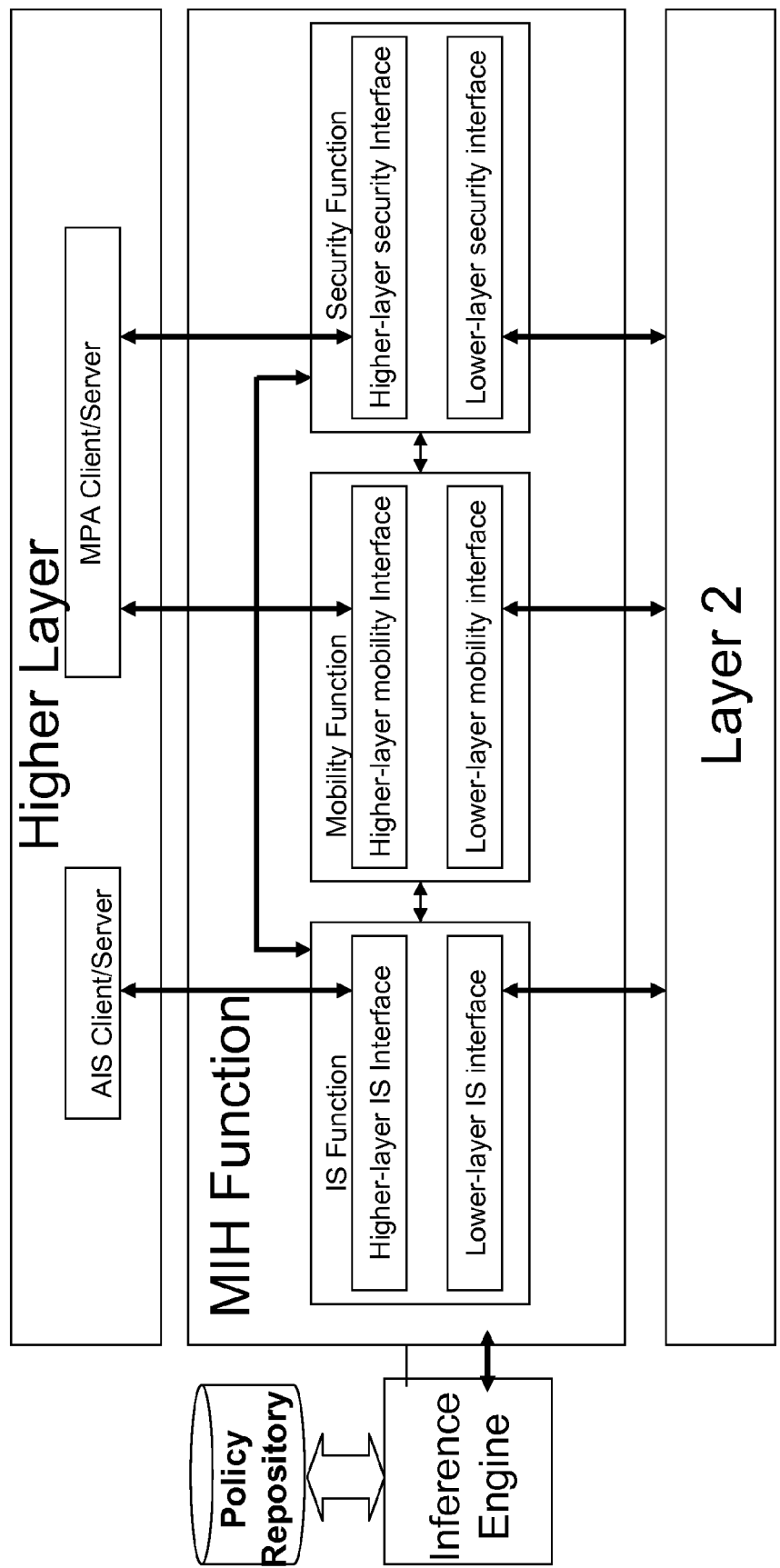
Figure 19:
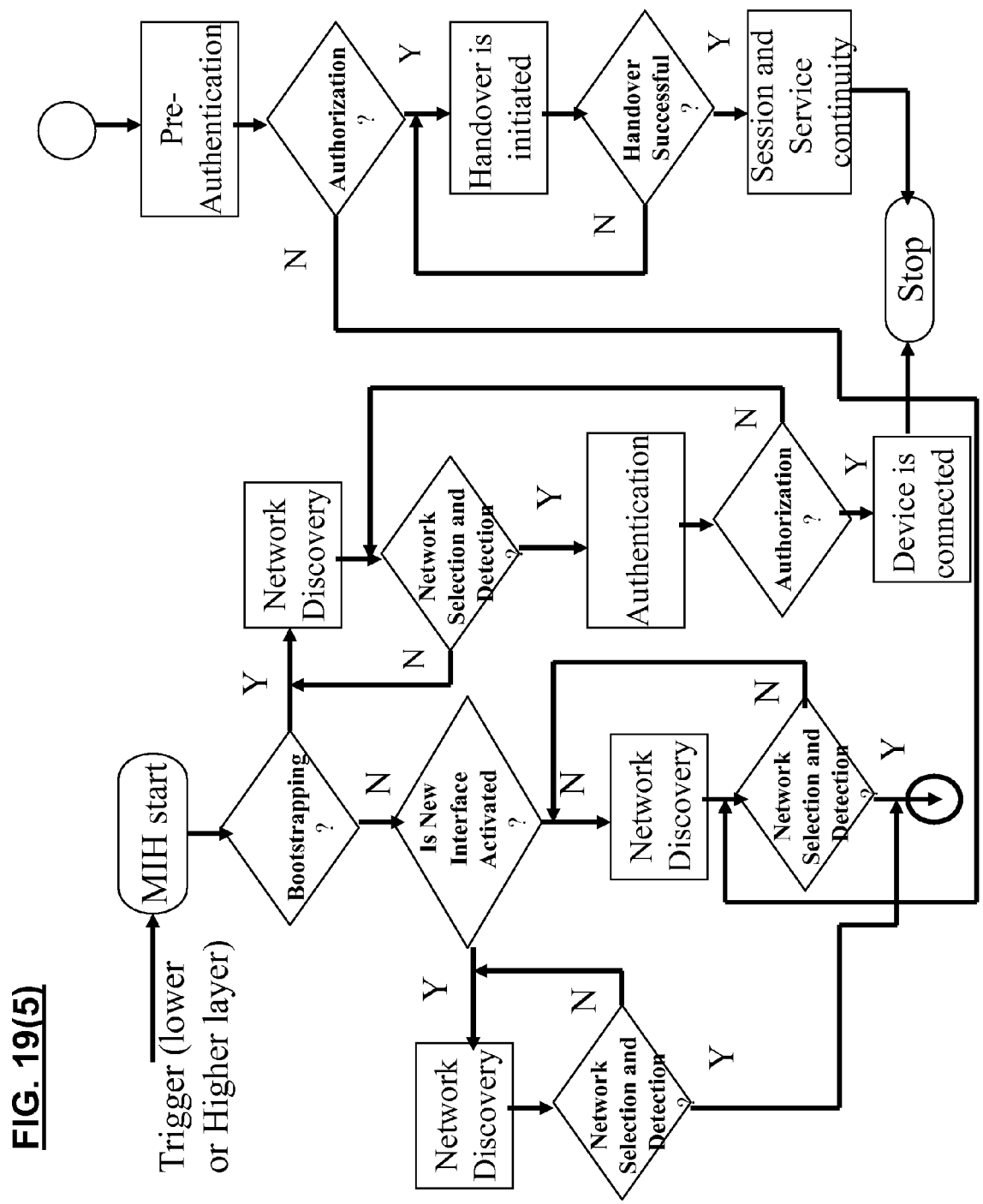
Figure 19:
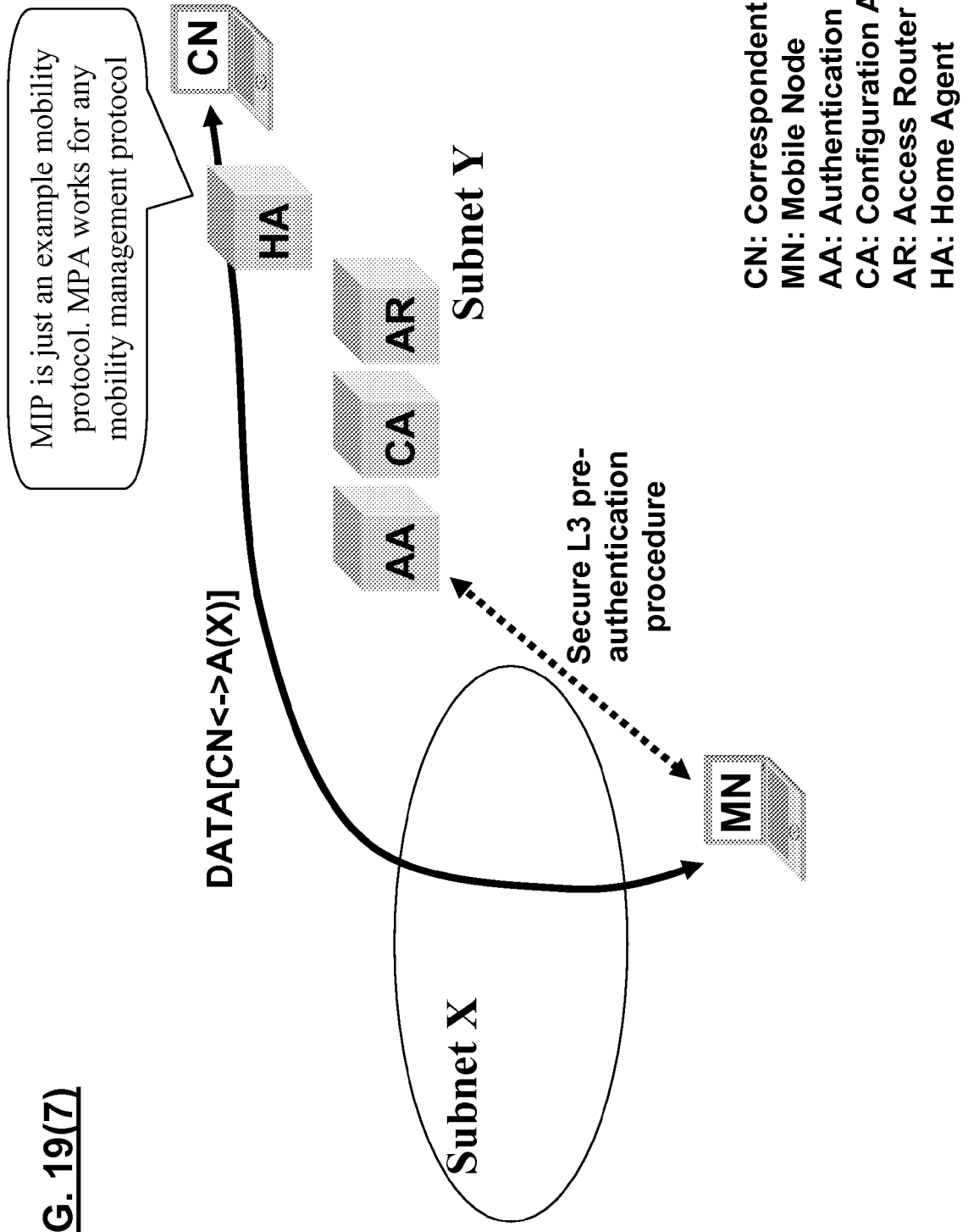
Figure 19:
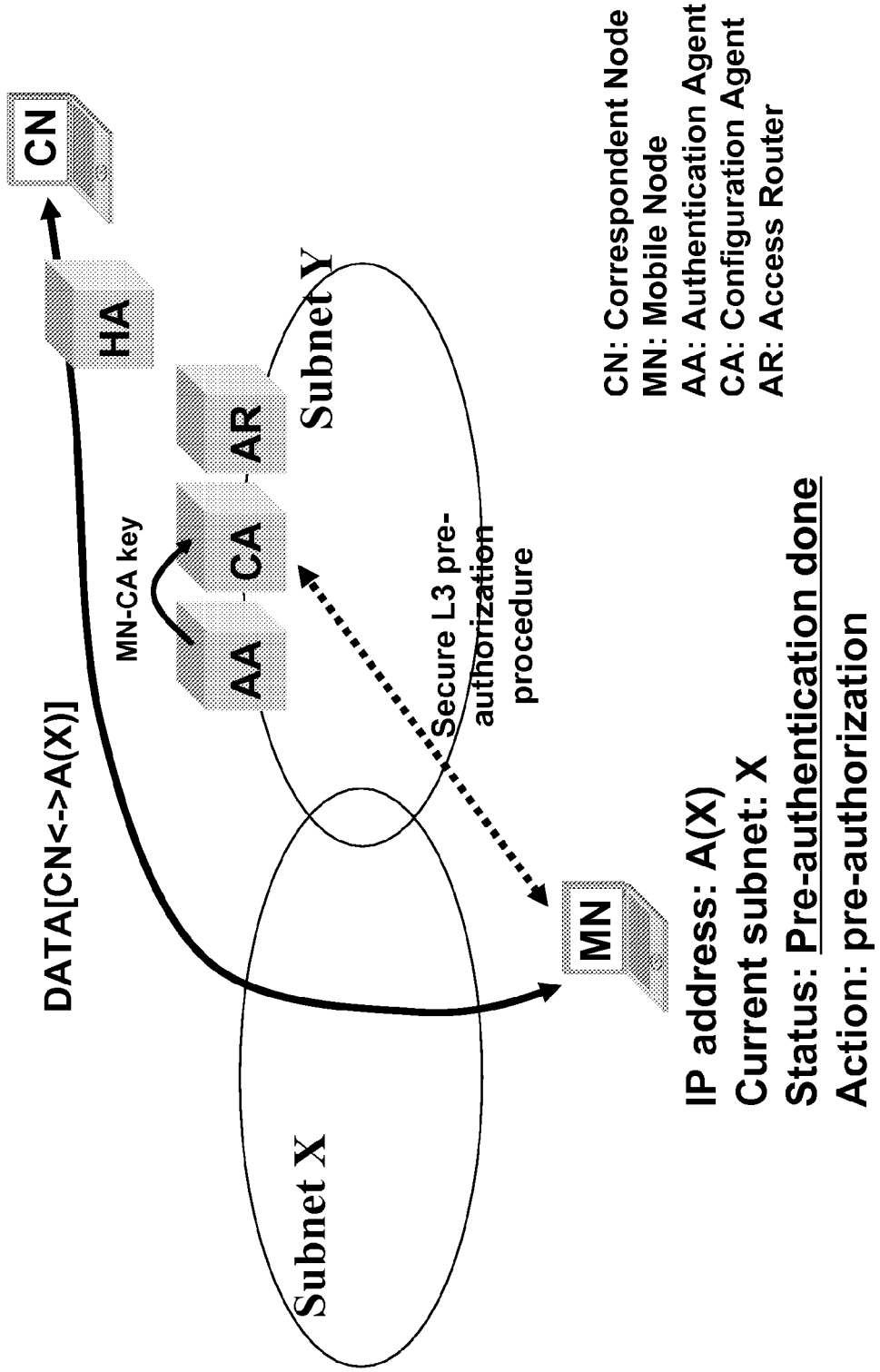
Figure 19:
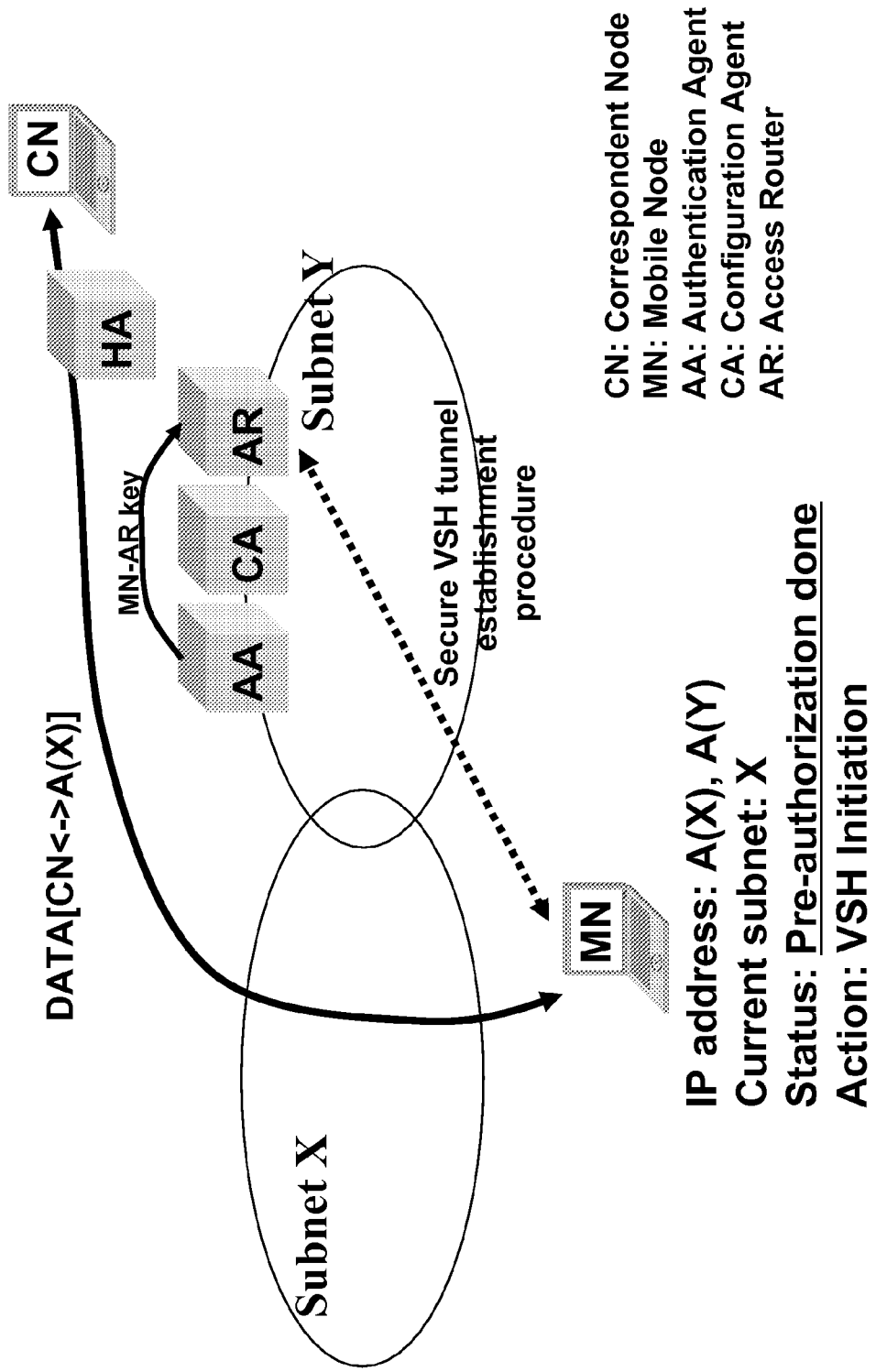
Figure 19:
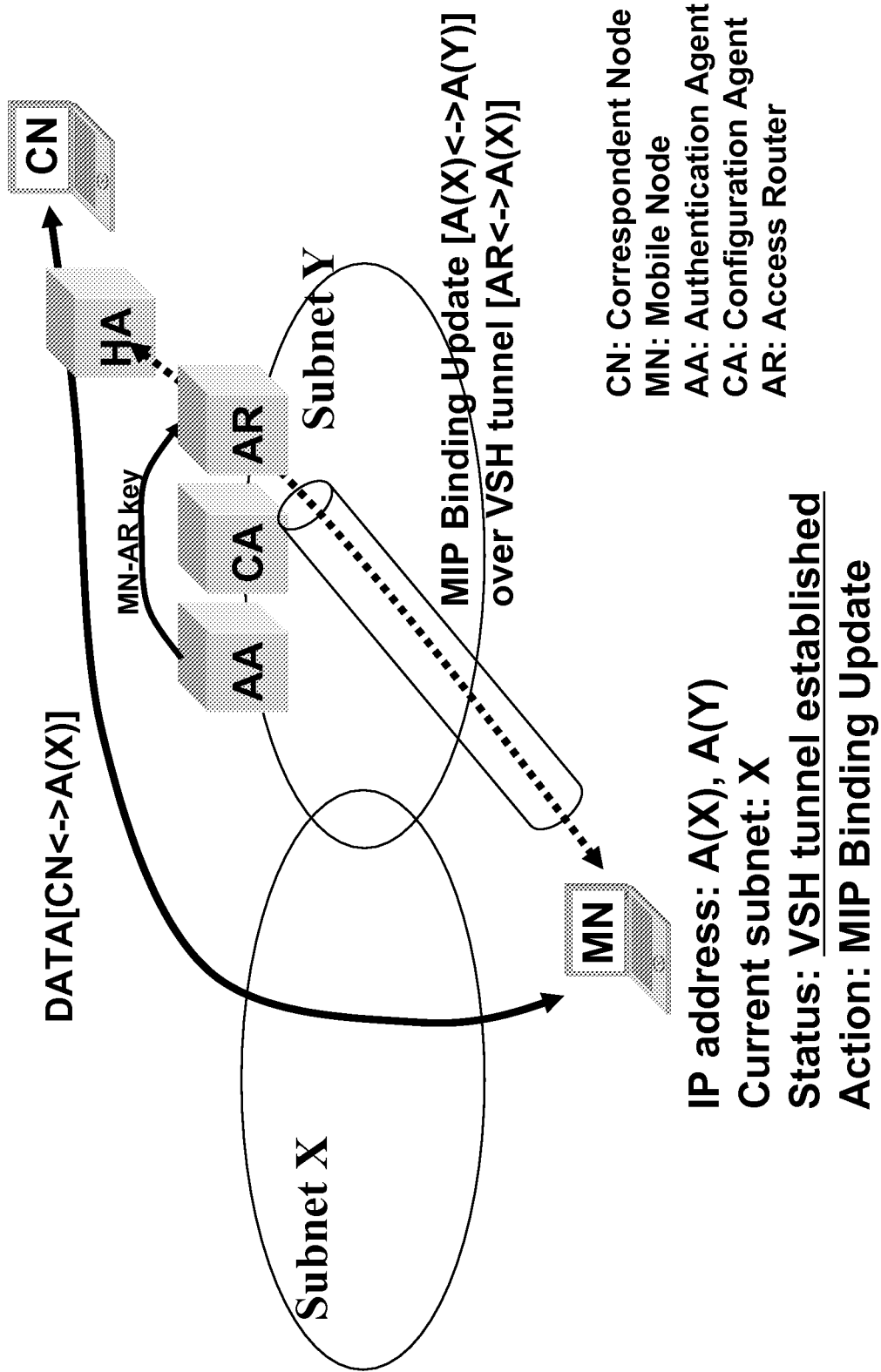
Figure 19:
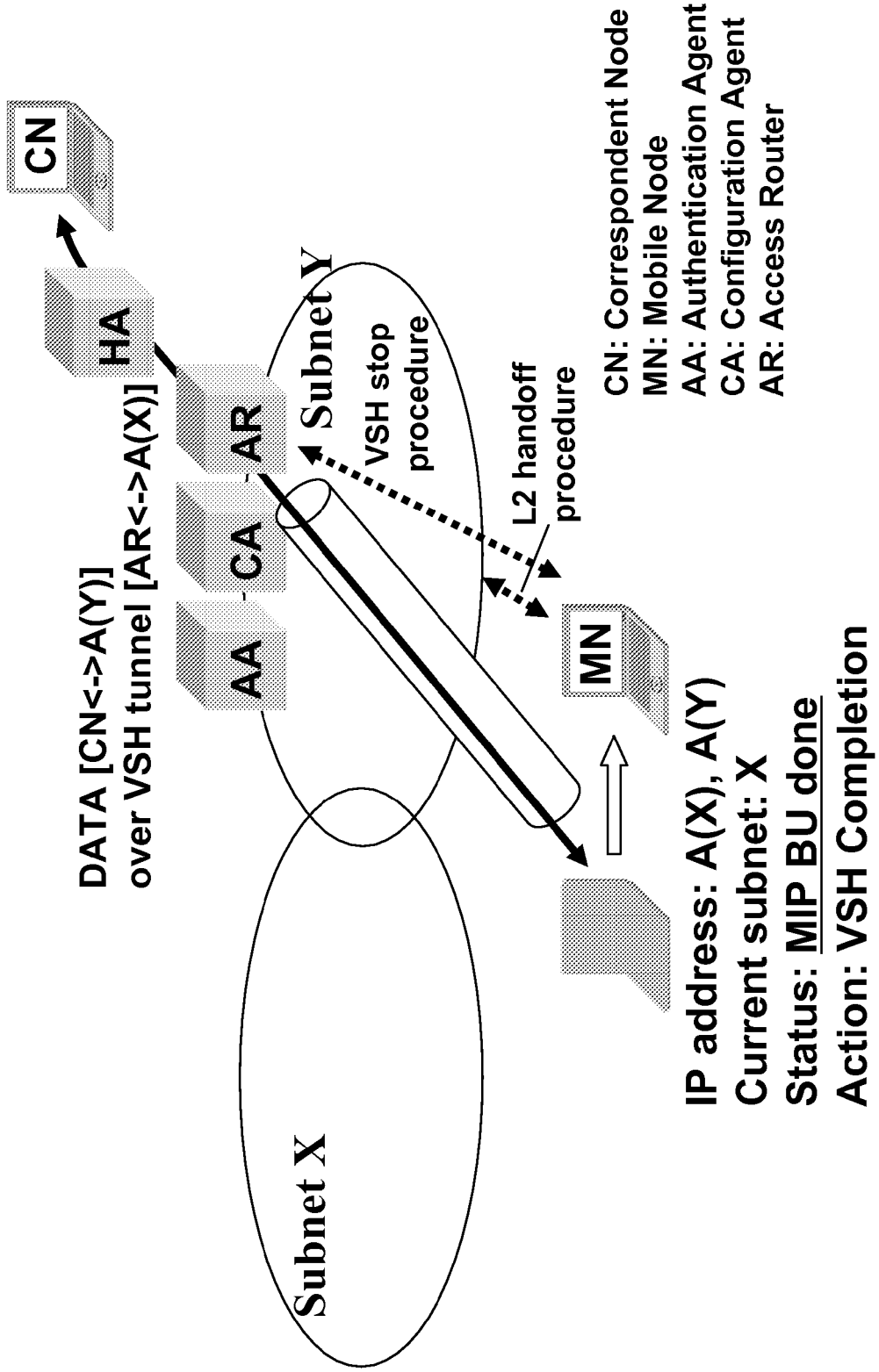
Figure 19:
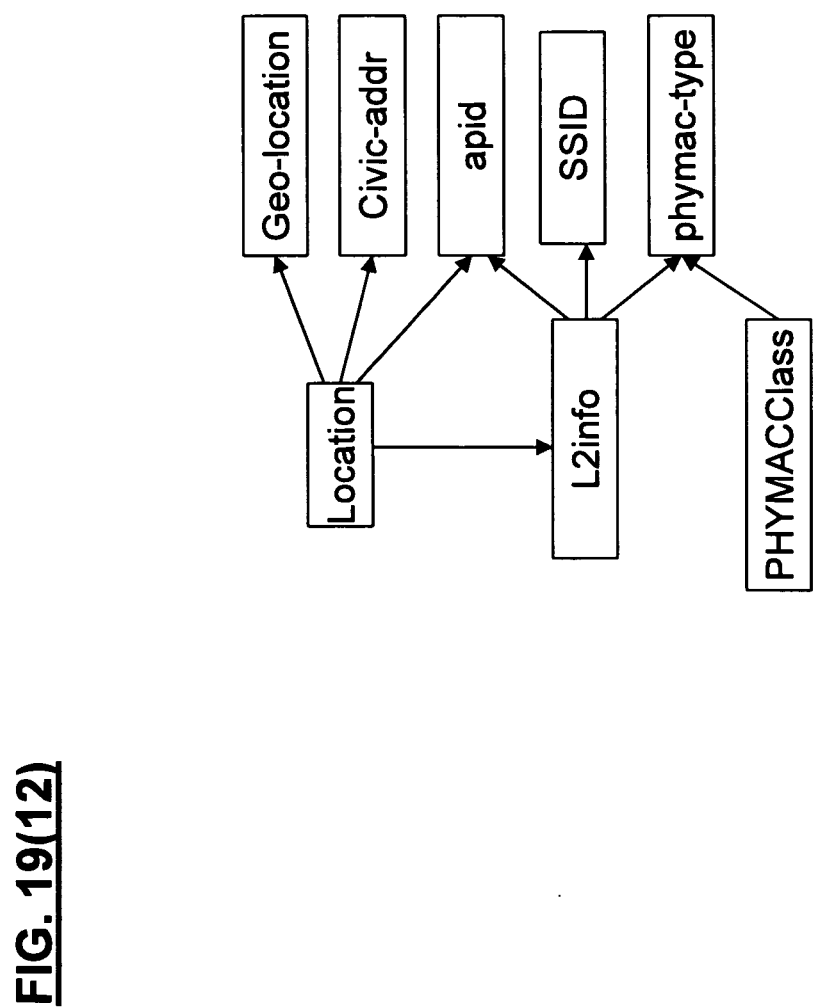
Figure 19:
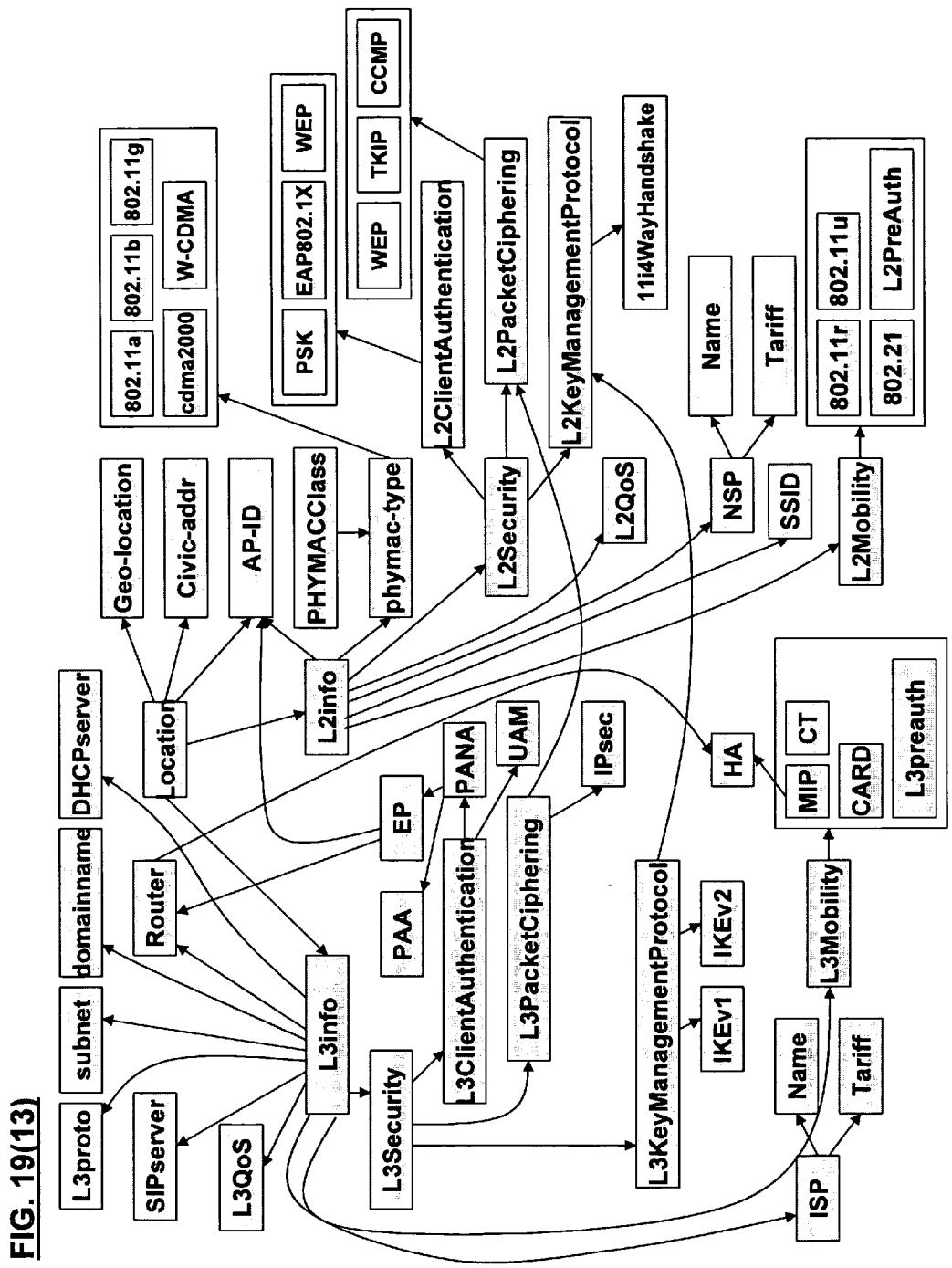

Illustrative Proposal for MIH Function and Information Services:

FIGS. 19(1)-19(13) are views showing some illustrative embodiments and aspects related to Media Independent Handover (MIH) function and Information Services as set forth in Attachment A to the above-listed provisional application filed on Nov. 5, 2005. In this regard, information therefrom is incorporated below.

Proposal Scope:
FIGS. 19(1)-19(13) relate to a partial proposal according to 802.21 requirements document.
Covers two important functions:
MIH function; and
Information Service.
Describes specific handover scenarios.
Proposal Outline:
Bootstrapping Issues:
When the device starts up.
May depend on how many interfaces the device has.
MIH function:
Generic MIH Primitives.
Primitives for secure and seamless handover and their mapping with upper layers.
Secure handover solution.
Information Service:
Discovery, detection and selection:
Information that the device needs for handover optimization.
Information service model.
Assumptions and Scenarios:
Assumptions:
Multiple radio interfaces for heterogeneous networks.
Single or multi(11 a/b/g) interface for homogeneous networks.
Scenarios addressed in this example:
802.11 to cellular.
802.11 to 802.3/WiMAX.
802.11 to 802.11.
Single Radio Interface Scenario:
A mobile node with a single IEEE 802.xx interface may roam among multiple subnets and multiple administrative domains.
MIH based on information obtained via L2 only has limitations.

MIH might need information from higher layers.
  Efficient inter-subnet and inter-domain handoff possible.
Single Radio Interface Roaming Scenario:
With reference to FIG. 19(1), a single radio interface roaming scenario is depicted.
Multiple Radio Interface Scenario:
A mobile node with multiple interfaces may want to deactivate unused interfaces.
As the mobile node moves, a deactivated interface may need to be activated depending on the radio conditions.
  Deactivated interfaces themselves cannot discover their access points/base stations.
    Information service that depends upon only on deactivated interface has some limitations.
MIH may further consider deactivated interfaces as candidates to switch from the currently activated interface.
  Fast interface activation may become a requirement for MIH.
Multiple Radio Interface Roaming Scenario:
With reference to FIG. 19(2), a multiple radio interface roaming scenario is depicted.
Bootstrapping Scenarios, Issues and Requirements:
Bootstrapping Scenario:
Device is powered up and interfaces are detecting network presence
Two distinct cases:
  Device is booting up for the first time in a visited network.
  Device is re-booting.
    Had connection before (a-priori knowledge of the network).
Presence of multiple providers:
  Similar networks (e.g., only WLAN networks).
  Dissimilar networks (e.g., WLAN, 3G).
Some Bootstrapping Issues:
Device may have limited information about the network unless access is authorized.
Device may not have any prior knowledge of the visited network.
Multiple networks may not have coverage in a particular region.
Device may not have higher layer information unless it is cached or pre-configured.
Device may not have proper security parameters to attach to a network.
Bootstrapping Solution Requirements:
Architecture components should address bootstrapping separately.
Pros and cons of each proposal should be evaluated based on security requirements.
Capability of an Example of the Current Solution:
An example of the proposed solution does not address the bootstrapping issues.
MIH functions:
Network Discovery.
Security.
Mobility/Handover.
Quality of Service.
Power Management.
Other.
Generic MIH Functional Model:
A generic MIH Functional Model is shown in FIG. 19(3).
MIH Functional Model (Information Service, Mobility and Security):
An MIH Functional Model (Information Service, Mobility and Security) is shown in FIG. 19(4).
Generic MIH Primitives:
Network Discovery primitives:
  Network name.
  IP address (network elements, DNS, SIP servers . . . , location).
  Network/Link type.
  Bandwidth.
  Cost of using the network.
Security Primitives:
  Security capabilities.
  Security parameters (keys, SAs, . . . ).
  Access privilege.
QoS primitives:
  Link type.
  QoS levels/mappings.
  Bandwidth.
Mobility/Handover Management:
  Mobility features supported.
    Protocols, velocity, real-time non-real-time, . . .
  Handover type.
    Soft handoff, hard handoff, . . .
Power Management.
  Sleep time, Wake time, . . .
  Power budget.
MIH Flow of Operation:
An MIH Flow of Operation is shown in FIG. 19(5).
MIH Functions: An Example:
Network Discovery.
  getNetworkName( ).
  getIPaddress ( ).
  gettypeof server( ).
  getBandwidth( ).
Security.
  getkeyinformation( ).
  getsecurityprotocol( ).
  getauthenticationserver( ).
Secure and Seamless Handover Solution:
The solution is based upon the concept of Pre-Authentication (PA) and can be, e.g., defined as:
  Mobile-assisted authentication scheme that obtains higher layer information a-priori to performing authentication and authorization before session and service handovers
MIH function performs this process on behalf of mobile users
MIH Pre-Authentication (MPA):
MIH Pre-Authentication.
  Provides a secure and seamless mobility optimization that works for:
    Inter-subnet handoff.
    Inter-domain handoff.
    Inter-technology handoff.
      Use of multiple interfaces.
  Defines a new mechanism at higher layer (e.g., Network).
    Supports IP address change (unlike Layer 2 (L2) pre-authentication where MAC address does not change).
Functional Components of MPA:
1) Pre-authentication
  Used for establishing a security association (SA) between the mobile and a network to which the mobile may move.
  L2 pre-authentication can also be enabled based on the established SA.

2) Pre-authorization
   Used for establishing contexts specific to the network to which the mobile will move.
      The SA created in (1) are used to secure the authorization procedure.
3) Virtual Soft Handoff (VSH)
   Used for sending/receiving IP packets based on the pre-authorized contexts by using the contexts of the current network.
Expected Result:
A figure depicting an illustrative expected result according to some embodiments is shown in FIG. 19(6).
Pre-Authentication:
FIG. 19(7) is a schematic diagram illustrating pre-authentication in some illustrative embodiments.
Pre-Authorization:
FIG. 19(8) is a schematic diagram illustrating pre-authorization in some illustrative embodiments.
Virtual Soft Handoff (VSH): Initiation Phase:
FIG. 19(9) is a schematic diagram illustrating an initial phase of a virtual soft handoff in some illustrative embodiments.
VSH: Tunneling Phase:
FIG. 19(10) is a schematic diagram illustrating a tunneling phase of a virtual soft handoff in some illustrative embodiments.
VSH: Completion Phase:
FIG. 19(11) is a schematic diagram illustrating a completion phase of a virtual soft handoff in some illustrative embodiments.
Information Service:
What is Information Service?
Information service can be defined, e.g., as:
   Network Discovery:
      Process by which device collects the information about the network(s).
   Network Detection:
      Process by which device attaches the network and collect the information.
   Network Selection:
      Process by which device selects appropriate network (e.g., from the information collected by discovery and detection).
Information Service Solution:
Application-layer mechanisms for Information Service (AIS).
   Network discovery is defined using XML-based technologies.
   Flexible way of retrieving L2 and L3 topological information.
Application-Layer Mechanisms for Information Service (AIS):
   An application-layer protocol that helps provide information about the networking elements of the neighboring networks.
   The information can consist of parameters about networking elements of various layers, e.g.:
      access point's MAC address, access router's IP address, security model, QoS.
   The information can be queried with using location information as a look-up key.
      Location information can be access point identifier, geographical address, civic address, etc.
   The information will augment MIH Pre-Authentication (MPA).
   Provides a link-layer agnostic solution.
   Provides the ability to move between the administrative domains.
   Provides a framework that uses the existing standards for access point and routers without making any changes.
   Provides a modular and flexible database using XML, RDF, SOAP
      RDF database can be constructed in a distributed fashion to scale to large number of networks.
      RDF can handle arbitrary interconnected data structure while LDAP handles tree-based data structure only.
      RDF provides querying schema as well as data themselves.
         Network information can frequently change its data structure as networking technologies evolve.
      Two basic approaches for construction of information service database:
      Network-assisted database construction model.
      Mobile-assisted database construction model.
   AIS Comparison with L2 Information Service:
   Information service at L2 is needed for initial network attachment where no IP connectivity is available at the beginning.
   Information service at L2 has some limitations.
      If information is broadcast in beacons, it consumes a lot of bandwidth.
      The mobile needs to be in radio coverage of APs that provide information service.
         A mobile moving at a high velocity may need the information before entering the radio coverage of the network.
         A multi-interface mobile may want to discover APs for a deactivated interface through the active interface.
      Difficult to handle large-sized data due to lack of fragmentation in some link-2 protocols (e.g., 802.3).
   AIS can overcome such limitations.
   AIS-aided Secured Seamless Handoff:
   Secured seamless handoff with MPA is based on the information retrieved from the neighboring networking elements such as:
      routers, SIP servers, PANA authentication agents, etc.
   See also FIG. 12 which depicts an integration of network discovery and secure seamless handoff.
   Information Query Example:
   See FIG. 12 which depicts an illustrative information query example.
   RDF Schema for AIS (partial view):
   FIG. 19(12) shows an illustrative Graphical View of the Schema.
   RDF Schema for AIS (detailed view):
   FIG. 19(13) shows an illustrative detailed Graphical View of the Schema.
   Handover Scenarios:
   Handover from 802.11 to Cellular networks.
   Handover from 802.11 to 802.11 networks.
   Handover from 802.11 to 802.3 networks.
Introduction to Information Service Schema:
   A schema defines structure of information. A schema is used in the 802.21 information service to define the structure of each information element as well as the relationship among different information elements supported. The 802.21 information service schema needs to be supported by every MIH Function that implements the MIIS to support flexible and efficient information queries. The 802.21 information service defines the various information elements and their structure. The various IEs represent information about lower layers of network stack as well as about higher layer services available in different access networks. A schema is defined by a language and can be represented in multiple ways. Examples include Resource Description Framework (RDF) which is based on, e.g., XML, ASN.1 which is used in 802 MlBs, Variants or a simple TLV representation of different information elements.

The MIIS schema is classified into two major categories. Basic schema that is essential for every MIH to support and Extended schema that is optional and can be vendor specific.
RDF Schema Representation:

This section gives an example of schema using Resource Description Framework (RDF). See 3GPP TS 23.234, "3GPP system to Wireless Local Area Network (WLAN) inter-working; System description" (Reference [8]). RDF uses SPARQL (see 3GPP TS 23.060, "General Packet Radio Service (GPRS); Service Description; Stage 2" (Reference [7])) as a query language for querying information. Both RDF schema and SPARQL are represented in XML. An RDF schema defines the structure of set of expressions, where the underlying structure of any expression is a collection of triples, each consisting of a subject, a predicate and an object. XML syntax for RDF called RDF/XML is defined in GPP TR 43.901 "Feasibility Study on Generic Access to A/Gb Interface" (Reference [9]).

RDF has, e.g., the following advantages:
Supports both hierarchical and non-hierarchical information structure.
Allows for flexible data query
Allows for distributed schema definition
Easier way to change the schema definition As discussed below, the RDF schema definition for MIIS has two parts: the basic and the extended schema. The basic schema is not supposed to be updated. An MIH entity is typically pre-provisioned with the basic schema for ease of implementation of schema-based query. In scenarios where the basic schema is not pre-provisioned methods such as DNS query may be used to access the location (FQDN) of the basic schema.

Unlike the basic schema, the extended schema is expected to be updated periodically, e.g., when a new link-layer technology is introduced. The extended schema can be retrieved from the specified URL via the IEEE 802.21 information service using the schema query capability described in Section 8.5.3 of IEEE 802.21 Media Independent Handover Services21-05-xxxx-00-0000-One_Proposal_Draft_Text without any pre-provision of such extended schema. The URL of the extended schema can also be obtained via the schema URL query capability described in said section 8.5.3. Alternatively, a DNS query may be used for finding out the location (FQDN part) of extended schema. The extended schema is defined as an extension of the basic schema and includes data structure and relationship of media-specific or higher-layer information. In that sense extended schema is the complement of basic schema.
Support for RDF/XML Schema in IEEE 802.21 Information Service:
1. Introduction This section of this document contains (1) RDF/XML schema definition for IEEE 802.21 information service, (2) required changes to the information service primitives described in Reference [1] (attached to said priority provisional application filed on Apr. 13, 2005) to support RDF/XML based IEEE 802.21 information service and (3) example usage of the primitives using RDF/XML based IEEE 802.21 information service.

2. RDF/XML Schema Definition for IEEE 802.21 Information Service

The RDF/XML schema definition for IEEE 802.21 information service has two parts, i.e., the basic schema and the extended schema. Every MIH entity must be pre-provisioned with the basic schema. The basic schema is not supposed to be updated. The rest of the RDF/XML schema is the extended schema. Unlike the basic schema, the extended schema is supposed to be updated, e.g., when a new link-layer technology is introduced, and an MIH entity does not need to be pre-provisioned with the extended schema. Instead, the extended schema can be retrieved via the information service using, e.g., the schema query capability described in part 3 below.

Figure 20:
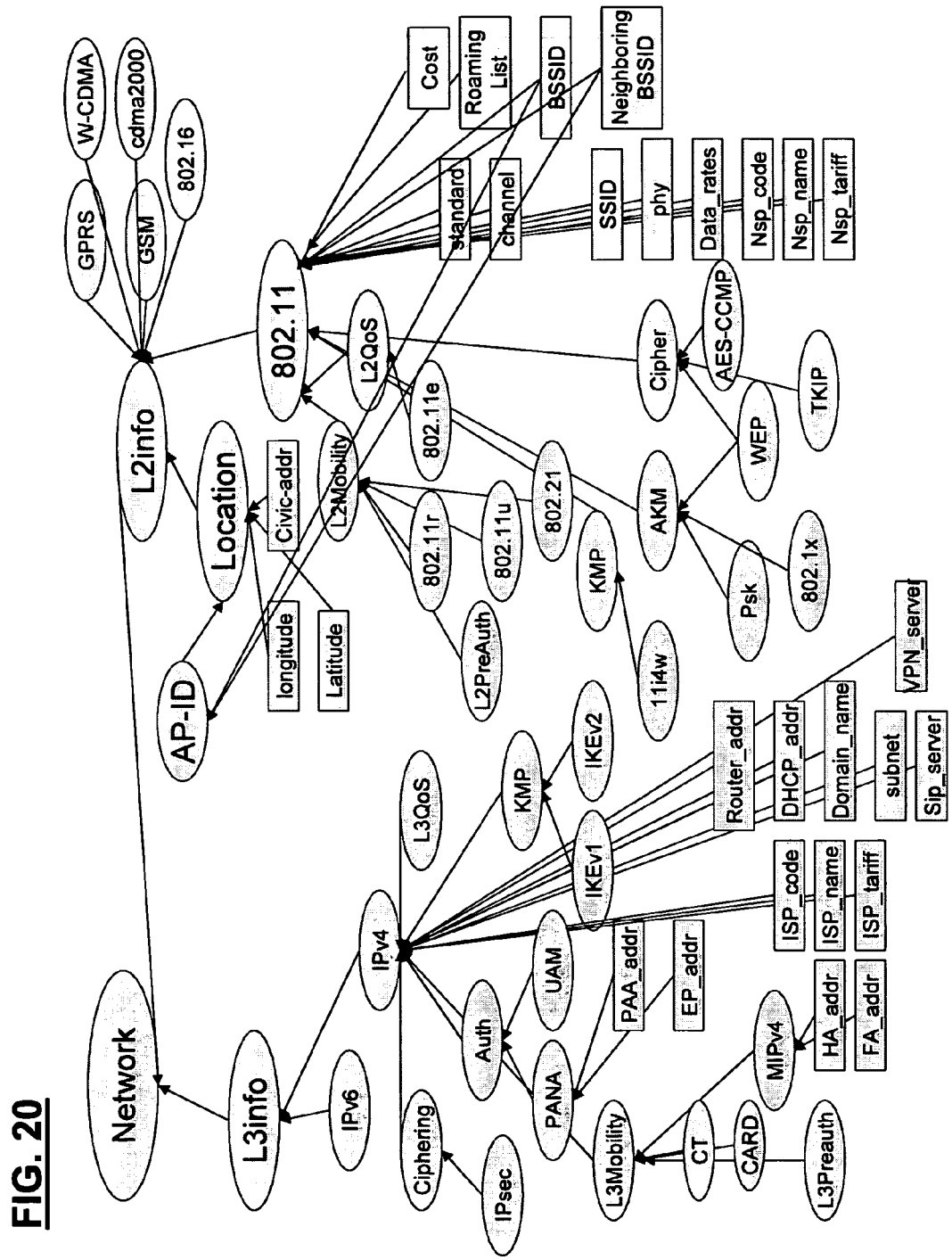
FIG. 20 shows a graphical representation of the currently defined RDF/XML schema.

FIG. 20 shows a graphical representation of the currently defined RDF/XML schema.

2.1. The Basic Schema

The basic schema is represented in RDF/XML format as shown in FIGS. 21(1)-21(2).

2.2. The Extended Schema

An extended schema is represented in RDF/XML format as shown in FIGS. 21(3)-21(12).

3. Information Service Primitives Supporting RDF/XML Schema

In [1], two primitives are defined for IEEE 802.21 information service, i.e., MIH_information.request and MIH_information.response as follows.

| MIH_Information.request | | | |
|---|---|---|---|
| ( | | | |
| InfoQueryFilter, | | | |
| InfoQueryParameters, | | | |
| QueryID | | | |
| ) | | | |

| Name | Type | Valid Range | Description |
|---|---|---|---|
| InfoQueryFilter | Combination of QueryFilterType flags | N/A | A set of query filters which control the type and amount of information that is retrieved. |
| InfoQueryParameters | | N/A | Query filter specific parameters which indicate the type of information the client may be interested in. |
| QueryId | Integer | N/A | A unique QueryId to help match requests with responses. |

| Name | Type | Valid Range | Description |
|---|---|---|---|
| | MIH_Information.response ( InfoQueryFilter, MIH_REPORT, QueryID, status ) | | |
| InfoQueryFilter | Combination of QueryFilterType flags | N/A | A set of query filters which control the type and amount of information that is retrieved. |
| MIH_REPORT | | N/A | Report consisting of information |

-continued

| | | | |
|---|---|---|---|
| QueryId | Integer | N/A | requested by the L3MP or MIH Used to match response with requests |
| Status | Success/Failure | N/A | Specifies whether the information was successfully retrieved or not. |

To support information service based on RDF/XML schema, the following changes are made to the information service primitives.

3.1. Neighbor Graph Query

A new InfoQueryFilter type "FILTER_INFO_NEIGHBOR_NETWORKS" is defined. When this InfoQueryFilter type is specified, the InfoQueryParameters must be a string which contains a SPARQL query [2] where the SPARQL query is supposed to contain an appropriate query for obtaining a neighbor graph. The MIH_REPORT of the corresponding MIH_information.response must be a string which contains a SPARQL query result [3].

An example query request and response when FILTER_INFO_NEIGHBOR_NETWORKS is specified as InfoQueryFilter is shown below.

```
MIH_Information.request (FILTER_INFO_NEIGHBOR_NETWORKS,
        "PREFIX ndext:
<http://www.networkdiscovery.org/2005/04/rdf-extended-schema/>
SELECT ?z1
WHERE (?x1 ndext:802.11-neighboring-bssid ?z1)
        (?x1 ndext:802.11-bssid, "12:34:56:78:9a:bc")", 123)
MIH_Information.response(FILTER_INFO_NEIGHBOR_NETWORKS,
"<?xml version="1.0"?>
<sparql xmlns="http://www.w3.org/2001/sw/DataAccess/rf1/result">
    <head>
        <variable name="802.11-neighboring-bssid"/>
    </head>

<result>
            <802.11-neighboring-bssid>aa:bb:cc:dd:ee:ff</802.11-neighboring-bssid>
        </result>
        <result>
            <802.11-neighboring-bssid>00:11:22:33:44:55</802.11-neighboring-bssid>
        <result>
        </result>
            <802.11-neighboring-bssid>01:23:45:67:89:ab</802.11-neighboring-bssid>
        <result>

</sparql>",
123)
```

3.2 General RDF/XML Data Query

A new InfoQueryFilter type "FILTER_INFO_DATA" is defined. When this InfoQueryFilter type is specified, the InfoQueryParameters must be a string which contains a SPARQL query [2] where the SPARQL query is supposed to contain an appropriate query for obtaining expected RDF/XML data. The MIH_REPORT of the corresponding MIH_information.response must be a string which contains a SPARQL query result [3].

An example query request and response when FILTER_INFO_DATA is specified as InfoQueryFilter is shown below.

```
MIH_Information.request (FILTER_INFO_DATA,
    "PREFIX ndext:<http://www/networkdiscovery.org/2005/04/rdf-extended-schema/>
    SELECT ?z
    WHERE (?x, ndext:dhcp_server_address, ?z)
            (?x ndext:router_address, 12.34.56.1)",
    123)
MIH_Information.response(FILTER_INFO_DATA
"<?xml version="1.0"?>
<sparql xmlns="http://www.w3.org/2001/sw/DataAccess/rf1/result">
    <head>
        <variable name="dhcp_server_address"/>
```

```
        </head>

<result>
                <dhcp_server_address>12.34.56.78</dhcp_server_address>
            </result>

</sparql>",
123)
```

3.3 RDF/XML Schema URL Query

A new InfoQueryFilter type "FILTER_INFO_SCHEMA_URL" is defined. When this InfoQueryFilter type is specified, the InfoQueryParameters must be a null string. The MIH_REPORT of the corresponding MIH_information.response must be a string which contains a URL for the extended schema. It is left to the implementation how to retrieve the extended schema from the obtained URL.

An example query request and response when FILTER_INFO_SCHEMA_URL is specified as InfoQueryFilter is shown below.
MIH_Information.request(FILTER_INFO_SCHEMA_URL, "", 123)
MIH_Information.response(FILTER_INFO_SCHEMA_URL, "http://www.networkdiscovery.org/2005/04/rdf-extended-schema/",123)

3.4 RDF/XML Schema Query

A new InfoQueryFilter type "FILTER_INFO_SCHEMA" is defined. When this InfoQueryFilter type is specified, the InfoQueryParameters must be a string which contains an XML-formatted RDF subject in question and optionally an integer that specifies the depth of the search in the schema graph. The default depth value is zero (0) which represents that there is no limit in the depth of the search. When a depth parameter is specified in addition to an RDF subject parameter, a comma (",") is used as the delimiter of the two parameters. The MIH_REPORT of the corresponding MIH_information.response must be a string which contains the obtained RDF/XML schema.

An example query request and response when FILTER_INFO_SCHEMA is specified as InfoQueryFilter is shown below.

4. References

The following references are incorporated herein by reference in their entireties.

[1] "MEDIA INDEPENDENT HANDOVER", 21-05-0240-01-0000-Joint_MIH_Proposal_Draft_Text-07 (see Appendix A of the above-listed priority provisional application filed on Apr. 13, 2005, incorporated herein by reference in its entirety).

[2] "SPARQL Query Language for RDF", http://wwww.w3.org/TR/rdf-sparql-query/.

[3] "SPARQL Variable Binding Results XML Foramt", http://www.w3.org/TR/2004/WD-rdf-sparql-XMLres-20041221/.

RDF Schema Update for 802.21 Baseline Document:

1. Introduction

This section of this application contains proposed changes in the RDF Schema defined in 21-05-0271-00-0000-One_Proposal_Draft_Text (802.21 baseline document), see the above-referenced provisional patent application filed on Jul. 11, 2005 at APPENDIX A.

The RDF schema in the baseline document defines classes and properties and relationships among them. However, detailed data types as well as cardinalities are missing in each property. Without defining this level of details, it is likely that properties used by the 802.21 information service are encoded differently by different realizations.

The present section of this application, among other things, defines detailed data types as well as cardinalities for each property of the 802.21 basic schema and an extended schema by using OWL (Web Ontology Language) which is defined in World Wide Web Consortium together with RDF and RDF schema.

```
MIH_Information.request(FILTER_INFO_SCHEMA,
"<rdfs:Class rdf:about="http://www.networkdiscovery.org/2005/04/rdf-basic-schema/Network">,0",
123)
MIH_Information.response(FILTER_INFO_SCHEMA,
"<rdf:RDF xml:lang="en"
xmlns:rdf="http://www.w3.org/1999/02/22-rdf-syntax-ns#"
xmlns:rdfs="http://www.w3.org/2000/01/rdf-schema#"
xmlns:nd="http://www.networkdiscovery.org/2005/04/rdf-basic-schema/">
<rdfs:Class rdf:about="http://www.networkdiscovery.org/2005/04/rdf-basic-schema/Network">
<rdfs:subClassOf rdf:resource="http://www.w3.org/2000/01/rdf-schema#Resource"/>
</rdfs:Class>
<rdfs:Class rdf:about="http://www.networkdiscovery.org/2005/04/rdf-basic-schema/L2info">
<rdfs:subClassOf rdf:resource="http://www.networkdiscovery.org/2005/04/rdf-basic-
schema/Network"/>
</rdfs:Class>
....
<rdfs:Class rdf:about="http://www.networkdiscovery.org/2005/04/rdf-basic-schema/IPv4">
<rdfs:subClassOf rdf:resource="http://www.networkdiscovery.org/2005/04/rdf-schema/L3info"/>
</rdfs:Class>
<rdfs:Class rdf:about="http://www.networkdiscovery.org/2005/04/rdf-basic-schema/IPv6">
<rdfs:subClassOf rdf:resource="http://www.networkdiscovery.org/2005/04/rdf-schema/L3info"/>
</rdfs:Class>
</rdf:RDF>",123)
```

"In order to strictly define each information element in an RDF schema, the schema is augmented with Web Ontology language (OWL) [14].

OWL is a Web Ontology language. OWL uses both URIs (Uniform Resource Identifiers) for naming and the description framework provided by RDF (Resource Description Framework) to add the following capabilities to ontologies:

Ability to be distributed across many systems

Scalability

Compatibility with other Web standards for accessibility and internationalization Openess and extensiblility OWL builds on RDF and RDF Schema and adds more vocabulary for describing properties and classes: among others, relations between classes (e.g. disjointness), cardinality (e.g. "exactly one"), equality, richer typing of properties, characteristics of properties (e.g. symmetry), and enumerated classes."

Figure 22:
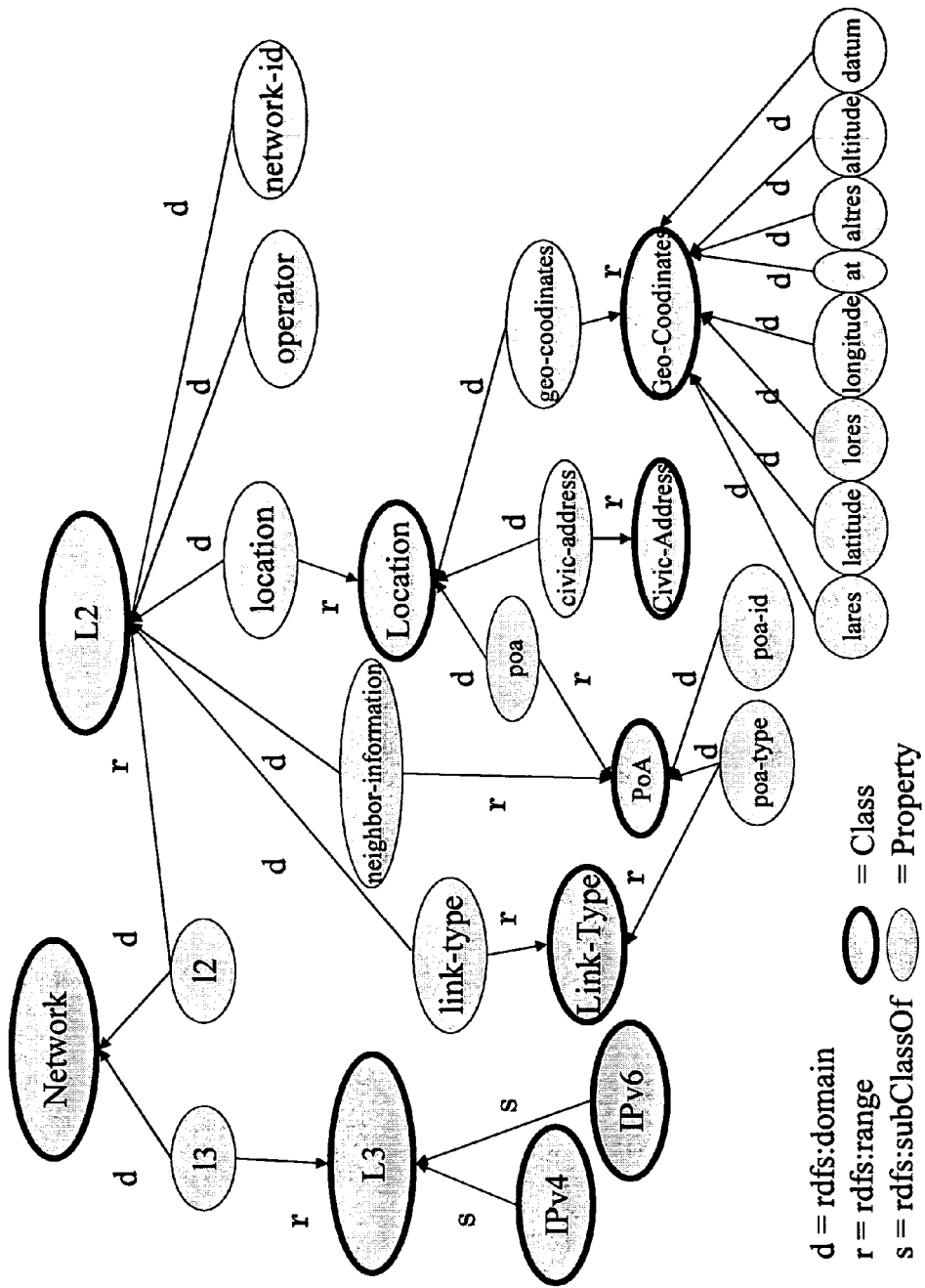
FIG. 22 shows an example graphical representation of the 802.21 MIIS basic schema in which 'Network' 'L2', 'L3' 'Location' 'IPv4', 'IPv6', 'Link-Type', 'PoA', "Civic Address', 'Geo-Coordinates' are represented as class, while all others are properties of classes.

FIG. 22 shows an example graphical representation of the 802.21 MIIS basic schema in which 'Network' 'L2", 'L3' 'Location' 'IPv4', 'IPv6', 'Link-Type', 'PoA', "Civic Address', 'Geo-Coordinates' are represented as class, while all others are properties of classes. The lines indicate either the range or domain of a property or a sub class of a class. In particular 'r' represents the range of a property and 'd' represents domain of a property. 'Domain' defines the class that a particular property belongs to and 'range' defines a type of a particular property. A distinct instance of 'Network' class is allocated for each PoA.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example;" and "NB" which means "note well."

What is claimed is:

1. A method for network discovery of a mobile device to use at least one of a plurality of access networks within an IP network, comprising:

said mobile device querying specified network information in the vicinity of a specific location based on a condition; and providing the mobile device with network information in the vicinity of said specific location, wherein said network information satisfies the condition specified by the querying;

wherein said specific location is based on a geo-coordinate of said mobile device or an address of an access point, and wherein said condition is a distance condition based on a range of geo-coordinates of the mobile device, said range of geo-coordinates being based on the velocity or mobility pattern of the mobile device.

2. The method of claim 1, further including:

a) dynamically populating at least one discovery database of network information of an information server; and b) transmitting network information about a target network from said at least one discovery database to the mobile device before the mobile device is connected to the target network responsive to said querying from the mobile device;

further including using resource description framework (RDF) as a database structure;

further including using said method to discover information used by the mobile device for handoff and pre-authentication.

3. The method of claim 2, further including portioning media independent information service schema into basic schema and extended schema categories, wherein basic schema is essential for a media independent handover to support and extended schema is optional for a media independent handover to support.

4. The method of claim 2, wherein said method uses network-assisted discovery mechanisms.

5. The method of claim 2, wherein said method uses mobile-assisted discovery mechanisms.

6. The method of claim 2, wherein said method uses network-assisted mechanisms for constructing said database.

7. The method of claim 2, wherein said method uses mobile-assisted mechanisms for constructing said database.

8. The method of claim 2, wherein the mobile queries an AIS server or a peer mobile to obtain information regarding networking elements in the target network.

9. The method of claim 8, further including using reporting agents (RAs) to obtain the information.

10. The method of claim 8, further including using AAA servers to obtain the information.

11. The method of claim 8, further including using DNS servers to obtain the information.

12. The method of claim 8, wherein the method employs a peer-to-peer model in which mobile devices serve as information servers.

13. The method of claim 12, wherein the method employs a scoped multicast approach.

14. The method of claim 12, wherein the method employs a recursive broadcast approach.

15. The method of claim 1, further comprising:

employing an application-layer mechanism within an information server for an information services (AIS)

based service discovery scheme using resource description framework (RDF) as a database structure to maintain information regarding a plurality of locations or networks; and said application layer mechanism providing network information from the information to said mobile device based on said querying from the mobile node; and further including setting up a secured pre-authentication for a user by discovering network elements in neighboring elements ahead of time; and further including discovering one or more of the following network elements ahead of time: Access Points, routers, SIP servers, and PANA servers.

16. The method of claim 15, further including using SOAP, HTTP, XML, WSDL and/or JENA as accompanying protocols to provide proper transport mechanism for database population by the scouts, reporting agents and/or information querying by the mobiles.

17. The method of claim 1, further including:

providing an information server employing an information database that portions media independent information service schema into basic schema and extended schema categories, wherein basic schema is essential for a media independent handover to support and extended schema is optional for a media independent handover to support; and transmitting the basic schema or the extended schema to said mobile node based on said query from the mobile node, wherein the basic schema or the extended schema pertains to a plurality of networks or locations.

18. The method of claim 17, further including providing vendor specific extended schema.

19. The method of claim 1, wherein said network information includes information used by the mobile device to access said access networks.

20. The method of claim 1, wherein said network information includes network attachment point identification of an access point.

21. The method of claim 19, wherein said information includes layer 3 type information.

22. The method of claim 19, wherein said information includes a security type supported by an access point.

23. The method of claim 19, wherein said information includes a provider name.

24. The method of claim 19, wherein said information includes addresses of servers or agents.

25. The method of claim 19, wherein said information includes addresses of authentication agents.

26. The method of claim 19, wherein said information includes addresses of access routers.

27. A method for network discovery for a mobile device to use at least one of a plurality of access networks within an IP network prior to handover, comprising:

said mobile device querying for specified network information, said specified network information including information used by the mobile device to pre-authenticate with an access network prior to handover and pertaining to a specific location within a radio coverage of an access point, and said specified network information being based on a condition specified by the querying; and providing the mobile device with network information pertaining to said specific location within the radio coverage of an access point, wherein said network information satisfies the condition specified by the querying;

wherein said specific location is based on a geo-coordinate of said mobile device or an address of an access point, and wherein said condition includes a distance condition based on a range of geo-coordinates of the mobile device, said range of geo-coordinates being based on the velocity or mobility pattern of the mobile device.

28. The method of claim 27, wherein said specific location is substantially smaller than and inside the radio coverage of an access point.

29. The method of claim 27, wherein said specific location is identified based on specific geo-coordinates.

30. The method of claim 28, wherein said specific geo-coordinates are determined based on a GPS system.

31. The method of claim 27, wherein said specific location is identified based on an address.

32. The method of claim 31, wherein said address is a MAC address, a geographic address or a civic address.

33. The method of claim 32, wherein said address is a MAC address of an access point.

34. The method of claim 27, wherein said condition includes a network information type condition.

* * * * *

UNITED STATES PATENT AND TRADEMARK OFFICE
CERTIFICATE OF CORRECTION

PATENT NO. : 8,717,931 B2
APPLICATION NO. : 11/267590
DATED : May 6, 2014
INVENTOR(S) : Taniuchi et al.

Page 1 of 2

It is certified that error appears in the above-identified patent and that said Letters Patent is hereby corrected as shown below:

In the Drawings

In Fig. 22, Sheet 67 of 67, delete " 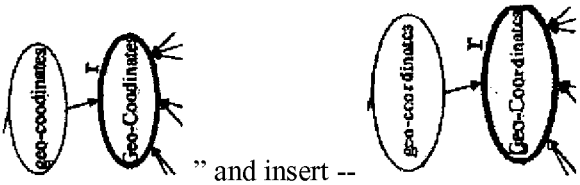 " and insert -- ... --, therefor.

In the Specification

In Column 4, Line 61, delete "Directory" and insert -- Discovery --, therefor.

In Column 7, Line 19, delete "system." and insert -- system; --, therefor.

In Column 7, Line 22, delete "format." and insert -- format; --, therefor.

In Column 7, Line 25, delete "flow." and insert -- flow; --, therefor.

In Column 7, Line 29, delete "Nov. 5, 2005." and insert -- Nov. 5, 2005; --, therefor.

In Column 7, Line 31, delete "schema." and insert -- schema; --, therefor.

In Column 7, Line 33, delete "format." and insert -- format; --, therefor.

In Column 7, Line 35, delete "format." and insert -- format; and --, therefor.

In Column 18, Line 30, delete "IPv6[19]" and insert -- IPv6[19]. --, therefor.

Signed and Sealed this
Fourth Day of November, 2014

Michelle K. Lee
*Deputy Director of the United States Patent and Trademark Office*

CERTIFICATE OF CORRECTION (continued)
U.S. Pat. No. 8,717,931 B2

In Column 25, Line 56, delete "e.g., 802.11," and insert -- (e.g., 802.11, --, therefor.

In Column 29, Line 61, delete "entiity or" and insert -- entity or --, therefor.

In Column 32, Line 13, delete "Alistair Bultar," and insert -- Alistair Buttar, --, therefor.

In Column 42, Line 20, delete "wwww.w3.org/TR/rdf-sparql-query/." and insert -- www.w3.org/TR/rdf-sparql-query/. --, therefor.

In Column 43, Line 12, delete "extensiblility" and insert -- extensibility --, therefor.

In the Claims

In Column 45, Line 28, in Claim 17, delete "query" and insert -- querying --, therefor.